United States Patent
Nieda

(10) Patent No.: US 10,228,050 B2
(45) Date of Patent: Mar. 12, 2019

(54) CAM DEVICE, FIXING DEVICE, TRANSFER DEVICE, AND IMAGE FORMING APPARATUS

(71) Applicant: Hiroaki Nieda, Kanagawa (JP)

(72) Inventor: Hiroaki Nieda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/782,172

(22) Filed: Oct. 12, 2017

(65) Prior Publication Data
US 2018/0112762 A1    Apr. 26, 2018

(30) Foreign Application Priority Data

Oct. 26, 2016  (JP) ................................. 2016-209506
Dec. 26, 2016  (JP) ................................. 2016-251051

(51) Int. Cl.
| | |
|---|---|
| *G03G 21/16* | (2006.01) |
| *G03G 15/20* | (2006.01) |
| *G03G 15/16* | (2006.01) |
| *G03G 15/01* | (2006.01) |
| *F16H 53/02* | (2006.01) |

(52) U.S. Cl.
CPC ....... *F16H 53/025* (2013.01); *G03G 15/2032* (2013.01); *G03G 15/2053* (2013.01); *G03G 15/2064* (2013.01); *G03G 21/168* (2013.01); *G03G 21/1647* (2013.01); *G03G 21/1685* (2013.01); *G03G 15/0136* (2013.01); *G03G 15/1615* (2013.01); *G03G 2215/2025* (2013.01); *G03G 2215/2032* (2013.01); *G03G 2221/1657* (2013.01)

(58) Field of Classification Search
CPC .......... G03G 15/2032; G03G 15/2053; G03G 15/2064; G03G 15/2067; G03G 15/0136; G03G 15/1615; G03G 15/2025
See application file for complete search history.

(56) References Cited

U.S. PATENT DOCUMENTS

| | | | | |
|---|---|---|---|---|
| 2007/0217801 A1* | 9/2007 | Tsuboi | ............... | G03G 15/0131 399/49 |
| 2013/0064584 A1* | 3/2013 | Yonemoto | .......... | G03G 15/2067 399/328 |
| 2014/0334847 A1* | 11/2014 | Takahashi | .......... | G03G 15/1605 399/121 |

FOREIGN PATENT DOCUMENTS

| | | |
|---|---|---|
| JP | 6-214449 | 8/1994 |
| JP | 2013-210618 | 10/2013 |
| JP | 2014-089358 | 5/2014 |
| JP | 2016-085438 | 5/2016 |
| JP | 2016-090958 | 5/2016 |

* cited by examiner

*Primary Examiner* — Gregory H Curran
(74) *Attorney, Agent, or Firm* — Oblon, McClelland, Maier & Neustadt, L.L.P.

(57) ABSTRACT

A cam device includes a cam and a driver. The cam includes a cam face that is gradually distanced from a rotation center of the cam over a range greater than half a round of the cam. The driver rotates the cam in a first direction and in a second direction opposite the first direction.

19 Claims, 36 Drawing Sheets

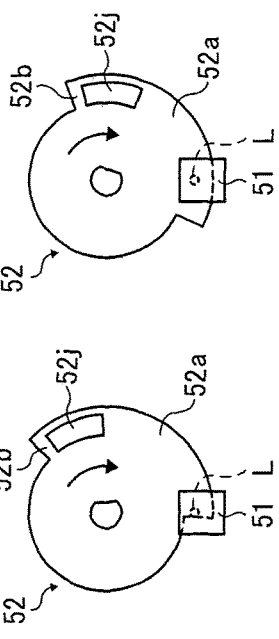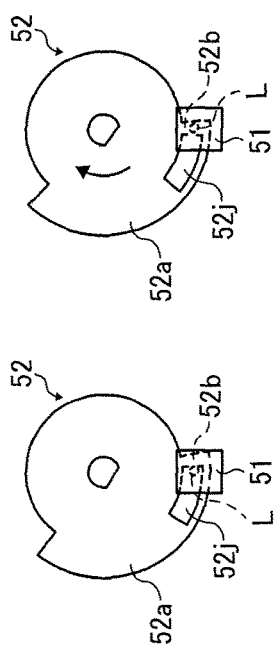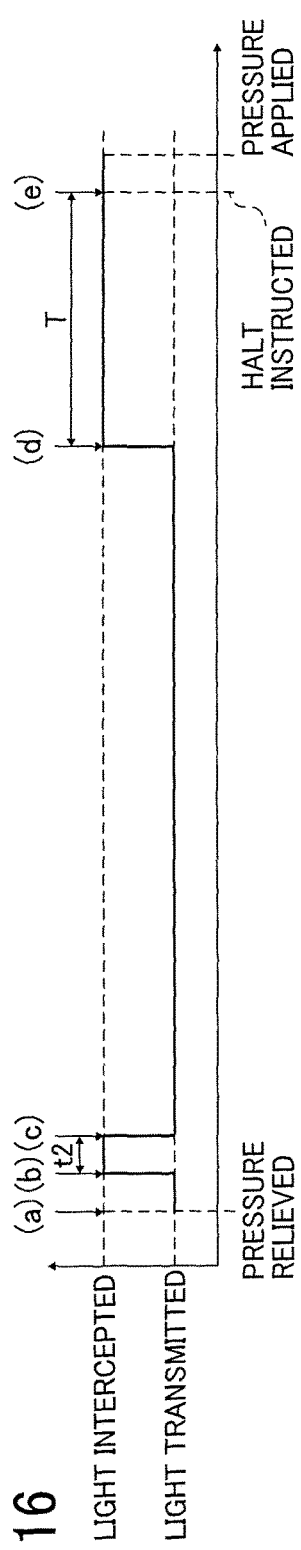

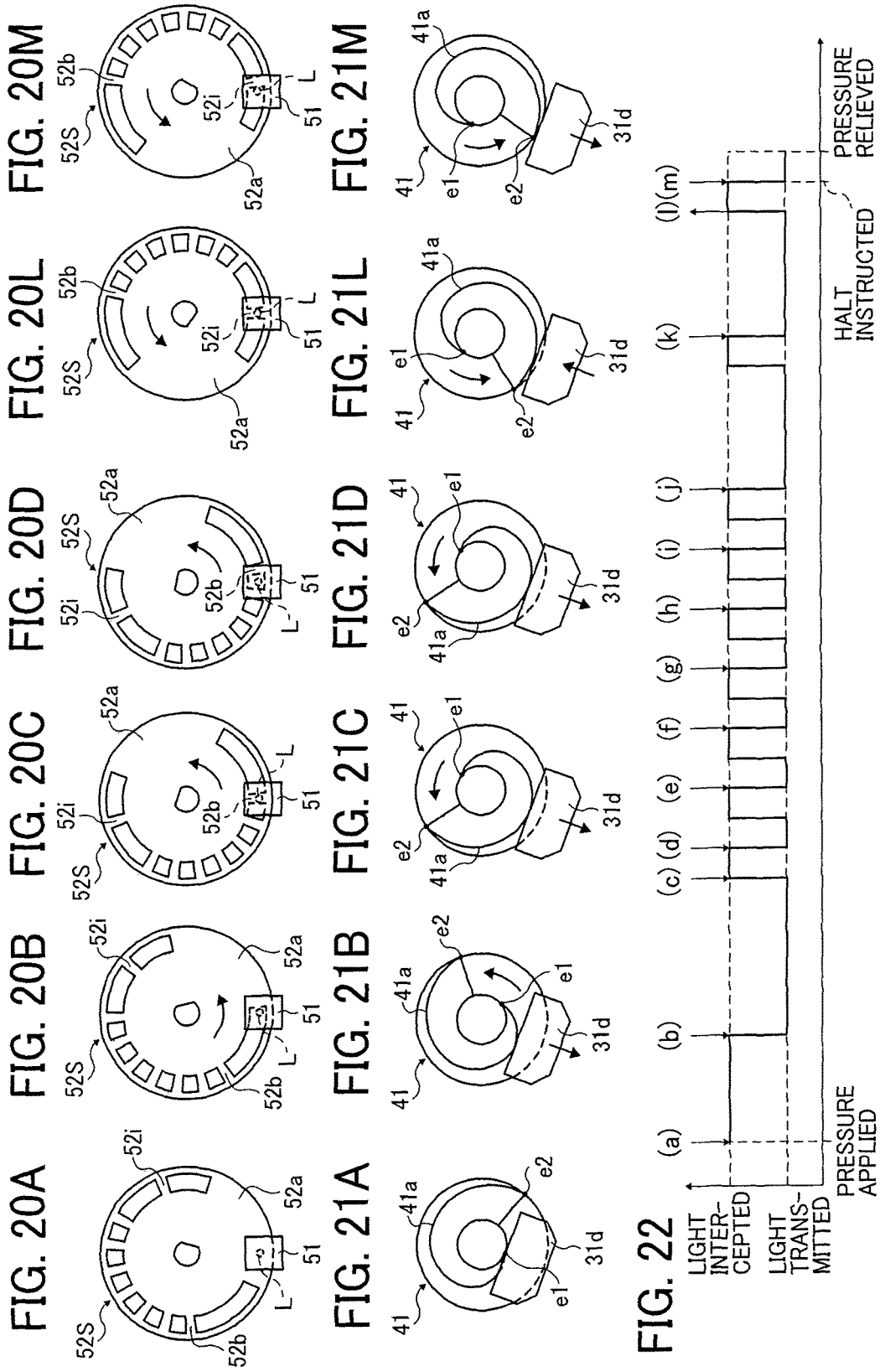

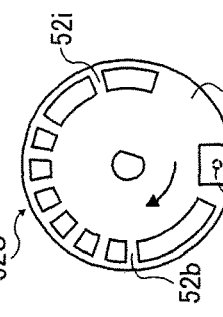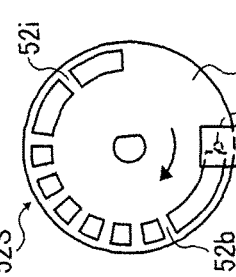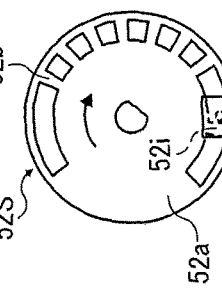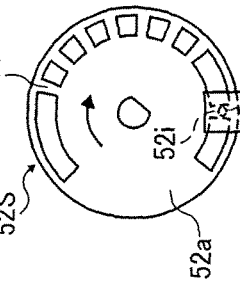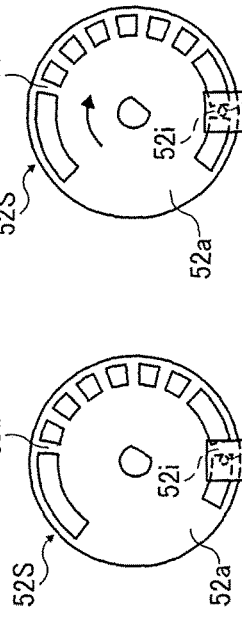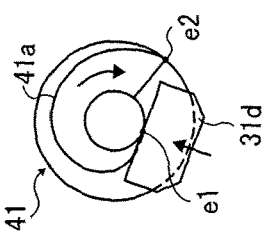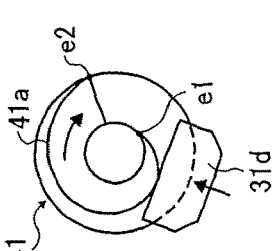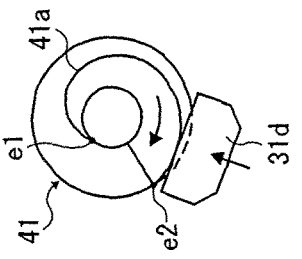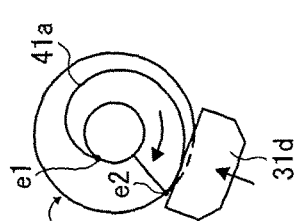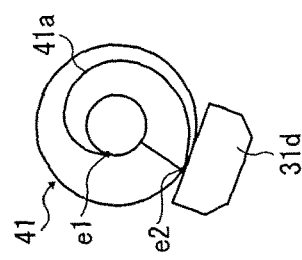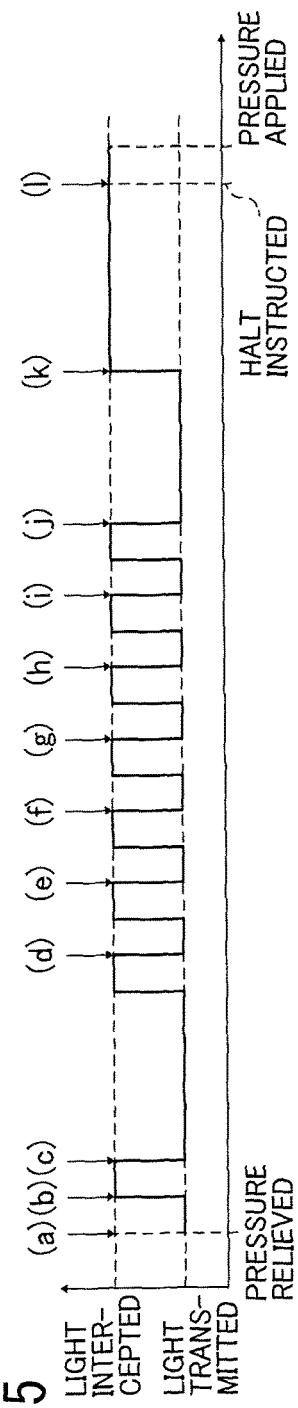

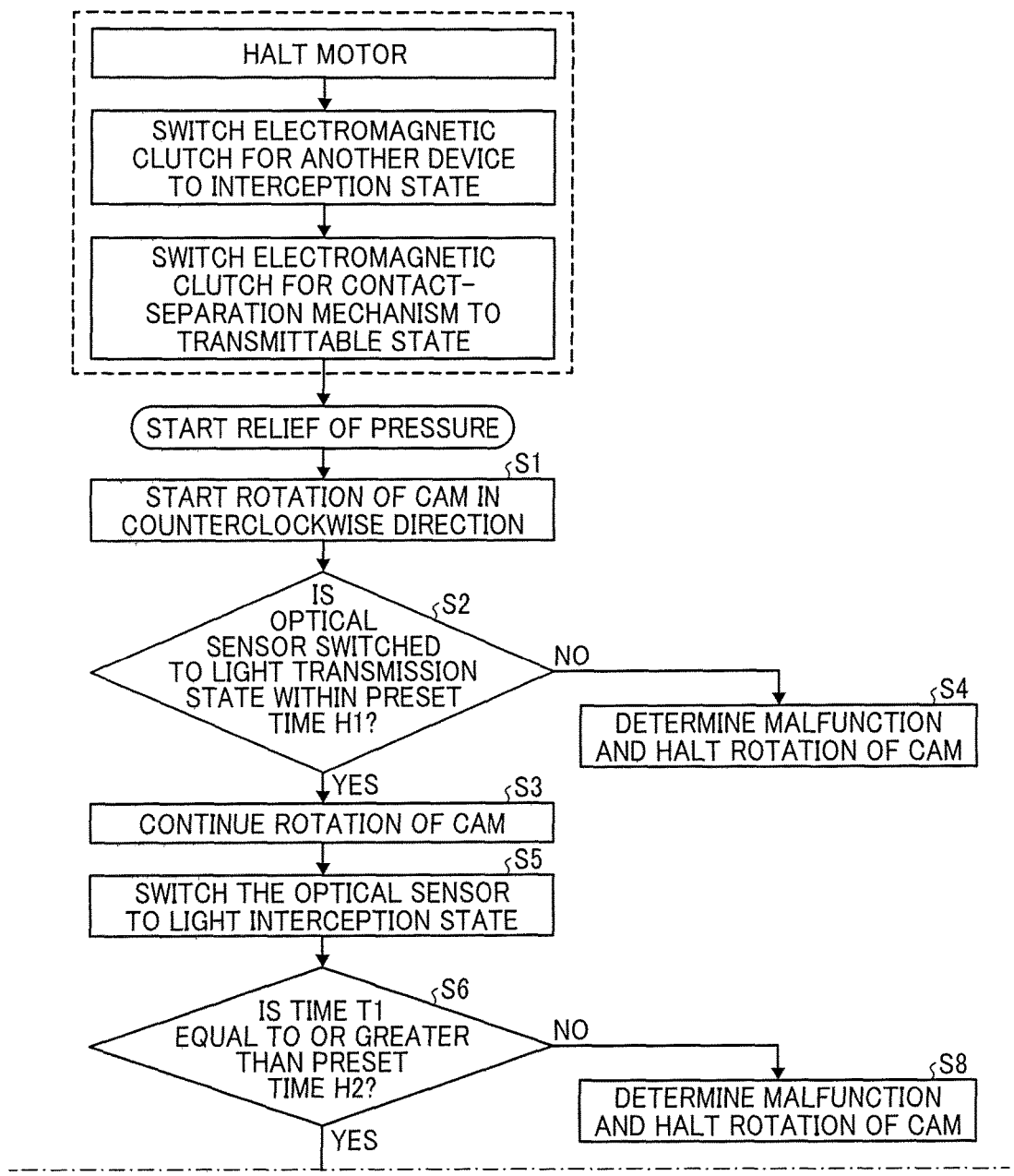

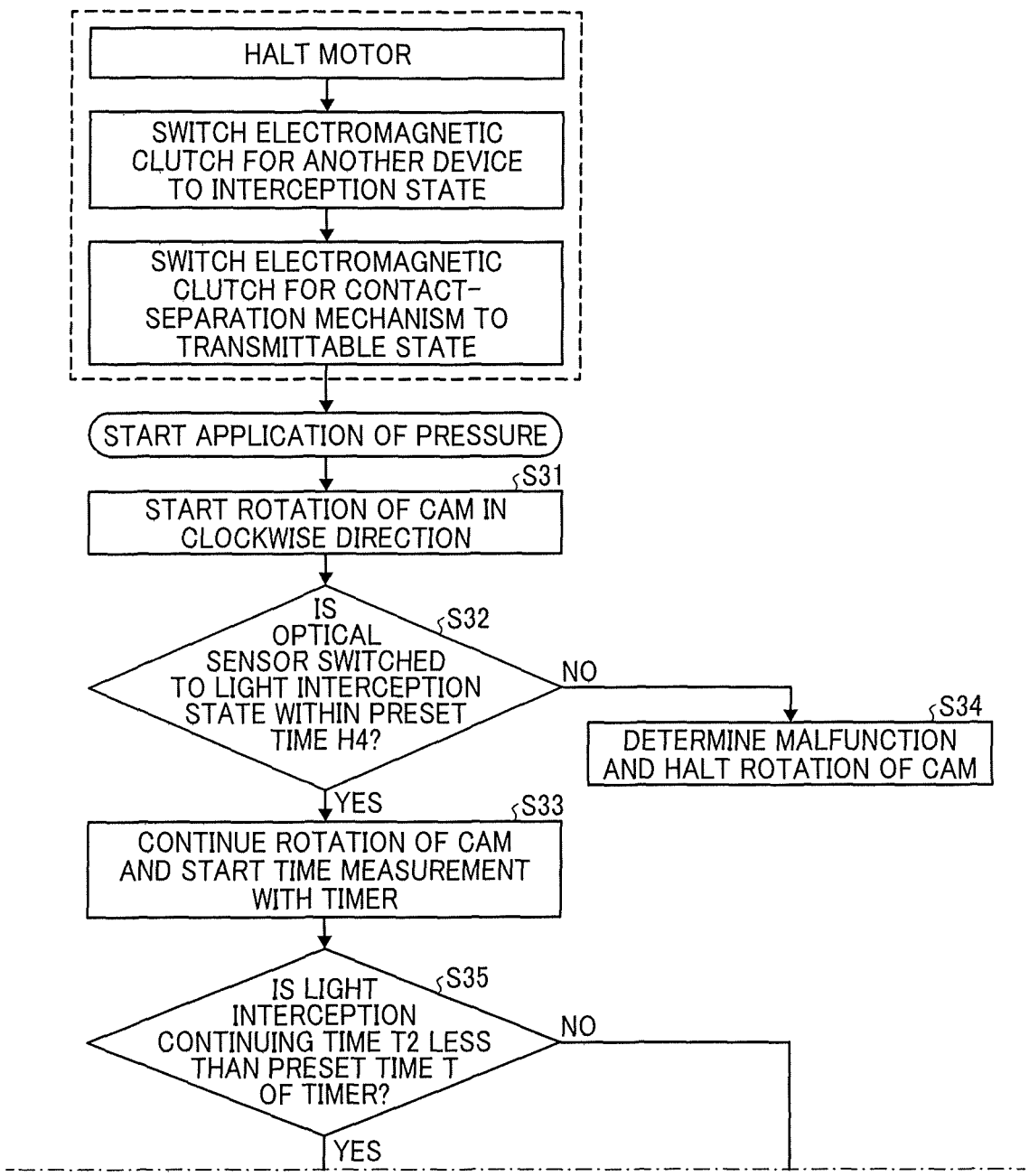

CAM DEVICE, FIXING DEVICE, TRANSFER DEVICE, AND IMAGE FORMING APPARATUS

CROSS-REFERENCE TO RELATED APPLICATIONS

This patent application is based on and claims priority pursuant to 35 U.S.C. § 119(a) to Japanese Patent Application Nos. 2016-209506, filed on Oct. 26, 2016, and 2016-251051, filed on Dec. 26, 2016, in the Japan Patent Office, the entire disclosure of each of which is hereby incorporated by reference herein.

BACKGROUND

Technical Field

Embodiments of the present disclosure relate to a cam device, a fixing device, a transfer device, and an image forming apparatus.

Related Art

Various types of electrophotographic image forming apparatuses are known, including copiers, printers, facsimile machines, and multifunction machines having two or more of copying, printing, scanning, facsimile, plotter, and other capabilities. Such image forming apparatuses usually form an image on a recording medium according to image data. Specifically, in such image forming apparatuses, for example, a charger uniformly charges a surface of a photoconductor as an image bearer. An optical writer irradiates the surface of the photoconductor thus charged with a light beam to form an electrostatic latent image on the surface of the photoconductor according to the image data. A developing device supplies toner to the electrostatic latent image thus formed to render the electrostatic latent image visible as a toner image. A transfer device transfers the toner image onto a recording medium either directly, or indirectly via an intermediate transfer belt. Finally, a fixing device applies heat and pressure to the recording medium bearing the toner image to fix the toner image onto the recording medium. Thus, an image is formed on the recording medium.

Such a fixing device and a transfer device of the image forming apparatuses may include a contact-separation mechanism or a cam device that causes a contact-separation member to approach and separate from an opposed member disposed opposite the contact-separation member.

For example, the fixing device may include a contact-separation mechanism to cause, e.g., a pressure rotator to approach and separate from, e.g., a fixing rotator disposed opposite the pressure rotator, so as to change contact pressure therebetween. On the other hand, the transfer device may include a contact-separation mechanism to separate, e.g., a primary transferor from a photoconductor for forming a color image, so as to form a monochrome image. There may be another contact-separation mechanism to separate a secondary transferor from an intermediate transferor to prevent reduction in speed of the intermediate transferor when a recording medium enters an area of contact between the intermediate transferor and the secondary transferor.

Generally, such a contact-separation mechanism includes a cam that rotates to cause a contact-separation member to approach and separate from an opposed member that is disposed opposite the contact-separation member.

SUMMARY

In one embodiment of the present disclosure, a cam device includes a cam and a driver. The cam includes a cam face that is gradually distanced from a rotation center of the cam over a range greater than half a round of the cam. The driver rotates the cam in a first direction and in a second direction opposite the first direction.

Also described are a novel fixing device, a novel transfer device, and a novel image forming apparatus, each of which incorporates the cam device.

BRIEF DESCRIPTION OF THE DRAWINGS

A more complete appreciation of the disclosure and many of the attendant advantages thereof will be more readily obtained as the same becomes better understood by reference to the following detailed description of embodiments when considered in connection with the accompanying drawings, wherein:

FIG. 14A is a schematic view of the light shield and the optical sensor, illustrating a position of the light shield before starting rotation and when the optical sensor in the light transmission state;

FIG. 14B is a schematic view of the light shield and the optical sensor, illustrating a position of the light shield after starting rotation and when the optical sensor enters the light interception state;

FIG. 14C is a schematic view of the light shield and the optical sensor, illustrating a position of the light shield when the optical sensor enters the light transmission state;

FIG. 14D is a schematic view of the light shield and the optical sensor, illustrating a position of the light shield when the optical sensor enters the light interception state;

FIG. 14E is a schematic view of the light shield and the optical sensor, illustrating a position of the light shield when a timer completes measurement of a preset time;

FIG. 15A is a schematic view of the cam and a cam receiver, illustrating relative positions thereof when the light shield is positioned as illustrated in FIG. 14A;

FIG. 15B is a schematic view of the cam and the cam receiver, illustrating relative positions thereof when the light shield is positioned as illustrated in FIG. 14B;

FIG. 15C is a schematic view of the cam and the cam receiver, illustrating relative positions thereof when the light shield is positioned as illustrated in FIG. 14C;

FIG. 15D is a schematic view of the cam and the cam receiver, illustrating relative positions thereof when the light shield is positioned as illustrated in FIG. 14D;

FIG. 15E is a schematic view of the cam and the cam receiver, illustrating relative positions thereof when the light shield is positioned as illustrated in FIG. 14E;

FIG. 16 is a timing chart of interception and transmission of light emitted by the optical sensor;

FIG. 20A is a schematic view of the light shield and the optical sensor, illustrating a position of the light shield before starting rotation and when the optical sensor is in the light interception state;

FIG. 20B is a schematic view of the light shield and the optical sensor, illustrating a position of the light shield after starting rotation and when the optical sensor enters the light transmission state;

FIG. 20C is a schematic view of the light shield and the optical sensor, illustrating a position of the light shield when the optical sensor enters the light interception state;

FIG. 20D is a schematic view of the light shield and the optical sensor, illustrating a position of the light shield when the optical sensor enters the light transmission state;

FIG. 20L is a schematic view of the light shield and the optical sensor, illustrating a position of the light shield when the optical sensor enters the light interception state;

FIG. 20M is a schematic view of the light shield and the optical sensor, illustrating a position of the light shield when the optical sensor enters the light transmission state;

FIG. 21A is a schematic view of the cam and the cam receiver, illustrating relative positions thereof when the light shield is positioned as illustrated in FIG. 20A;

FIG. 21B is a schematic view of the cam and the cam receiver, illustrating relative positions thereof when the light shield is positioned as illustrated in FIG. 20B;

FIG. 21C is a schematic view of the cam and the cam receiver, illustrating relative positions thereof when the light shield is positioned as illustrated in FIG. 20C;

FIG. 21D is a schematic view of the cam and the cam receiver, illustrating relative positions thereof when the light shield is positioned as illustrated in FIG. 20D;

FIG. 21L is a schematic view of the cam and the cam receiver, illustrating relative positions thereof when the light shield is positioned as illustrated in FIG. 20L;

FIG. 21M is a schematic view of the cam and the cam receiver, illustrating relative positions thereof when the light shield is positioned as illustrated in FIG. 20M;

FIG. 22 is a timing chart of interception and transmission of light emitted by the optical sensor;

FIG. 23A is a schematic view of the light shield and the optical sensor, illustrating a position of the light shield before starting rotation and when the optical sensor in the light transmission state;

FIG. 23B is a schematic view of the light shield and the optical sensor, illustrating a position of the light shield after starting rotation and when the optical sensor enters the light interception state;

FIG. 23C is a schematic view of the light shield and the optical sensor, illustrating a position of the light shield when the optical sensor enters the light transmission state;

FIG. 23K is a schematic view of the light shield and the optical sensor, illustrating a position of the light shield when the optical sensor enters the light interception state;

FIG. 23L is a schematic view of the light shield and the optical sensor, illustrating a position of the light shield when the timer completes measurement of the preset time;

FIG. 24A is a schematic view of the cam and a cam receiver, illustrating relative positions thereof when the light shield is positioned as illustrated in FIG. 23A;

FIG. 24B is a schematic view of the cam and the cam receiver, illustrating relative positions thereof when the light shield is positioned as illustrated in FIG. 23B;

FIG. 24C is a schematic view of the cam and the cam receiver, illustrating relative positions thereof when the light shield is positioned as illustrated in FIG. 23C;

FIG. 24K is a schematic view of the cam and the cam receiver, illustrating relative positions thereof when the light shield is positioned as illustrated in FIG. 23K;

FIG. 24L is a schematic view of the cam and the cam receiver, illustrating relative positions thereof when the light shield is positioned as illustrated in FIG. 23L;

FIG. 25 is a timing chart of interception and transmission of light emitted by the optical sensor;

FIG. 39A is a flowchart of control of rotation with the brushless direct current motor to relieve pressure;

FIG. 40A is a flowchart of control of rotation with the brushless direct current motor to apply pressure;

The accompanying drawings are intended to depict embodiments of the present disclosure and should not be interpreted to limit the scope thereof. Also, identical or similar reference numerals designate identical or similar components throughout the several views.

DETAILED DESCRIPTION

Figure 1:
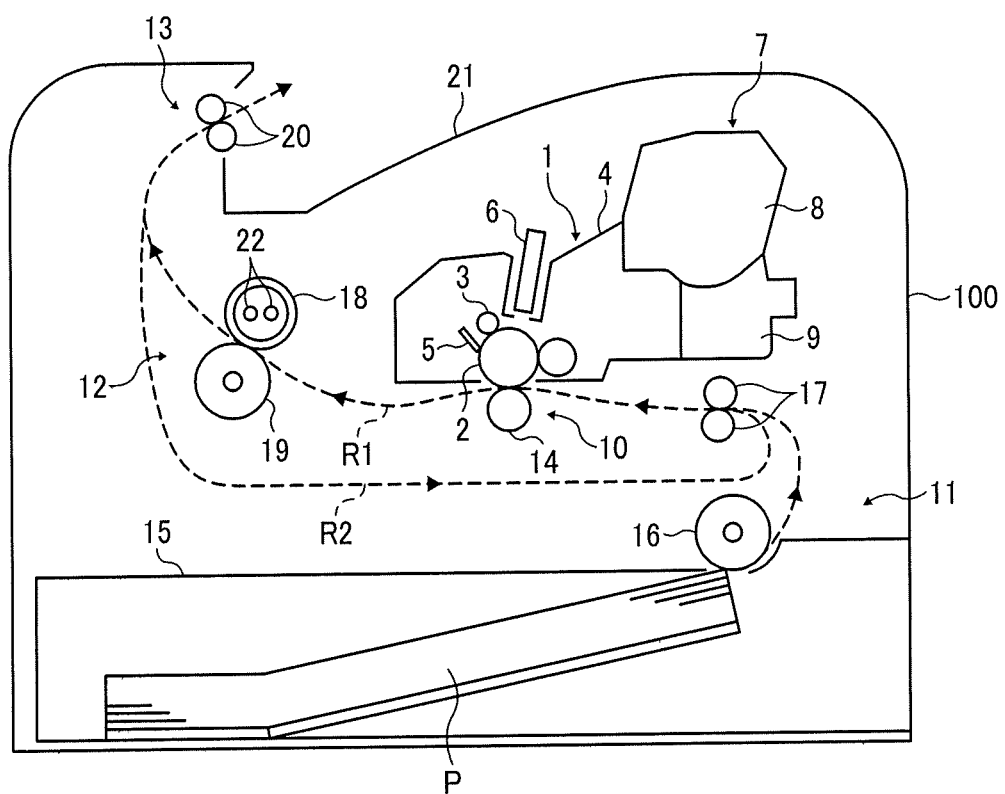
FIG. 1 is a schematic view of a monochrome image forming apparatus according to an embodiment of the present disclosure.

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner, and achieve similar results.

Although the embodiments are described with technical limitations with reference to the attached drawings, such description is not intended to limit the scope of the disclosure and not all of the components or elements described in the embodiments of the present disclosure are indispensable to the present disclosure.

In a later-described comparative example, embodiment, and exemplary variation, for the sake of simplicity like reference numerals are given to identical or corresponding constituent elements such as parts and materials having the same functions, and redundant descriptions thereof are omitted unless otherwise required.

As used herein, the singular forms "a", "an", and "the" are intended to include the plural forms as well, unless the context clearly indicates otherwise.

It is to be noted that, in the following description, suffixes Y, M, C, and K denote colors yellow, magenta, cyan, and black, respectively. To simplify the description, these suffixes are omitted unless necessary.

Referring now to the drawings, embodiments of the present disclosure are described below.

Initially with reference to FIG. 1, a description is given of an overall construction and an image forming operation of an image forming apparatus according to an embodiment of the present disclosure.

The image forming apparatus may be a copier, a facsimile machine, a printer, a multifunction peripheral (MFP) having at least two of copying, printing, scanning, facsimile, and plotter functions, or the like. According to the present embodiment, the image forming apparatus is a monochrome image forming apparatus (hereinafter referred to a monochrome image forming apparatus 100 or simply as an image forming apparatus 100) that forms a monochrome toner image on a recording medium by electrophotography. Alternatively, the image forming apparatus may be a color image forming apparatus that forms color and monochrome toner images on a recording medium by electrophotography.

FIG. 1 is a schematic view of the monochrome image forming apparatus 100.

Firstly, a description is now given of the overall construction of the monochrome image forming apparatus 100.

The image forming apparatus 100 includes, e.g., a process unit 1 (e.g., an image forming unit), serving as an image forming device, in an apparatus body of the image forming apparatus 100. The process unit 1 is removable from the apparatus body of the image forming apparatus 100. The process unit 1 includes a photoconductor 2, a charging roller 3, a developing device 4, and a cleaning blade 5. The photoconductor 2 serves as an image bearer or a latent image bearer that bears an image and a resultant toner image on an outer circumferential surface of the photoconductor 2. The charging roller 3 serves as a charger that charges the outer circumferential surface of the photoconductor 2. The developing device 4 renders the electrostatic latent image formed on the outer circumferential surface of the photoconductor 2 visible as a toner image. The cleaning blade 5 serves as a cleaner that cleans the outer circumferential surface of the photoconductor 2. The process unit 1 further includes a light-emitting diode (LED) head array 6 and a toner cartridge 7. The LED head array 6 is disposed opposite the photoconductor 2. The LED head array 6 serves as an exposure device that exposes the outer circumferential surface of the photoconductor 2.

The toner cartridge 7 serves as a powder container that contains powder toner for forming an image. The toner cartridge 7 is removable from the process unit 1. The toner cartridge 7 includes an unused toner container 8 and a waste toner container 9. The unused toner container 8 contains unused toner. The waste toner container 9 contains used toner as waste toner.

The image forming apparatus 100 further includes a transfer device 10, a sheet feeding device 11, a fixing device 12, a sheet ejection device 13, and a registration roller pair 17. The transfer device 10 transfers an image on a sheet P as a recording medium. The sheet feeding device 11 feeds or supplies the sheet P. The fixing device 12 fixes the image transferred to the sheet P by the transfer device 10 onto the sheet P. The sheet ejection device 13 ejects the sheet P outside the apparatus body of the image forming apparatus 100. The registration roller pair 17 is a timing roller pair.

The transfer device 10 includes a transfer roller 14 serving as a transferor. In the process unit 1 installed inside the image forming apparatus 100, the transfer roller 14 contacts the photoconductor 2 to form an area of contact, herein referred to as a transfer nip, between the transfer roller 14 and the photoconductor 2. The transfer roller 14 is coupled to a power supply that applies at least one of a predetermined direct current (DC) voltage and a predetermined alternating current (AC) voltage to the transfer roller 14.

The sheet feeding device 11 includes a sheet tray 15 and a sheet feeding roller 16. A plurality of sheets P rests on the sheet tray 15. The sheet feeding roller 16 feeds the sheets P from the sheet tray 15 one at a time. The sheets P may be plain paper, thick paper, thin paper, postcards, envelopes, coated paper, art paper, tracing paper, or the like. In the present embodiment, the sheets P are described as recording media. Alternatively, the recording media may be overhead projector (OHP) transparency (e.g., sheets or films), or the like.

The fixing device 12 includes, e.g., a pair of rotators facing each other. In the present embodiment, the pair of rotators are a fixing roller 18 and a pressure roller 19. The fixing roller 18 is a fixing rotator that fixes an image on the sheet P. The pressure roller 19 is a pressure rotator that presses against the fixing rotator (i.e., fixing roller 18). Inside the fixing roller 18 is a halogen heater 22 serving as a heater. The fixing roller 18 and the pressure roller 19 contact each other, thereby forming an area of contact, herein referred to as a fixing nip, between the fixing roller 18 and the pressure roller 19.

The sheet ejection device 13 includes a sheet ejection roller pair 20 that ejects the sheets P one at a time outside the apparatus body of the image forming apparatus 100. Specifically, the sheet ejection roller pair 20 ejects the sheets P one at a time onto an output tray 21 disposed atop the apparatus body of the image forming apparatus 100. Thus, the plurality of sheets P lies stacked on the output tray 21.

A first conveyance passage R1 is defined by some internal components of the image forming apparatus 100. Specifically, the sheet P is conveyed along the first conveyance passage R1 from the sheet tray 15 to the sheet ejection roller pair 20 via the registration roller pair 17, the transfer nip formed between the transfer roller 14 and the photoconductor 2, and the fixing nip formed between the fixing roller 18 and the pressure roller 19 in the fixing device 12. A second conveyance passage R2 is also defined by some internal components of the image forming apparatus 100. Specifically, the sheet P is conveyed along the second conveyance passage R2 upon duplex printing. More specifically, the sheet P passing through the fixing device 12 is conveyed along the second conveyance passage R2 to reach the transfer nip again.

To provide a fuller understanding of the embodiments of the present disclosure, a description is now given of the image forming operation of the monochrome image forming apparatus 100 with continued reference to FIG. 1.

As a print job starts, a driver drives and rotates the photoconductor 2. The charging roller 3 uniformly charges the outer circumferential surface of the photoconductor 2 at a predetermined polarity. The LED head array 6 exposes the outer circumferential surface of the photoconductor 2 thus charged, according to image data sent from a scanner or an external device such as a computer, thereby forming an electrostatic latent image on the outer circumferential surface of the photoconductor 2. The developing device 4 supplies toner to the electrostatic latent image thus formed on the photoconductors 2, rendering the electrostatic latent image visible as a toner image.

Meanwhile, as the print job starts, the sheet feeding roller 16 starts rotating to feed a sheet P from the sheet tray 15 toward the registration roller pair 17. The registration roller pair 17 temporarily halts the sheet P conveyed by the sheet feeding roller 16. Thereafter, activation of the registration roller pair 17 is timed to convey the sheet P to the transfer nip such that the toner image formed on the outer circumferential surface of the photoconductor 2 meets the sheet P at the transfer nip.

When the sheet P reaches the transfer nip, a predetermined transfer voltage is applied to the transfer roller 14, thereby generating a transfer electric field to transfer the toner image from the outer circumferential surface of the photoconductor 2 onto the sheet P. The cleaning blade 5 removes residual toner from the outer circumferential surface of the photoconductor 2. In this case, the residual toner is toner that has failed to be transferred onto the sheet P and therefore remains on the outer circumferential surface of the photoconductor 2. The waste toner container 9 of the toner cartridge 7 collects the residual toner removed by the cleaning blade 5.

After the toner image is transferred onto the sheet P, the sheet P bearing the toner image is conveyed to the fixing device 12. The fixing device 12 fixes the toner image onto the sheet P under heat and pressure while the sheet P is conveyed through the fixing nip formed between the fixing roller 18 and the pressure roller 19. After the toner image is fixed onto the sheet P, the sheet P bearing the fixed toner image is conveyed to the sheet ejection roller pair 20. The sheet ejection roller pair 20 ejects the sheet P onto the output tray 21 disposed atop the apparatus body of the image forming apparatus 100. Thus, a plurality of sheets P lies stacked on the output tray 21.

Upon duplex printing, the sheet P bearing the toner image fixed onto a front side thereof in the fixing device 12 is directed to the second conveyance passage R2, instead of being directed to the sheet ejection roller pair 20. The second conveyance passage R2 joins the first conveyance passage R1 before the registration roller pair 17. The sheet P is conveyed along the second conveyance passage R2 and the first conveyance passage R1 in this order, to reach the registration roller pair 17. The registration roller pair 17 sends out the sheet P to the transfer nip again. At the transfer nip, another toner image is transferred from the outer circumferential surface of the photoconductor 2 onto a back side of the sheet P. The sheet P is then conveyed to the fixing device 12 that fixes the other toner image onto the back side of the sheet P. Thereafter, the sheet P bearing the toner images fixed onto both sides thereof is conveyed to the sheet ejection roller pair 20, which ejects the sheet P onto the output tray 21.

Figure 2:
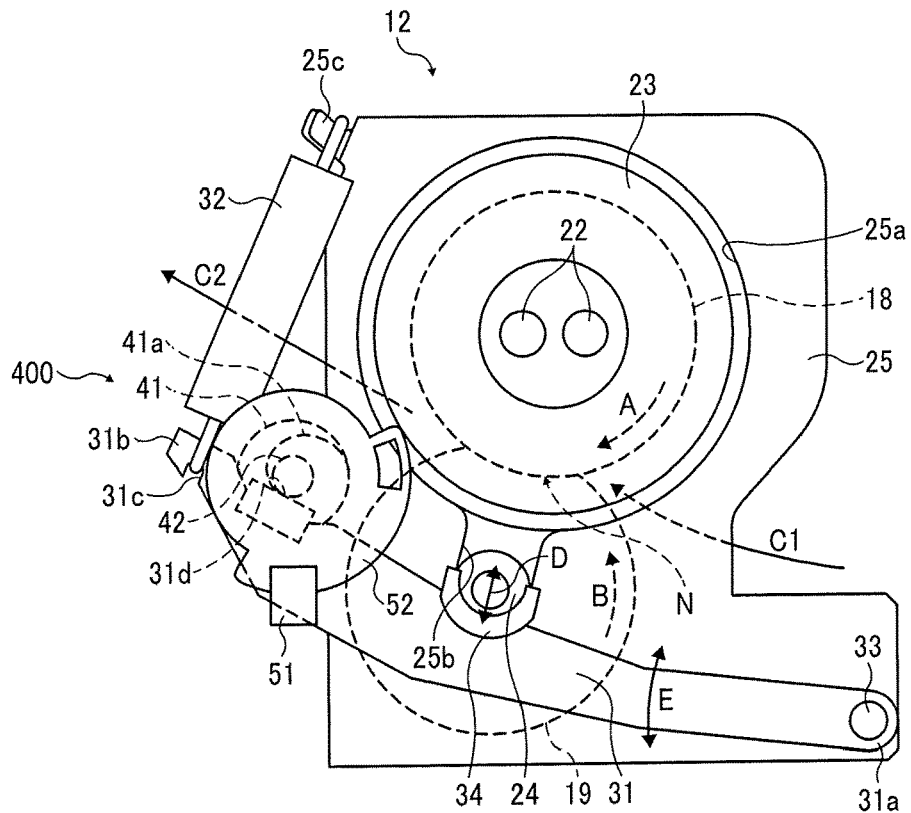
FIG. 2 is a schematic view of a fixing device incorporated in the image forming apparatus of FIG. 1.

Referring now to FIG. 2, a detailed description is given of a construction of the fixing device 12 incorporated in the image forming apparatus 100 described above.

FIG. 2 is a schematic view of the fixing device 12.

Opposed lateral end portions of the fixing roller 18 in an axial direction thereof are rotatably mounted on and supported by a pair of supports 25 via a first pair of bearings 23. Similarly, opposed lateral end portions of the pressure roller 19 in an axial direction thereof are rotatably mounted on and supported by the pair of supports 25 via a second pair of bearings 24. When a driver situated inside the image forming apparatus 100 of FIG. 1 generates and transmits a driving force to the fixing roller 18, the driving force drives and rotates the fixing roller 18 in a clockwise direction of rotation A in FIG. 2. In association with rotation of the fixing roller 18, the pressure roller 19 rotates in a counterclockwise direction of rotation B in FIG. 2. In short, in the present embodiment, the fixing roller 18 is a drive roller while the pressure roller 19 is a driven roller. Alternatively, the pressure roller 19 may be a drive roller while the fixing roller 18 may be a driven roller. In such a case, the driving force is transmitted to the pressure roller 19, thereby rotating the pressure roller 19 in the direction of rotation B. In association with rotation of the pressure roller 19, the fixing roller 18 rotates in the direction of rotation A.

The fixing roller 18 is heated to a predetermined temperature by radiation heat from the halogen heater 22. Meanwhile, the sheet P is conveyed in a first sheet conveyance direction C1 illustrated in FIG. 2, to enter the fixing nip (hereinafter referred to as a fixing nip N). The fixing roller 18 and the pressure roller 19 sandwich and convey the sheet P through the fixing nip N while rotating. At the fixing nip, the fixing roller 18 having the predetermined temperature heats and melts a toner image on the sheet P while the pressure roller 19 presses against the fixing roller 18 via the sheet P. Under the heat and pressure, the toner image is fixed onto the sheet P. The sheet P bearing the fixed toner image is ejected from the fixing nip N and conveyed in a second sheet conveyance direction C2 illustrated in FIG. 2.

The pair of supports 25 supports the pressure roller 19 such that the pressure roller 19 approaches and separates from the fixing roller 18 in directions D illustrated in FIG. 2. Specifically, each one of the second pair of bearings 24 (hereinafter simply referred to as the second bearing 24) that supports the pressure roller 19 is fitted into a bearing guide 25b provided in each one of the pair of supports 25 (hereinafter simply referred to as the support 25). The bearing guide 25b is a rectangular hole. The pressure roller 19 approaches and separates from the fixing roller 18 while the second bearing 24 is guided along the bearing guide 25b. On the other hand, each one of the first pair of bearings 23 (hereinafter simply referred to as the first bearing 23) that supports the fixing roller 18 is fitted into a bearing joint 25a provided in the support 25. In the present embodiment, the bearing joint 25a is a round hole. The first bearing 23 thus fitted into the bearing joint 25a prevents an axial position of the fixing roller 18 from moving in a direction perpendicular to the axial direction of the fixing roller 18. Thus, the fixing roller 18 is secured at a given position.

According to the present embodiment, the fixing device 12 further includes a pressure lever 31 and a pressure spring 32. The pressure lever 31 is a pressure member that presses the pressure roller 19 against the fixing roller 18. The pressure spring 32 is a biasing member that biases the pressure lever 31 in a direction to apply pressure. The pressure lever 31 and the pressure spring 32 are provided on each lateral end side of the pressure roller 19. The pressure lever 31 has a first end portion 31a attached to a support shaft 33 that is disposed in a lower portion of the support 25. Accordingly, the pressure lever 31 is rotatable about the support shaft 33 in directions E illustrated in FIG. 2. One end portion of the pressure spring 32 is hooked on a first hooked portion 25c situated in an upper portion of the support 25. The other end portion of the pressure spring 32 is hooked on a second hooked portion 31c situated on a second end portion 31b of the pressure lever 31. Accordingly, the pressure spring 32 pulls the second end portion 31b of the pressure lever 31 upwards in FIG. 2, thereby holding the second end portion 31b of the pressure lever 31. The pressure lever 31 presses the second bearing 24, which supports the pressure roller 19, via a pad 34 fitted into the bearing guide 25b of the support 25, thereby pressing the pressure roller 19 toward the fixing roller 18.

According to the present embodiment, the fixing device 12 further includes a contact-separation mechanism 400 serving as a cam device. The contact-separation mechanism 400 causes the pressure roller 19, serving as a first rotator or a contact-separation member, to approach and separate from the fixing roller 18 serving as a second rotator or an opposed member that is disposed opposite the pressure roller 19. The contact-separation mechanism 400 includes, e.g., a cam 41. The cam 41 is mounted on each lateral end portion of a rotary shaft 42 that is rotatably supported by the pair of supports 25. In other words, a pair of cams 41 is mounted on opposed end portions of the rotary shaft 42. As the rotary shaft 42 rotates, the pair of cams 41 rotates together with the rotary shaft 42. The cam 41 includes a cam face 41a. A distance from a rotation center of the cam 41 to the cam face 41a changes in a direction of rotation of the cam 41. The pressure spring 32 pulls the pressure lever 31, thereby holding a cam receiver 31d of the pressure lever 31 in contact with the cam face 41a. When the cam 41 rotates in a direction, the cam face 41a in contact with the cam receiver 31d presses and moves the pressure lever 31 downwards in FIG. 2. Accordingly, the pressure roller 19 separates from the fixing roller 18. By contrast, when the cam 41 rotates in an opposite direction, the pressure lever 31 is moved upwards in FIG. 2. Accordingly, the pressure roller 19 approaches the fixing roller 18. A detailed description of a contact-separation operation of the cam 41 is deferred.

According to the present embodiment, the fixing device 12 further includes a light shield 52 and an optical sensor 51 serving as a rotational position detector that detects a rotational position (i.e., rotational angle) of the cam 41. The optical sensor 51 is a transmissive optical sensor, which includes a light emitter that emits light and a light receiver that receives the light emitted by the light emitter. The light shield 52 rotates together with the cam 41, thereby intercepts or transmits the light emitted by the optical sensor 51. The optical sensor 51 detects a rotational position of the light shield 52 based on readings thereof, that is, whether the optical sensor 51 receives the light or not. Thus, the light shield 52 serves as a detected member. The optical sensor 51 and the light shield 52 are mounted on one of the pair of cams 41.

Figure 3:
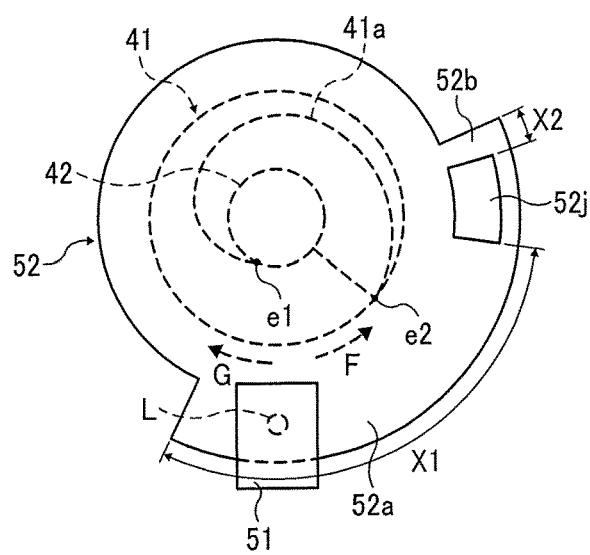
FIG. 3 is a schematic view of a cam, an optical sensor, and a light shield incorporated in the fixing device of FIG. 2.

Referring now to FIG. 3, a description is given of a construction of the cam 41, the optical sensor 51, and the light shield 52.

FIG. 3 is a schematic view of the cam 41, the optical sensor 51, and the light shield 52.

As illustrated in FIG. 3, the distance from the rotation center of the cam 41 to the cam face 41a gradually increases in a clockwise direction in FIG. 3. In other words, the cam face 41a is gradually distanced from the rotation center of the cam 41 in the clockwise direction in FIG. 3. The cam face 41a is provided over a range greater than half a round (i.e., 180°) of rotation of the cam 41 in a direction of rotation of the cam 41. Specifically, in the present embodiment, the cam face is provided over a range of about 270° from a minimum point e1 to a maximum point e2. The distance from the rotation center of the cam 41 to the minimum point e1 of the cam face 41a is minimum while the distance from the rotation center of the cam 41 to the maximum point e2 of the cam face 41a is maximum.

The light shield 52 has a long light shield portion 52a and a short light shield portion 52b. The long light shield portion 52a is a relatively long area subjected to detection having a length X1 in a direction of rotation of the light shield 52 (i.e., direction of rotation of the cam 41). By contrast, the short light shield portion 52b is a relatively short area subjected to detection having a length X2 in the direction of rotation of the light shield 52. Thus, the long light shield portion 52a and the short light shield portion 52b serves as a long detected portion and a short detected portion, respectively, of the light shield 52 (i.e., detected member). During rotation of the light shield 52, the long light shield portion 52a and the short light shield portion 52b passing before a light emission portion L of the optical sensor 51 intercept the light coming from the optical sensor 51. Between the long light shield portion 52a and the short light shield portion 52b is a hole, namely, a light transmission portion 52j, through which the light emitted by the optical sensor 51 passes.

Figure 4:
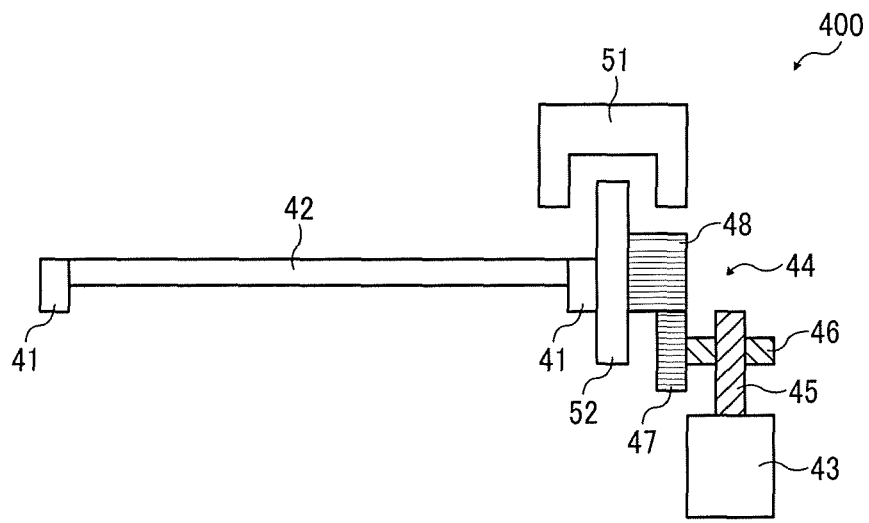
FIG. 4 is a schematic view of a driving system of a contact-separation mechanism incorporated in the fixing device of FIG. 2.

Referring now to FIG. 4, a description is given of a driving system of the contact-separation mechanism 400 incorporated in the fixing device 12 described above.

FIG. 4 is a schematic view of the driving system of the contact-separation mechanism 400.

As illustrated in FIG. 4, the driving system of the contact-separation mechanism 400 includes a motor 43 and a gear train 44. The motor 43 serves as a driver. The gear train 44 transmits a driving force generated by the motor 43 to, e.g., the cam 41 and the light shield 52. According to the present embodiment, the motor 43 is a relatively small, inexpensive brushed direct current (DC) motor. The gear train 44 includes a first worm gear 45, a second worm gear 46, a first spur gear 47, and a second spur gear 48. The first worm gear 45 is attached to an output shaft of the motor 43. The second worm gear 46 is meshed with the first worm gear 45. The first spur gear 47 is combined with the second worm gear 46 as a single unit. The second spur gear 48 is meshed with the first spur gear 47 while being combined with the light shield 52 as a single unit. As the output shaft of the motor 43 rotates in one direction or in the opposite direction, the first worm gear 45, the second worm gear 46, the first spur gear 47, and the second spur gear 48 rotate. Since the second spur gear 48 and the light shield 52 rotate together, the pair of cams 41 rotates in one direction (i.e., direction F illustrated in FIG. 3) or in the opposite direction (i.e., direction G illustrated in FIG. 3) via the rotary shaft 42.

Figure 5:
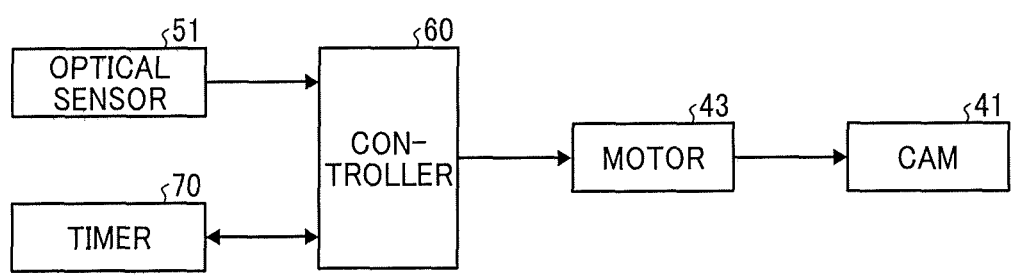
FIG. 5 is a block diagram of a control system of the contact-separation mechanism incorporated in the fixing device of FIG. 2.

Referring now to FIG. 5, a description is given of a control system of the contact-separation mechanism 400 incorporated in the fixing device 12 described above.

FIG. 5 is a block diagram of the control system of the contact-separation mechanism 400.

As illustrated in FIG. 5, the control system of the contact-separation mechanism 400 includes a controller 60, the optical sensor 51, and a timer 70. The controller 60 controls rotation of the cam 41. The optical sensor 51 detects the rotational position of the cam 41. The timer 70 measures duration of rotation of the cam 41. The controller 60 includes, e.g., a central processing unit (CPU), a read only memory (ROM), and a random access memory (RAM) disposed in the apparatus body of the image forming apparatus 100. Based on a signal detected by the optical sensor 51 or the time measured by the timer 70, the controller 60 controls the driving of the motor 43, thereby controlling the rotation of the cam 41. In addition, the controller 60 controls when to start and stop time measurement with the timer 70, based on the signal detected by the optical sensor 51.

Generally, a two-ply sheet such as an envelope may be wrinkled while being conveyed through a fixing nip between a fixing roller and a pressure roller if the fixing nip is formed with pressure identical to pressure applied to plain paper. To address this circumstance, the fixing nip may be formed with a smaller pressure than a normal pressure (i.e., pressure applied to plain paper) when the two-ply sheet (e.g., envelope) is conveyed through the fixing nip.

In the fixing device 12 of the present embodiment, the pressure roller 19 is configured to approach and separate from the fixing roller 18 to change pressure at the fixing nip N according to a type of the sheet P conveyed through the fixing nip N.

Now, a description is given of a pressure relief operation to relieve pressure from the normal pressure and a pressure applying operation to apply pressure back to the normal pressure. Hereinafter and in the accompanying drawings, the pressure relief operation may be simply referred to as relief of pressure while the pressure applying operation may be simply referred to as application of pressure.

Figure 6A:
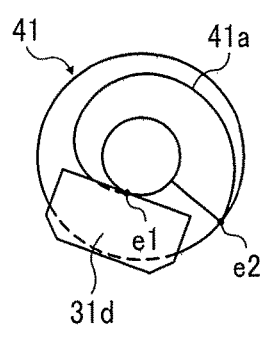
FIG. 6A is a view of the cam and a cam receiver in contact with each other at a minimum point.

Initially, with reference to FIGS. 6A though 7C, a description is given of a contact-separation operation performed by the cam 41 on the pressure roller 19.

Figure 6B:
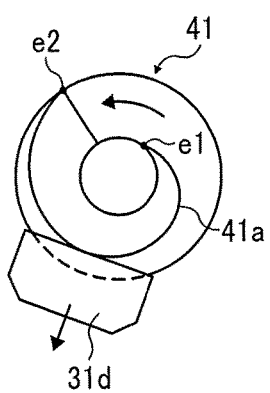
FIG. 6B is a view of the cam and the cam receiver, illustrating the cam rotated from the position of FIG. 6A.
Figure 6C:
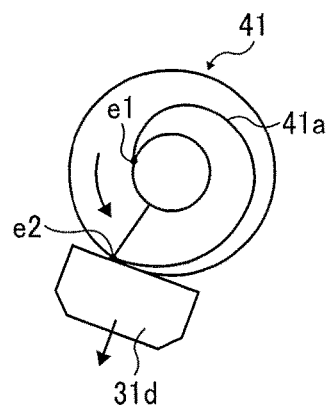
FIG. 6C is a view of the cam and the cam receiver, illustrating the cam rotated from the position of FIG. 6B and in contact with the cam receiver at a maximum point.
Figure 7A:
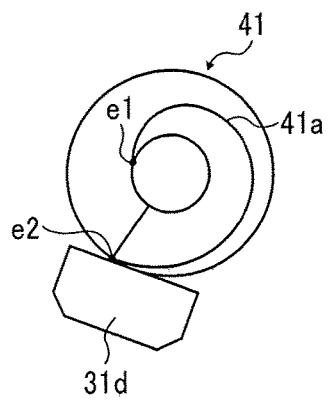
FIG. 7A is a view of the cam and the cam receiver in contact with each other at the maximum point.
Figure 7B:
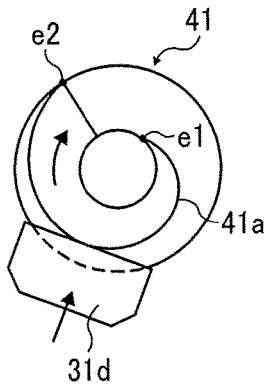
FIG. 7B is a view of the cam and the cam receiver, illustrating the cam rotated from the position of FIG. 7A.
Figure 7C:
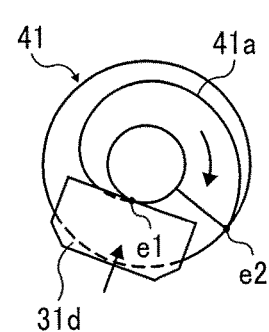
FIG. 7C is a view of the cam and the cam receiver, illustrating the cam rotated from the position of FIG. 7B and in contact with the cam receiver at the minimum point.

FIG. 6A is a view of the cam 41 and the cam receiver 31d in contact with each other at the minimum point e1. FIG. 6B is a view of the cam 41 and the cam receiver 31d, illustrating the cam 41 rotated from the position of FIG. 6A. FIG. 6C is a view of the cam 41 and the cam receiver 31d, illustrating the cam 41 rotated from the position of FIG. 6B and in contact with the cam receiver 31d at the maximum point e2. FIG. 7A is a view of the cam 41 and the cam receiver 31d in contact with each other at the maximum point e2. FIG. 7B is a view of the cam 41 and the cam receiver 31d, illustrating the cam 41 rotated from the position of FIG. 7A. FIG. 7C is a view of the cam 41 and the cam receiver 31d, illustrating the cam 41 rotated from the position of FIG. 7B and in contact with the cam receiver 31d at the minimum point e1.

Specifically, FIG. 6A illustrates a state in which the cam receiver 31d of the pressure lever 31 is in contact with the cam face 41a of the cam 41 at the minimum point e1. In this state, the pressure roller 19 is pressed against the fixing roller 18 with the normal pressure.

As the cam 41 in the state illustrated in FIG. 6A rotates in a counterclockwise direction in FIG. 6B, the cam face 41a slides on the cam receiver 31d. That is, a position of contact between the cam face 41a and the cam receiver 31d relatively moves from the minimum point e1 toward the maximum point e2. In association with rotation of the cam 41, the cam face 41a moves the cam receiver 31d downwards in FIG. 6B, separating the pressure lever 31 from the second bearing 24. Accordingly, the pressure roller 19 moves away from the fixing roller 18.

When the position of contact between the cam face 41a and the cam receiver 31d reaches the maximum point e2 as illustrated in FIG. 6C, the cam 41 stops rotation to complete separation of the pressure roller 19 from the fixing roller 18. At this time, the pressure at the fixing nip N is smaller than the normal pressure. That is, the pressure is relieved. Hereinafter, such a state in which the pressure is relieved may be referred to as a pressure relief state.

By contrast, when the cam 41 in the pressure relief state illustrated in FIG. 7A rotates in a clockwise direction in FIG. 7B (i.e., opposite direction illustrated in FIG. 6B), the cam face 41a slides on the cam receiver 31d. That is, the position of contact between the cam face 41a and the cam receiver 31d relatively moves from the maximum point e2 toward the minimum point e1. In association with rotation of the cam 41, a biasing force generated by the pressure spring 32 pulls the cam receiver 31d upwards in FIG. 7B, causing the pressure lever 31 to press against the second bearing 24. Accordingly, the pressure roller 19 approaches the fixing roller 18.

When the position of contact between the cam face 41a and the cam receiver 31d reaches the minimum point e1 as illustrated in FIG. 7C, the cam 41 stops rotation to complete approach of the pressure roller 19 to the fixing roller 18, returning the pressure at the fixing nip N to the normal pressure. That is, the pressure is increased form the pressure in the pressure relief state. Hereinafter, such a state in which the pressure is applied may be referred to as a pressure applying state.

Thus, in the fixing device 12 of the present embodiment, the cam 41 rotates in one direction (e.g., counterclockwise direction) to separate the pressure roller 19 from the fixing roller 18. By contrast, the cam 41 rotates in the opposite direction (e.g., clockwise direction) to cause the pressure roller 19 to approach the fixing roller 18. Specifically, when the cam 41 rotates, the common cam face 41a moves the pressure lever 31 downwards and upwards.

Generally, a lower gradient (i.e., rate of change in distance from a rotation center with respect to a length in a direction of rotation) of a cam face of a cam reduces a torque generated when the cam rotates in a direction to press and move a contact-separation member or an associated member that moves together with the contact-separation member, thereby reducing a burden on the device. When the cam rotates in a direction opposite the direction to press and move the contact-separation member or the associated member, a lower gradient of the cam face suppresses an increase in rotational speed of the cam, which is caused by a rapid release of pressure, thereby preventing operating noises.

However, in a typical configuration, the cam has two can faces and rotates in a single direction. A distance from the rotation center of the cam to one of the two cam faces gradually increases in the direction of rotation of the cam while a distance from the rotation center of the cam to the other one of the two cam faces gradually decreases in the direction of rotation of the cam. Therefore, a range to secure each of the two cam faces is limited to at most half a round of the cam in the direction of rotation of the cam. Therefore, a lower gradient of the cam face reduces a maximum difference of the gradient, generating an insufficient distance for the contact-separation member to approach and separate from the opposed member.

Thus, the typical configuration has a difficulty in decreasing the gradient of the cam face while securing a sufficient distance between the contact-separation member and the opposed member.

By contrast, in the present embodiment, the cam 41 rotates in opposite directions and has the single, common cam face 41a that moves the pressure lever 31 downwards and upwards. Therefore, the cam face 41a is provided over a range greater than half a round of rotation in the direction of rotation of the cam 41. With such a configuration, if the gradient of the cam face 41a is reduced, the maximum difference of the gradient is not reduced. That is, a sufficient distance is secured for the pressure roller 19 to approach and separate from the fixing roller 18. In addition, a reduced gradient of the cam face 41a suppresses an increase in torque and prevents operating noises.

Now, a description is given of how to control rotation of the cam 41.

Referring now to FIGS. 8A through 13B, a description is given of how to control rotation of the cam 41 to relieve pressure.

Figures 8A, 8B, 8C, 8D:
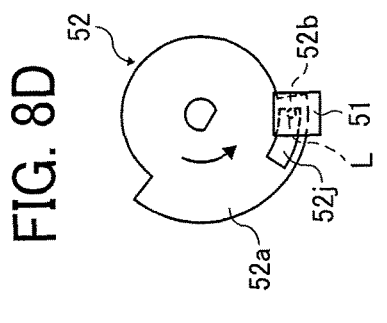
FIG. 8A is a schematic view of the light shield and the optical sensor, illustrating a position of the light shield before starting rotation and when the optical sensor is in a light interception state.
FIG. 8B is a schematic view of the light shield and the optical sensor, illustrating a position of the light shield after starting rotation and when the optical sensor enters a light transmission state.
FIG. 8C is a schematic view of the light shield and the optical sensor, illustrating a position of the light shield when the optical sensor enters the light interception state.
FIG. 8D is a schematic view of the light shield and the optical sensor, illustrating a position of the light shield when the optical sensor enters the light transmission state.
Figures 9A, 9B, 9C, 9D:
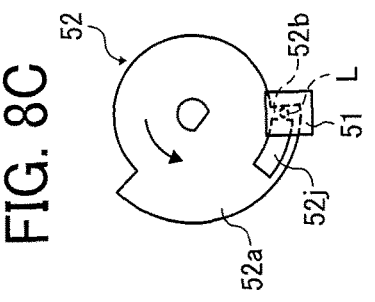
FIG. 9A is a schematic view of the cam and a cam receiver, illustrating relative positions thereof when the light shield is positioned as illustrated in FIG. 8A.
FIG. 9B is a schematic view of the cam and the cam receiver, illustrating relative positions thereof when the light shield is positioned as illustrated in FIG. 8B.
FIG. 9C is a schematic view of the cam and the cam receiver, illustrating relative positions thereof when the light shield is positioned as illustrated in FIG. 8C.
FIG. 9D is a schematic view of the cam and the cam receiver, illustrating relative positions thereof when the light shield is positioned as illustrated in FIG. 8D.
Figure 10:
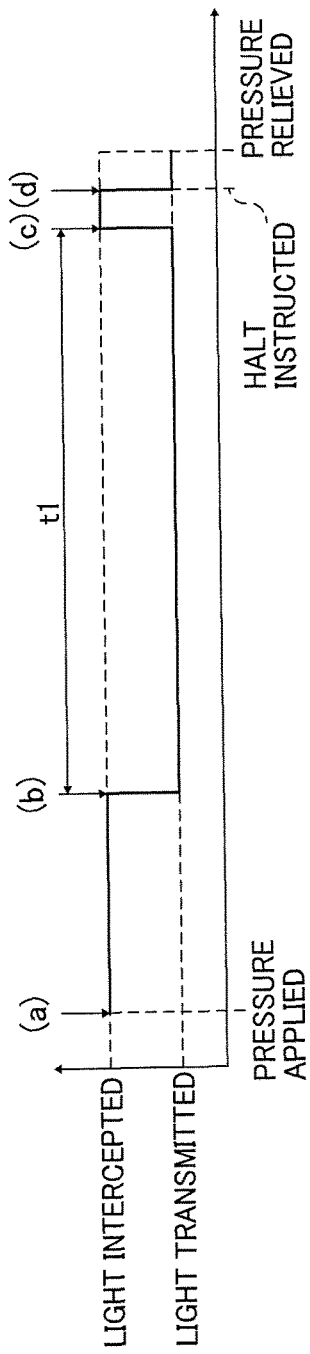
FIG. 10 is a timing chart of interception and transmission of light emitted by the optical sensor.
Figure 11:
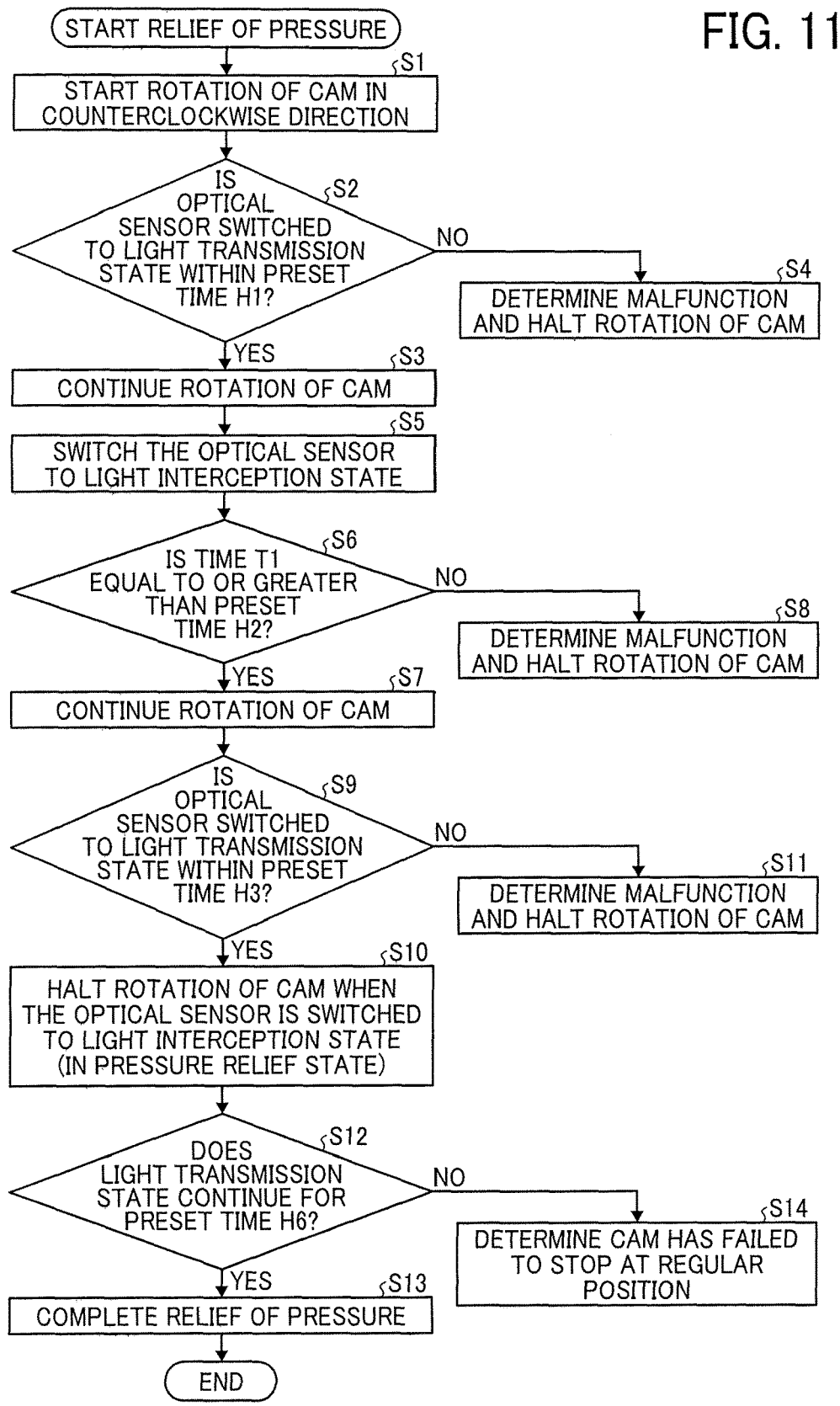
FIG. 11 is a flowchart of control of rotation to relieve pressure.
Figure 12:
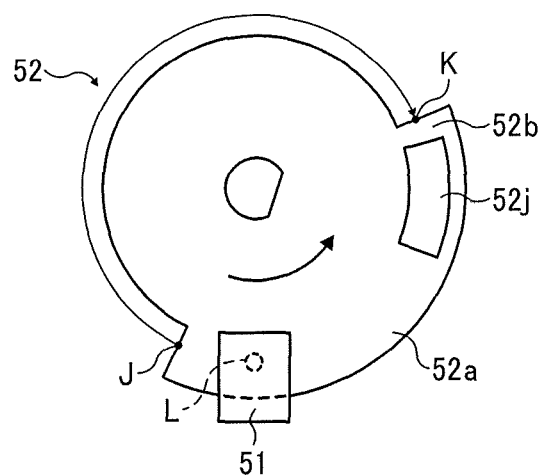
FIG. 12 is a schematic view of the light shield and the optical sensor, particularly illustrating a portion of the light shield that switches the optical sensor between the light transmission state and the light interception state while rotating.
Figure 13A:
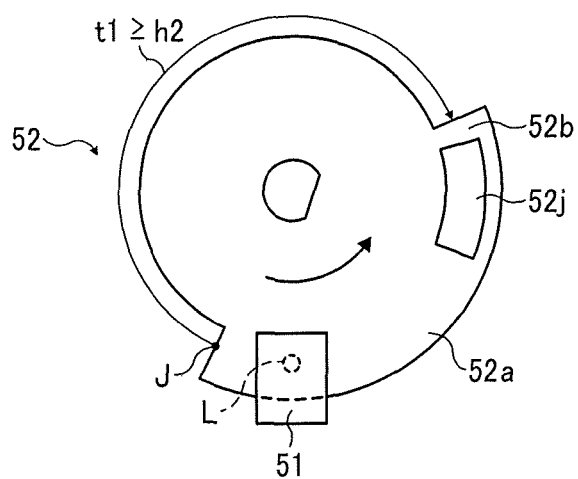
FIG. 13A is a schematic view of the light shield at a regular home position to start relieving pressure.
Figure 13B:
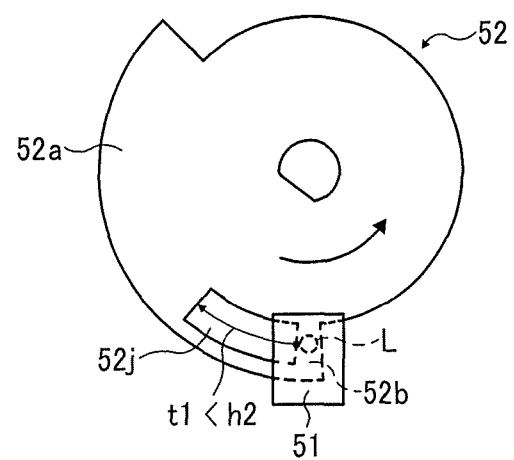
FIG. 13B is a schematic view of the light shield at an irregular home position to start relieving pressure.

FIGS. 8A through 10 illustrate how the rotation of the cam 41 is controlled to relieve pressure. Specifically, FIGS. 8A through 8D illustrate rotational positions of the light shield 52. FIGS. 9A through 9D illustrate rotational positions of the cam 41. More specifically, FIG. 8A is a schematic view of the light shield 52 and the optical sensor 51, illustrating a position of the light shield 52 before starting rotation and when the optical sensor 51 in a light interception state. FIG. 8B is a schematic view of the light shield 52 and the optical sensor 51, illustrating a position of the light shield 52 after starting rotation and when the optical sensor 51 enters a light transmission state. FIG. 8C is a schematic view of the light shield 52 and the optical sensor 51, illustrating a position of the light shield 52 when the optical sensor 51 enters the light interception state. FIG. 8D is a schematic view of the light shield 52 and the optical sensor 51, illustrating a position of the light shield 52 when the optical sensor 51 enters the light transmission state. FIG. 9A is a schematic view of the cam 41 and the cam receiver 31d, illustrating relative positions thereof when the light shield 52 is positioned as illustrated in FIG. 8A. FIG. 9B is a schematic view of the cam 41 and the cam receiver 31d, illustrating relative positions thereof when the light shield 52 is positioned as illustrated in FIG. 8B. FIG. 9C is a schematic view of the cam 41 and the cam receiver 31d, illustrating relative positions thereof when the light shield 52 is positioned as illustrated in FIG. 8C. FIG. 9D is a schematic view of the cam 41 and the cam receiver 31d, illustrating relative positions thereof when the light shield 52 is positioned as illustrated in FIG. 8D. FIG. 10 is a timing chart of interception and transmission of the light emitted by the optical sensor 51. FIG. 10 illustrates states (a), (b), (c), and (d). In the state (a), the light shield 52 is positioned as illustrated in FIG. 8A while the cam 41 is positioned as illustrated in FIG. 9A. Similarly, in the state (b), the light shield 52 is positioned as illustrated in FIG. 8B while the cam 41 is positioned as illustrated in FIG. 9B. In the state (c), the light shield 52 is positioned as illustrated in FIG. 8C while the cam 41 is positioned as illustrated in FIG. 9C. In the state (d), the light shield 52 is positioned as illustrated in FIG. 8D while the cam 41 is positioned as illustrated in FIG. 9D. FIG. 11 is a flowchart of control of rotation to relieve pressure. FIG. 12 is a schematic view of the light shield 52 and the optical sensor 51, particularly illustrating a portion of the light shield 52 that switches the optical sensor 51 between the light transmission state and the light interception state while rotating. FIG. 13A is a schematic view of the light shield 52 at a regular home position to start relieving pressure. FIG. 13B is a schematic view of the light shield 52 at an irregular home position to start relieving pressure.

The state (a) of FIG. 10 represents a normal pressure applying state in which the cam receiver 31d of the pressure lever 31 contacts the cam face 41a at the minimum point e1 as illustrated in FIG. 9A, thereby pressing the pressure roller 19 against the fixing roller 18 with the normal pressure. In the normal pressure applying state, the optical sensor 51 is in the light interception state in which the long light shield portion 52a is located overlapping the light emitting portion L of the optical sensor 51 to intercept the light from the optical sensor 51.

When the controller 60 outputs a direction to rotate the cam 41 to relieve pressure from the normal pressure applying state, the motor 43 is activated to drive and rotate the cam 41 in a counterclockwise direction (hereinafter referred to as a positive direction) as illustrated in FIG. 9B (in step S1 of FIG. 11). Accordingly, the cam 41 presses and moves the cam receiver 31d downwards in FIG. 9B.

In association with rotation of the cam 41, the light shield 52 starts rotating in the same direction, that is, the positive direction. Normally, after the light shield 52 starts rotating, a trailing end J, illustrated in FIG. 12, of the long light shield portion 52a in the direction of rotation of the light shield 52 passes before the light emitting portion L, thereby switching the optical sensor 51 to the light transmission state as illustrated in FIG. 8B.

However, if malfunction such as abnormal rotation of the light shield 52 occurs, the optical sensor 51 may fail to be switched to the light transmission state illustrated in FIG. 8B. To address this circumstance, the controller 60 determines whether the optical sensor 51 is switched to the light transmission state of FIG. 8B within a preset time h1 from when the cam 41 starts rotating (in step S2 of FIG. 11). Note that, in the present embodiment, the preset time h1 is a sum of a preset time T, illustrated in FIG. 16, of the timer 70 described later and a grace time α.

If the controller 60 determines that the optical sensor 51 is switched to the light transmission state within the preset time h1 (YES in step S2 of FIG. 11), then, the controller 60 determines that there is no malfunction, and continues rotation of the cam 41 (in step S3 of FIG. 11). By contrast, if the controller 60 determines that the optical sensor 51 is not switched to the light transmission state within the preset time h1 (NO in step S2 of FIG. 11), for example, if the optical sensor 51 is not switched to the light transmission state even after the preset time h1 elapses, then, the controller 60 determines that there is a malfunction, and halts rotation of the cam 41 so as not to continue the rotation of the cam 41 (in step S4 of FIG. 11). If the rotation of the cam 41 is continued (in step S3 of FIG. 11), the light transmission state continues for a while. Meanwhile, the rotation of the cam 41 further presses and moves the cam receiver 31*d* downwards.

Thereafter, as illustrated in FIG. 8C, when a leading end K, illustrated in FIG. 12, of the short light shield portion 52*b* in the direction of rotation of the light shield 52 reaches the light emitting portion L as the light shield 52 rotates, the optical sensor 51 enters or is switched to the light interception state (in step S5 of FIG. 11). At this time, the controller 60 calculates a time t1 illustrated in FIG. 10, and determines whether the time t1 is equal to or greater than a preset time h2 (in step S6 of FIG. 11). The time t1 is a period of time from when the optical sensor 51 is switched to the light transmission state of FIG. 8B until when the optical sensor 51 is switched to the light interception state of FIG. 8C. The preset time h2 is an assumed, normal time from when the optical sensor 51 is switched to the light transmission state of FIG. 8B until when the optical sensor 51 is switched to the light interception state of FIG. 8C. That is, the present time h2 is an assumed period of time during which a portion between the trailing end J and the leading end K passes before the light emitting portion L. Specifically, as illustrated in FIG. 12, the portion is from the trailing end J of the long light shield portion 52*a* in the direction of rotation of the light shield 52 to the leading end K of the short light shield portion 52*b* in the direction of rotation of the light shield 52, in a direction opposite the direction of rotation of the light shield 52.

Referring back to the flow of FIG. 11, if the controller 60 determines that the preset time t1 is equal to or greater than the preset time h2 (YES in step S6 of FIG. 11), then, the controller 60 continues rotation of the cam 41 (in step S7 of FIG. 11). By contrast, if the controller 60 determines that the preset time t1 is less than the preset time h2 (NO in step S6 of FIG. 11), then, the controller 60 determines that there is a malfunction, specifically, the controller 60 determines that the light shield 52 is at an irregular rotational position, and halts rotation of the cam 41 (in step S8 of FIG. 11).

More specifically, such a malfunction may occur when the pressure relief operation has started with the light shield 52 not positioned at the regular home position where the long light shield portion 52*a* is located overlapping the light emitting portion L as illustrated in FIG. 13A. For example, such a malfunction may occur when the pressure relief operation has started with the short light shield portion 52*b* located overlapping the light emitting portion L as illustrated in FIG. 13B. In the case of FIG. 13B, the time t1 from when the optical sensor 51 is switched to the light transmission state until when the optical sensor 51 is switched to the light interception state corresponds to a period of time during which the light transmission portion 52*j* passes before the light emitting portion L. Therefore, the time t1 is less than the preset time h2. In other words, a relation of t1<h2 is satisfied as illustrated in FIG. 13B. Note that, to address such a malfunction occurs due to an irregular home position of the light shield 52 as described above, the image forming apparatus 100 may be turned off temporarily, for example. When the image forming apparatus 100 is turned on again, the light shield 52 is moved back to the regular home position illustrated in FIG. 13A to resume relief of pressure so as to satisfy a relation of t1≥h2 as illustrated in FIG. 13A.

If the rotation of the cam 41 is continued from the state illustrated in FIG. 9C, normally, immediately thereafter, a trailing end of the short light shield portion 52*b* in the direction of rotation of the light shield 52 passes before the light emitting portion L as illustrated in FIG. 8D. That is, the optical sensor 51 enters the light transmission state again.

Here, again, the controller 60 determines whether there is a malfunction in, e.g., rotation of the light shield 52. Specifically, the controller 60 determines whether the optical sensor 51 is switched from the light interception state of FIG. 8C to the light transmission state of FIG. 8D within a preset time h3 (in step S9 of FIG. 11). Note that, in the present embodiment, the preset time h3 is equal to the time h1 (i.e., T+α).

If the controller 60 determines that the optical sensor 51 is switched to the light transmission state within the preset time h3 (YES in step S9 of FIG. 11), then, the controller 60 determines that there is no malfunction, and outputs a direction to halt rotation of the cam 41 at the time when the optical sensor 51 detects a shift to the light transmission state (in step S10 of FIG. 11). According to the direction from the controller 60, the motor 43 is deactivated to halt rotation of the cam 41. By contrast, if the controller 60 determines that the optical sensor 51 is not switched to the light transmission state within the preset time h3, for example, if the optical sensor 51 is not switched to the light transmission state even after the preset time h3 elapses, then, the controller 60 determines that there is a malfunction, and halts rotation of the cam 41 so as not to continue the rotation of the cam 41 (in step S11 of FIG. 11).

Note that there is a slight time difference between when the controller 60 outputs the direction to halt rotation of the cam 41 and when the cam 41 stops rotating. If, by any chance, the motor 43 rotates at an increased speed due to changes in current value of the motor 43, torque of the cam 41, or any other disturbance, the cam 41 might fail to stop at a regular position and continue rotating beyond the regular position in the pressure relief state illustrated in FIG. 8D, thereby being shifted to the pressure applying state. To address this circumstance, in the present embodiment, the controller 60 determines whether there is such a malfunction or not. Specifically, the controller 60 confirms whether the light transmission state continues for a preset time h6 after the controller 60 outputs the direction to halt rotation of the cam 41 (in step S12 of FIG. 11).

If the light transmission state continues for the preset time h6, the controller 60 determines that there is no malfunction, and completes relief of pressure (in step S13 of FIG. 11). By contrast, if the light transmission state does not continue for the preset time h6, the controller 60 determines that there is a malfunction, specifically, the controller 60 determines that the cam 41 has failed to stop at the regular position (in step S14 of FIG. 11). Specifically, in this case, as the motor 43 rotating at an increased speed, the light shield 52 rotates in the counterclockwise direction beyond the position of the light shield 52 of FIG. 8D that illustrates the optical sensor 51 in the light transmission state. As a consequence, the long light shield portion 52*a* overlaps the light emitting portion L within the preset time h6. That is, the optical sensor 51 enters the light interception state within the preset time h6. In other words, the cam 41 may have failed to stop at the regular position and continue rotating beyond the regular position, thereby being shifted to the pressure applying state. Therefore, if the light transmission state does not continue for the preset time h6, the controller 60 may output a warning signal that indicates the malfunction, or may repeat the pressure relief operation, for example.

Referring now to FIGS. 14A through 18B, a description is given of how to control rotation of the cam 41 to apply pressure.

Figure 17:
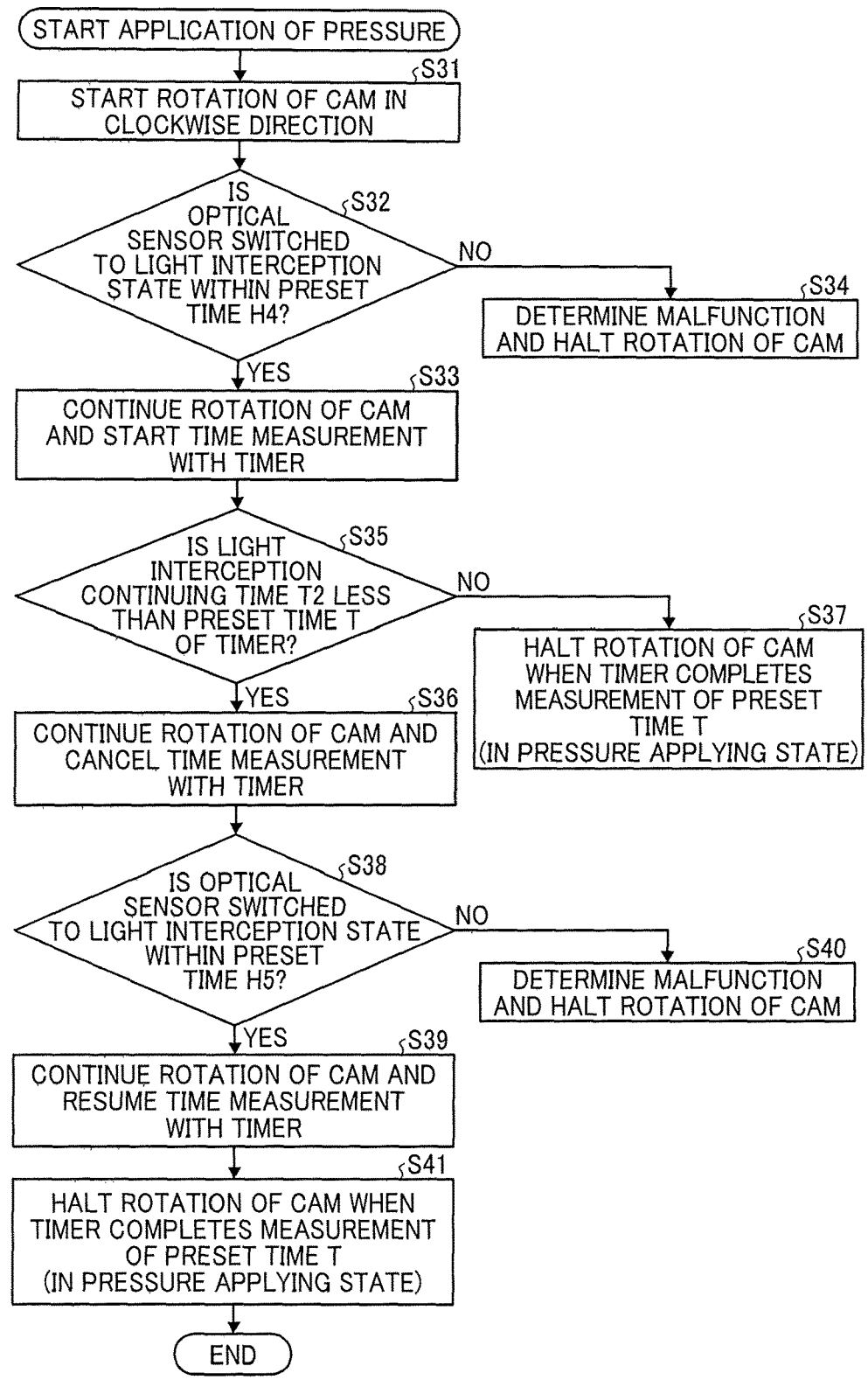
FIG. 17 is a flowchart of control of rotation to apply pressure.
Figure 18A:
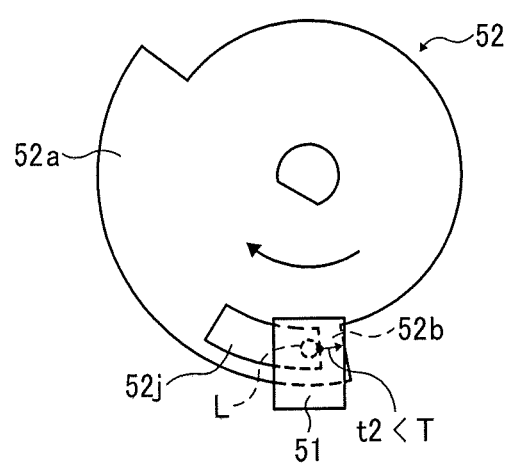
FIG. 18A is a schematic view of the light shield at a regular home position to start applying pressure.
Figure 18B:
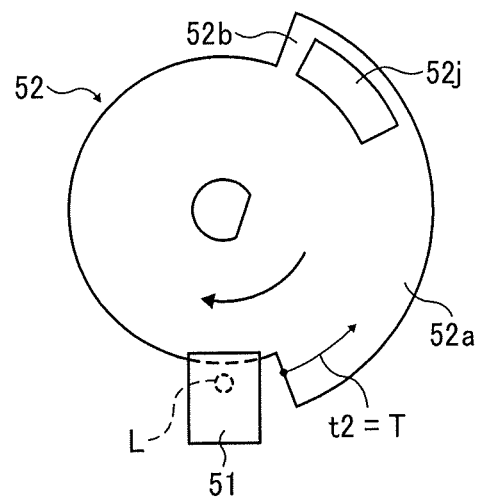
FIG. 18B is a schematic view of the light shield at an irregular home position to start applying pressure.

FIGS. 14A through 16 illustrate how the rotation of the cam 41 is controlled to apply pressure. Specifically, FIGS. 14A through 14E illustrate rotational positions of the light shield 52. FIGS. 15A through 15E illustrate rotational positions of the cam 41. More specifically, FIG. 14A is a schematic view of the light shield 52 and the optical sensor 51, illustrating a position of the light shield 52 before starting rotation and when the optical sensor 51 in the light transmission state. FIG. 14B is a schematic view of the light shield 52 and the optical sensor 51, illustrating a position of the light shield 52 after starting rotation and when the optical sensor 51 enters the light interception state. FIG. 14C is a schematic view of the light shield 52 and the optical sensor 51, illustrating a position of the light shield 52 when the optical sensor 51 enters the light transmission state. FIG. 14D is a schematic view of the light shield 52 and the optical sensor 51, illustrating a position of the light shield 52 when the optical sensor 51 enters the light interception state. FIG. 14E is a schematic view of the light shield 52 and the optical sensor 51, illustrating a position of the light shield 52 when the timer 70 completes measurement of a preset time T. FIG. 15A is a schematic view of the cam 41 and the cam receiver 31d, illustrating relative positions thereof when the light shield 52 is positioned as illustrated in FIG. 14A. FIG. 15B is a schematic view of the cam 41 and the cam receiver 31d, illustrating relative positions thereof when the light shield 52 is positioned as illustrated in FIG. 14B. FIG. 15C is a schematic view of the cam 41 and the cam receiver 31d, illustrating relative positions thereof when the light shield 52 is positioned as illustrated in FIG. 14C. FIG. 15D is a schematic view of the cam 41 and the cam receiver 31d, illustrating relative positions thereof when the light shield 52 is positioned as illustrated in FIG. 14D. FIG. 15E is a schematic view of the cam 41 and the cam receiver 31d, illustrating relative positions thereof when the light shield 52 is positioned as illustrated in FIG. 14E. FIG. 16 is a timing chart of interception and transmission of the light emitted by the optical sensor 51. FIG. 16 illustrates states (a), (b), (c), (d), and (e). In the state (a), the light shield 52 is positioned as illustrated in FIG. 14A while the cam 41 is positioned as illustrated in FIG. 15A. Similarly, in the state (b), the light shield 52 is positioned as illustrated in FIG. 14B while the cam 41 is positioned as illustrated in FIG. 15B. In the state (c), the light shield 52 is positioned as illustrated in FIG. 14C while the cam 41 is positioned as illustrated in FIG. 15C. In the state (d), the light shield 52 is positioned as illustrated in FIG. 14D while the cam 41 is positioned as illustrated in FIG. 15D. In the state (e), the light shield 52 is positioned as illustrated in FIG. 14E while the cam 41 is positioned as illustrated in FIG. 15E. FIG. 17 is a flowchart of control of rotation to apply pressure. FIG. 18A is a schematic view of the light shield 52 at a regular home position to start applying pressure. FIG. 18B is a schematic view of the light shield 52 at an irregular home position to start applying pressure.

The state (a) of FIG. 16 represents the pressure relief state in which the pressure roller 19 is apart from the fixing roller 18. According to the control described above to relieve pressure, rotation of the cam 41 and the light shield 52 are halted normally. Accordingly, the cam 41 and the light shield 52 stop at regular positions illustrated in FIGS. 14A and 15A, respectively. That is, in the pressure relief state, the cam receiver 31d of the pressure lever 31 contacts the cam face 41a at the maximum point e2 as illustrated in FIG. 15A. The optical sensor 51 is in the light transmission state in which the light transmission portion 52j is located overlapping the light emitting portion L of the optical sensor 51 to transmit the light from the optical sensor 51.

When the controller 60 outputs a direction to rotate the cam 41 to apply pressure from the pressure relief state (i.e., shift from the pressure relief state to the normal pressure applying state), the motor 43 is activated to drive and rotate the cam 41 in a clockwise direction (hereinafter referred to as a negative direction) as illustrated in FIG. 15B (in step S31 of FIG. 17). Contrary to the rotation of the cam 41 that presses and moves the cam receiver 31d downwards in FIG. 9B in the pressure relief operation described above, the rotation of the cam 41 causes a biasing force of the pressure spring 32 to pull the cam receiver 31d upwards in FIG. 15B in the present pressure applying operation.

On the other hand, in association with the rotation of the cam 41, the light shield 52 starts rotating in the same direction, that is, the negative direction. Normally, immediately after the light shield 52 starts rotating, a leading end of the short light shield portion 52b in the direction of rotation of the light shield 52 overlaps the light emitting portion L, thereby switching the optical sensor 51 to the light interception state as illustrated in FIG. 14B.

To confirm that there is no malfunction in, e.g., rotation of the light shield 52, the controller 60 determines whether the optical sensor 51 is switched to the light interception state of FIG. 14B within a preset time h4 from when the cam 41 starts rotating (in step S32 of FIG. 17). Note that, in the present embodiment, the preset time h4 is duration of one rotation of the cam 41.

If the controller 60 determines that the optical sensor 51 is switched to the light interception state within the preset time h4 (YES in step S32 of FIG. 17), then, the controller 60 determines that there is no malfunction, and continues rotation of the cam 41 while the timer 70 starts time measurement at the time when the optical sensor 51 detects a shift to the light interception state (in step S33 of FIG. 17). By contrast, if the controller 60 determines that the optical sensor 51 is not switched to the light interception state within the preset time h4 (NO in step S32 of FIG. 17), for example, if the optical sensor 51 is not switched to the light interception state even after the preset time h4 elapses, then, the controller 60 determines that there is a malfunction, and halts rotation of the cam 41 so as not to continue the rotation of the cam 41 (in step S34 of FIG. 17).

Note that the time measured by the timer 70 is preset. Specifically, the timer 70 measures the preset time T. When the timer 70 completes measurement of the preset time T, the controller 60 outputs a signal to halt rotation of the cam 41. The timer 70 continues measuring time while the optical sensor 51 is in the light interception state. However, if the optical sensor 51 is switched to the light transmission state from the light interception state before the timer 70 completes time measurement, then, the controller 60 cancels the time measurement with the timer 70 before the timer 70 completes the time measurement.

Relative to the timer 70 thus set, the short light shield portion 52b is formed such that a period of time during which the short light shield portion 52b passes before the light emitting portion L as the light shield 52 rotates is less than the preset time T of the timer 70. That is, in the present embodiment, a light interception continuing time t2 illustrated in FIG. 16 is less than the preset time T of the timer 70 because, normally, the short light shield portion 52*b* passes before the light emitting portion L, as illustrated in FIG. 14C, shortly after the optical sensor 51 is switched to the light interception state of FIG. 14B. However, if any malfunction occurs, the light interception continuing time t2 may become greater than the preset time T of the timer 70.

To address this circumstance, in the present embodiment, the controller 60 determines whether the light interception continuing time t2 is less than the preset time T of the timer 70 (in step S35 of FIG. 17). If the controller 60 determines that the light interception continuing time t2 is less than the preset time T of the timer 70 (YES in step S35 of FIG. 17), then, the controller 60 determines that there is no malfunction, and continues rotation of the cam 41 (in step S36 of FIG. 17). In this case, the optical sensor 51 is switched to the light transmission state before the timer 70 completes the measurement of the preset time T. Accordingly, as described above, the controller 60 cancels the time measurement with the timer 70 before the timer 70 completes the time measurement (in step S36 of FIG. 17).

By contrast, if the controller 60 determines that the light interception continuing time t2 is not less than the preset time T of the timer 70 (NO in step S35 of FIG. 17), for example, if the light interception continuing time t2 continues for the preset time T of the timer 70, the pressure applying operation may have started with the light shield 52 not positioned at a regular home position illustrated in FIG. 18A. In other words, the pressure applying operation may have started with the light shield 52 positioned at an irregular position, as illustrated in FIG. 18B, for example. In this case, instead of the short light shield portion 52*b*, the long light shield portion 52*a* passes before the light emitting portion L.

The long light shield portion 52*a* is formed such that a period of time during which the long light shield portion 52*a* passes before the light emitting portion L as the light shield 52 rotates is greater than the preset time T of the timer 70. Accordingly, the long light shield portion 52*a* continues intercepting the light from the optical sensor 51 during the time measurement with the timer 70. Therefore, when the timer 70 completes measurement of the preset time T, the controller 60 outputs a signal to halt rotation of the cam 41, thereby halting rotation of the cam 41 (in step S37 of FIG. 17). In this case, as a consequence, the cam 41 stops at the regular position (in pressure applying state).

As described above, if the controller 60 cancels the time measurement with the timer 70 as the short light shield portion 52*b* passes before the light emitting portion L, the light transmission state continues for a while. Meanwhile, the rotation of the cam 41 further pulls the cam receiver 31*d* upwards. Thereafter, normally, a leading end of the long light shield portion 52*a* in the direction of rotation of the light shield 52 reaches the light emitting portion L, thereby switching the optical sensor 51 to the light interception state as illustrated in FIG. 14D.

Here, again, to confirm that there is no malfunction in, e.g., rotation of the light shield 52, the controller 60 determines whether the optical sensor 51 is switched from the light transmission state of FIG. 14C to the light interception state of FIG. 14D within a preset time h5 (in step S38 of FIG. 17). Note that, in the present embodiment, the preset time h5 is the duration of one rotation of the cam 41, like the preset time h4.

If the controller 60 determines that the optical sensor 51 is switched to the light interception state within the preset time h5 (YES in step S38 of FIG. 17), then, the controller 60 determines that there is no malfunction, and continues rotation of the cam 41 while the timer 70 resumes time measurement from the beginning, at the time when the optical sensor 51 detects a shift to the light interception state (in step S39 of FIG. 17). By contrast, if the controller 60 determines that the optical sensor 51 is not switched to the light interception state within the preset time h5 (NO in step S38 of FIG. 17), for example, if the optical sensor 51 is not switched to the light interception state even after the preset time h5 elapses, then, the controller 60 determines that there is a malfunction, and halts rotation of the cam 41 so as not to continue the rotation of the cam 41 (in step S40 of FIG. 17).

If the cam 41 continues rotating and the timer 70 resumes time measurement from the beginning, the long light shield portion 52*a* continues intercepting the light from the optical sensor 51. That is, the light interception state continues during the time measurement with the timer 70. As a consequence, the controller 60 outputs a signal to halt rotation of the cam 41 when the timer 70 completes measurement of the preset time T, as illustrated in FIG. 15E (in step S41 of FIG. 17). According to the signal from the controller 60, the motor 43 is deactivated to completely halt rotation of the cam 41. Accordingly, the pressure roller 19 is held in the normal pressure applying state in which the pressure roller 19 is adjacent to the fixing roller 18. Thus, the pressure applying operation is completed.

As described above, in the present embodiment, the controller 60 halts rotation of the cam 41 based on a detection timing of the optical sensor 51, that is, the time when the optical sensor 51 detects the light interception state (in step S10 of FIG. 11) in the pressure relief operation. By contrast, the controller 60 halts rotation of the cam 41 based on a measurement timing of the timer 70, that is, the time when the timer 70 completes measurement of the preset time T (in step S41 of FIG. 17) in the pressure applying operation. In other words, according to the present embodiment, the optical sensor 51 serves as a timing determiner for the controller 60 to control a position of the cam 41 at which the cam 41 stops in the pressure relief operation. By contrast, the timer 70 serves as a timing determiner for the controller 60 to control the position of the cam 41 at which the cam 41 stops in the pressure applying operation. Typically, if a controller is configured to control rotation of a cam based on detection of a position of the cam in both the pressure relief operation and the pressure applying operation, two optical sensors may be provided to detect the position of the cam. For example, a first optical sensor may detect a rotational position of the cam in the pressure relief operation. A second optical sensor may detect a rotational position of the cam in the pressure applying operation. Hence, by controlling the rotation of the cam based on time measurement with a timer in one of the pressure relief operation and the pressure applying operation, as described above in the present embodiment, one of the first and second optical sensors is rendered unnecessary. As a consequence, production cost is reduced and the contact-separation mechanism is downsized compared to a contact-separation mechanism incorporating two optical sensors.

As described above, in the present embodiment, the motor 43 that drives and rotates the cam 41 is a relatively small, inexpensive brushed DC motor, which is advantageous to reduce production cost and downsizing the contact-separation mechanism. However, typically, use of such a brushed DC motor may increase a torque while a pressure roller approaches a pressure relief position in a pressure relief operation in which a cam presses and moves a pressure lever. As a consequence, the number of rotations of the motor may vary. To address this circumstance, in the present embodiment, the controller 60 halts rotation of the cam 41 based on the detection timing of the optical sensor 51 in the pressure relief operation to prevent variation in the number of rotations of the motor 43 from affecting the position of the cam 41 at which the cam 41 stops rotating. By detecting a rotational position of the light shield 52 with the optical sensor 51, the cam 41 is ensured to stop at a predetermined rotational position (i.e., regular position). That is, the present embodiment enhances accuracy in halting rotation of the cam 41 at a desired position.

By contrast, in a pressure applying operation, the cam does not press or move the pressure lever, reducing variation in the number of rotations of the motor due to an increase in torque. Therefore, in the present embodiment, the controller 60 controls the rotational position of the cam with the timer 70, instead of the optical sensor 51, in the pressure applying operation. Although the cam does not press or move the pressure lever in the pressure applying operation, the pressure lever gives the cam a force in a direction to accelerate rotation of the cam when a pressure force from the cam is released. As a consequence, changes in the rotational speed of the cam may vary the position of the cam at which the cam stops rotating in the pressure applying operation in which the rotation of the cam is controlled based on time measurement with a timer. To address this circumstance, in the present embodiment, the first worm gear 45 and the second worm gear 46, illustrated in FIG. 4, are employed as driving force transmitters to transmit a rotational driving force to the cam 41. Generally, worm gears have a self-locking function that prevents an input-side gear from rotating when a rotational force is inputted from an output-side gear. Accordingly, if a force is applied to accelerate rotation of the cam 41, the self-locking function of the first worm gear 45 and the second worm gear 46 prevents the rotation of the cam 41 from being accelerated. In other words, the first worm gear 45 and the second worm gear 46 reduce changes in the rotational speed of the cam 41, thereby suppressing variation in the position of the cam 41 at which the cam 41 stops rotating. That is, the present embodiment enhances accuracy in halting rotation of the cam 41 at a desired position. Although acceleration of rotation generally increases the operating noises, such operating noises are reduced in the present embodiment because the rotation of the cam 41 is prevented from being accelerated.

Generally, time measurement with a timer may slightly vary. Such variation increases as the timer measures a longer time. To reduce such variation, the time to be measured is preferably as short as possible. To shorten the time to be measured with the timer in the pressure applying operation, in the present embodiment, the light shield 52 includes the short light shield portion 52b so that the controller 60 cancels time measurement with the timer 70 that is started at the time when the short light shield portion 52b intercepts the light from the optical sensor 51. That is, after the timer 70 starts time measurement at the time when the short light shield portion 52b intercepts the light, the controller 60 cancels the time measurement with the timer 70 before the timer 70 completes the time measurement. Thereafter, the timer 70 measures time from the time when the long light shield portion 52a starts intercepting the light from the optical sensor 51 until the time when the light shield 52 stops rotating. In short, the timer 70 does not continue measuring time from when the short light shield portion 52b intercepts the light until when the long light shield portion 52a intercepts the light. Accordingly, the time to be measured is shortened in the present embodiment, compared to a configuration in which a timer measures time from the time when a light shield initiates interception of light until the time when the light shield stops rotating. As a consequence, variation in time measurement with the timer 70 is reduced, enhancing accuracy in controlling the rotational position of the cam 41.

Figure 19:
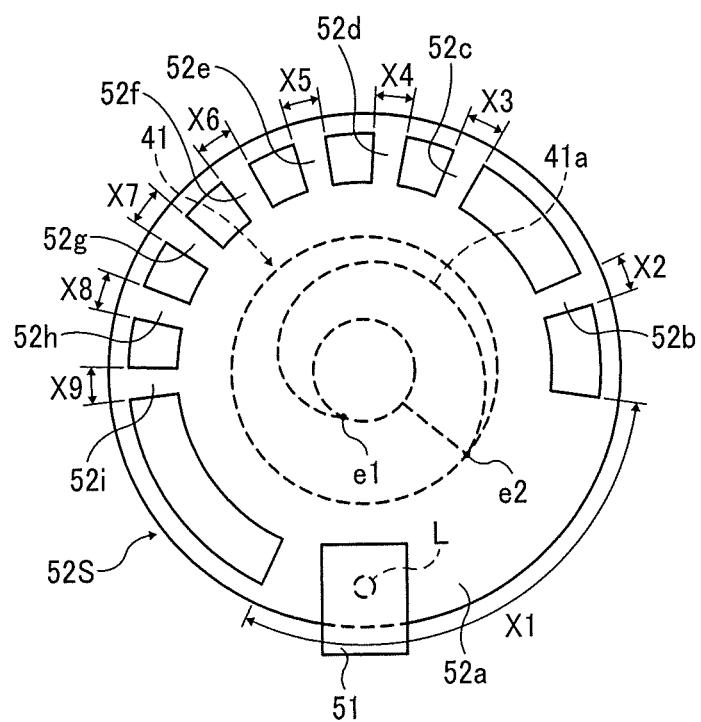
FIG. 19 is a schematic view of a light shield according to another embodiment of the present disclosure.

Referring now to FIG. 19, a description is given of a light shield 52S according to another embodiment of the present disclosure.

FIG. 19 is a schematic view of the light shield 52S.

The light shield 52S of FIG. 19 includes a plurality of short light shield portions along a direction of rotation of the light shield 52S. Specifically, the light shield 52S includes short light shield portions 52b, 52c, 52d, 52e, 52f, 52g, 52h, and 52i serving as short detected portions. The short light shield portions 52b through 52i have lengths X2 through X9, respectively, in the direction of rotation of the light shield 52S. Like the embodiment described above, each of the lengths X2 through X9 is formed such that a period of time during which each of the short light shield portions 52b through 52i passes before the light emitting portion L as the light shield 52S rotates is less than the preset time T of the timer 70. By contrast, the length X1 of the long light shield portion 52a in the direction of rotation of the light shield 52S is formed such that a period of time during which the long light shield portion 52a passes before the light emitting portion L as the light shield 52S rotates is greater than the preset time T of the timer 70.

Referring now to FIGS. 20A through 25, a description is given of how to control rotation of the cam 41 with the light shield 52S.

Initially with reference to FIGS. 20A through 22, a description is given of how to control rotation of the cam 41 to relieve pressure.

FIGS. 20A through 22 illustrate how the rotation of the cam 41 is controlled to relieve pressure. Specifically, FIGS. 20A, 20B, 20C, 20D, 20L, and 20M illustrate rotational positions of the light shield 52S. FIGS. 21A, 21B, 21C, 21D, 21L, and 21M illustrate rotational positions of the cam 41. More specifically, FIG. 20A is a schematic view of the light shield 52S and the optical sensor 51, illustrating a position of the light shield 52S before starting rotation and when the optical sensor 51 is in the light interception state. FIG. 20B is a schematic view of the light shield 52S and the optical sensor 51, illustrating a position of the light shield 52S after starting rotation and when the optical sensor 51 enters the light transmission state. FIG. 20C is a schematic view of the light shield 52S and the optical sensor 51, illustrating a position of the light shield 52S when the optical sensor 51 enters the light interception state. FIG. 20D is a schematic view of the light shield 52S and the optical sensor 51, illustrating a position of the light shield 52S when the optical sensor 51 enters the light transmission state. FIG. 20L is a schematic view of the light shield 52S and the optical sensor 51, illustrating a position of the light shield 52S when the optical sensor 51 enters the light interception state. FIG. 20M is a schematic view of the light shield 52S and the optical sensor 51, illustrating a position of the light shield 52S when the optical sensor 51 enters the light transmission state. FIG. 21A is a schematic view of the cam 41 and the cam receiver 31d, illustrating relative positions thereof when the light shield 52S is positioned as illustrated in FIG. 20A. FIG. 21B is a schematic view of the cam 41 and the cam receiver 31d, illustrating relative positions thereof when the light shield 52S is positioned as illustrated in FIG. 20B. FIG.

21C is a schematic view of the cam 41 and the cam receiver 31*d*, illustrating relative positions thereof when the light shield 52S is positioned as illustrated in FIG. 20C. FIG. 21D is a schematic view of the cam 41 and the cam receiver 31*d*, illustrating relative positions thereof when the light shield 52S is positioned as illustrated in FIG. 20D. FIG. 21L is a schematic view of the cam 41 and the cam receiver 31*d*, illustrating relative positions thereof when the light shield 52S is positioned as illustrated in FIG. 20L. FIG. 21M is a schematic view of the cam 41 and the cam receiver 31*d*, illustrating relative positions thereof when the light shield 52S is positioned as illustrated in FIG. 20M. FIG. 22 is a timing chart of interception and transmission of the light emitted by the optical sensor 51. FIG. 22 illustrates states (a) through (m). In the states (a) through (d), the light shield 52S is positioned as illustrated in FIGS. 20A through 20D, respectively, while the cam 41 is positioned as illustrated in FIGS. 21A through 21D, respectively. Similarly, in the state (l) and (m), the light shield 52 is positioned as illustrated in FIGS. 20L and 20M, respectively, while the cam 41 is positioned as illustrated in FIGS. 21L and 21M, respectively.

As the cam 41 in the normal pressure applying state illustrated in FIG. 21A starts rotating in a counterclockwise direction (i.e., positive direction) in FIG. 21A, the cam 41 presses and moves the cam receiver 31*d* downwards as illustrated in FIG. 21B. At the same time, the light shield 52S starts rotating together with the cam 41 in the same direction (i.e., positive direction). As the light shield 52S rotates, the trailing end of the long light shield portion 52*a* in the direction of rotation of the light shield 52S passes before the light emitting portion L, thereby switching the optical sensor 51 from the light interception state to the light transmission state as illustrated in FIG. 20B.

Thereafter, as the light shield 52S rotates, the short light shield portion 52*b* reaches the light emitting portion L first, among the plurality of short light shield portions 52*b* though 52*i*, thereby switching the optical sensor 51 from the light transmission state to the light interception state as illustrated in FIG. 20C. After the short light shield portion 52*b* passes before the light emitting portion L, the optical sensor 51 enters the light transmission state as illustrated in FIG. 20D. Similarly, as the light shield 52S rotates, the short light shield portion 52*c* through 52*i* following the short light shield portion 52*b* pass before the light emitting portion L, thereby switching the optical sensor 51 between the light interception state and the light transmission state.

After the last short light shield portion (i.e., short light shield portion 52*i*) reaches and passes before the light emitting portion L as illustrated in FIG. 20L, the optical sensor 51 enters the light transmission state illustrated in FIG. 20M from the light interception state of FIG. 20L. At this time when the optical sensor 51 is switched from the light interception state to the light transmission state, the controller 60 outputs a direction to halt rotation of the cam 41. According to the direction, the cam 41 stops rotating to be in the pressure relief state in which the pressure roller 19 is apart from the fixing roller 18. In the present pressure relief operation, the controller 60 determines whether there is a malfunction in a flow similar to the flow described above with reference to the flow of FIG. 11. A redundant description thereof is herein omitted unless otherwise required.

As described above, in controlling the rotation of the cam 41 with the light shield 52S, the controller 60 outputs the direction to halt rotation of the cam 41 based on the time when the last short light shield portion (i.e., short light shield portion 52*i*) passes before the light emitting portion L and the optical sensor 51 enters the light transmission state.

Alternatively, the controller 60 may output the direction to halt rotation of the cam 41 based on the time when one of the other short light shield portions (i.e., short light shield portions 52*b* through 52*h*) passes before the light emitting portion L and the optical sensor 51 enters the light transmission state. In short, the controller 60 halts rotation of the cam 41 based on one of the states (d) through (k) other than the state (m) of FIG. 22, in which the optical sensor 51 enters the light transmission state.

Thus, the light shield 52S of the present embodiment includes a plurality of short light shield portions (i.e., short light shield portions 52*b* through 52*i*), one of which is selected to halt rotation of the cam 41. Specifically, the controller 60 halts rotation of the cam 41 at the time when a selected one of the plurality of short light shield portions 52*b* through 52*i* passes before the light emitting portion L, thereby switching the optical sensor 51 from the light interception state to the light transmission state. Such a configuration of the light shield 52S enhances fine adjustment of the position of the cam 41 at which the cam 41 stops rotating. As a consequence, the pressure at the fixing nip N becomes changeable in a plurality of levels.

Referring now to FIGS. 23A through 25, a description is given of how to control rotation of the cam 41 with the light shield 52S to apply pressure.

FIGS. 23A through 25 illustrate how the rotation of the cam 41 is controlled to apply pressure. Specifically, FIGS. 20A, 20B, 20C, 20K, and 20L illustrate rotational positions of the light shield 52S. FIGS. 21A, 21B, 21C, 21K, and 21L illustrate rotational positions of the cam 41. More specifically, FIG. 23A is a schematic view of the light shield 52S and the optical sensor 51, illustrating a position of the light shield 52S before starting rotation and when the optical sensor 51 is in the light transmission state. FIG. 23B is a schematic view of the light shield 52S and the optical sensor 51, illustrating a position of the light shield 52S after starting rotation and when the optical sensor 51 enters the light interception state. FIG. 23C is a schematic view of the light shield 52S and the optical sensor 51, illustrating a position of the light shield 52S when the optical sensor 51 enters the light transmission state. FIG. 23K is a schematic view of the light shield 52S and the optical sensor 51, illustrating a position of the light shield 52S when the optical sensor 51 enters the light interception state. FIG. 23L is a schematic view of the light shield 52S and the optical sensor 51, illustrating a position of the light shield 52S when the timer 70 completes measurement of the preset time T. FIG. 24A is a schematic view of the cam 41 and the cam receiver 31*d*, illustrating relative positions thereof when the light shield 52S is positioned as illustrated in FIG. 23A. FIG. 24B is a schematic view of the cam 41 and the cam receiver 31*d*, illustrating relative positions thereof when the light shield 52S is positioned as illustrated in FIG. 23B. FIG. 24C is a schematic view of the cam 41 and the cam receiver 31*d*, illustrating relative positions thereof when the light shield 52S is positioned as illustrated in FIG. 23C. FIG. 24K is a schematic view of the cam 41 and the cam receiver 31*d*, illustrating relative positions thereof when the light shield 52S is positioned as illustrated in FIG. 23K. FIG. 24L is a schematic view of the cam 41 and the cam receiver 31*d*, illustrating relative positions thereof when the light shield 52S is positioned as illustrated in FIG. 23L. FIG. 25 is a timing chart of interception and transmission of the light emitted by the optical sensor 51. FIG. 25 illustrates states (a) through (l). In the states (a) through (c), the light shield 52 is positioned as illustrated in FIGS. 23A through 23C, respectively, while the cam 41 is positioned as illustrated in FIGS. 24A through 24C, respectively. Similarly, in the states (k) and (l), the light shield 52 is positioned as illustrated in FIGS. 23K and 23L, respectively, while the cam 41 is positioned as illustrated in FIGS. 24K and 24L, respectively.

As the cam 41 in the pressure relief state illustrated in FIG. 23A starts rotating in a clockwise direction (i.e., negative direction) in FIG. 23A, the biasing force of the pressure spring 32 pulls the cam receiver 31d upwards in FIG. 24B, contrary to the pressure relief operation in which the cam receiver 31d is pressed downwards as illustrated in FIG. 21B. At the same time, the light shield 52S starts rotating together with the cam 41 in the same direction (i.e., negative direction). Thereafter, as the light shield 52S rotates, the short light shield portion 52i reaches the light emitting portion L first, among the plurality of short light shield portions 52b though 52i, thereby switching the optical sensor 51 from the light transmission state to the light interception state as illustrated in FIG. 23B. Immediately thereafter, the short light shield portion 52i passes before the light emitting portion L, thereby switching the optical sensor 51 to the light transmission state as illustrated in FIG. 23C.

At the time when the optical sensor 51 enters the light interception state of FIG. 23B, the timer 70 starts time measurement. Since a light interception continuing time during which the short light shield portion 52i keeps intercepting the light from the optical sensor 51 is less than the preset time T of the timer 70, the controller 60 cancels the time measurement with the timer 70 before the timer 70 completes the time measurement, like the embodiment described above. Similarly, as the light shield 52S rotates, the short light shield portion 52h through 52b following the short light shield portion 52i pass before the light emitting portion L, thereby switching the optical sensor 51 between the light interception state and the light transmission state. The time measurement with the timer 70 started at the time when each of the short light shield portions 52h through 52b intercepts the light from the optical sensor 51 is also canceled before the timer 70 completes the time measurement.

Thereafter, when the long light shield portion 52a reaches the light emitting portion L, the optical sensor 51 enters the light interception state as illustrated in FIG. 23K. At this time when the optical sensor 51 enters the light interception state, the timer 70 resumes time measurement from the beginning. Since a light interception continuing time during which the long light shield portion 52a keeps intercepting the light from the optical sensor 51 is greater than the preset time T of the timer 70, the light interception state continues during the time measurement with the timer 70. When the timer 70 completes measurement of the preset time T, the controller 60 outputs a direction to halt rotation of the cam 41 as illustrated in FIG. 24L. According to the direction, the cam 41 stops rotating to be in the pressure applying state in which the pressure roller 19 is pressed against the fixing roller 18. Since a flow in which the controller 60 determines whether there is a malfunction in the present pressure applying operation is basically identical to the flow described above with reference to FIG. 17, a redundant description thereof is herein omitted unless otherwise required.

Thus, like the embodiment described above, the present embodiment shortens the time to be measured by the timer 70 by canceling the time measurement, which is started at the time when each of the short light shield portions 52b through 52i intercepts the light from the optical sensor 51, before the timer 70 completes the time measurement. Accordingly, variation in time measurement with the timer 70 is reduced, thereby enhancing accuracy in controlling the rotational position of the cam 41.

Figure 26:
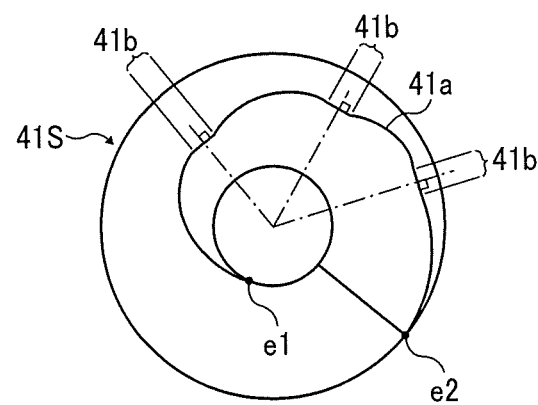
FIG. 26 is a schematic view of a variation of the cam, including one or more flat faces.

Referring now to FIG. 26, a description is given of a variation of the cam 41.

FIG. 26 is a schematic view of a cam 41S as a variation of the cam 41.

To change the pressure at the fixing nip N in a plurality of levels, the fixing device 12 may include the cam 41S, which includes one or more flat faces 41b perpendicular to a radial direction of the cam 41S between the minimum point e1 and the maximum point e2 of the cam face 41a, as illustrated in FIG. 26. Each of the one or more flat faces 41b is disposed at a position such that the pressure lever 31, more specifically, the cam receiver 31d, contacts the cam face 41a when rotation of the cam 41S is halted. The one or more flat faces 41b facilitate pressure from the pressure lever 31 to act in a direction perpendicular to a direction of rotation of the cam 41S, that is, the radial direction of the cam 41S. Accordingly, a force applied to the cam 41S in the direction of rotation thereof is reduced. As a consequence, the position of the cam 41S in the direction of rotation thereof is reliably held.

According to the embodiments described above, the light shield includes a long light shield portion and one or more short light shield portions to intercept and transmit the light from the optical sensor. The optical sensor detects that the light is intercepted or transmitted. Based on the detection by the optical sensor, the controller controls rotation of the cam. Alternatively, the light shield may include a light shield portion and a light transmission portion in a way opposite the light shield described above. With such a light shield, the controller can control the rotation of the cam similarly.

Figure 27:
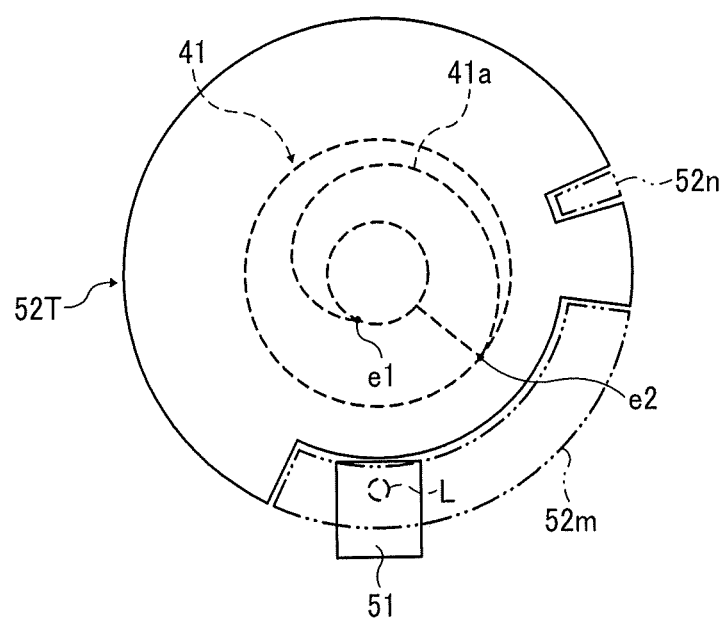
FIG. 27 is a schematic view of a variation of the light shield of FIG. 3.

Referring now to FIG. 27, a description is given of such a light shield as a variation of the light shield 52 of FIG. 3.

FIG. 27 is a schematic view of a light shield 52T.

The light shield 52T includes a light shield portion and a light transmission portion in a way opposite the light shield 52 of FIG. 3. Specifically, the light shield 52T includes or defines a long light transmission portion 52m and a short light transmission portion 52n in a direction of rotation of the light shield 52T. The long light transmission portion 52m and the short light transmission portion 52n are located where the long light shield portion 52a and the short light shield portion 52b are located, respectively, in the light shield 52 of FIG. 3. The rest of the light shield 52T is a light shield portion that intercepts the light from the optical sensor 51 while passing before the light emitting portion L of the optical sensor 51. The time when the light shield 52T intercepts and transmits the light from the optical sensor 51 is opposite the time when the light shield of the embodiments described above (i.e., light shield 52, light shield 52S) intercepts and transmits the light from the optical sensor 51. Accordingly, by switching between light interception and light transmission, the rotation of the cam 41 can be controlled following the flows of controlling rotation of the cam 41 in the embodiments described above. In the present embodiment, the light shield 52T includes or defines a single short light transmission portion (i.e., short light transmission portion 52n). Alternatively, the light shield 52T may include or define a plurality of short light transmission portions, like the light shield 52S of FIG. 19.

In the embodiments described above, the optical sensor 51 is a transmissive optical sensor serving as a rotational position detector that detects a rotational position of the cam 41. Alternatively, a reflective optical sensor may be used as the rotational position detector. When such a reflective optical sensor is used, a reflector in the same shape as the shape of the light shield 52 of FIG. 3 may be used to reflect the light from the reflective optical sensor. With the reflective optical sensor and the reflector, the controller 60 can control rotation of the cam 41 following the flows of controlling rotation of the cam 41 in the embodiments described above.

Figure 28:
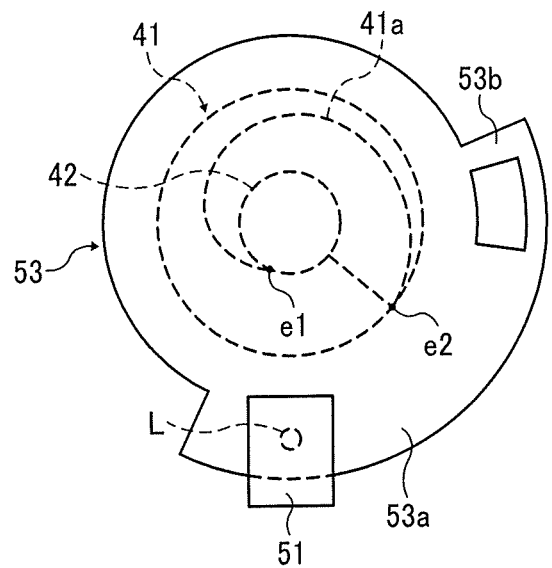
FIG. 28 is a schematic view of a reflector.

FIG. 28 is a schematic view of a reflector 53 as an example of the reflector that may be used if the optical sensor 51 is a reflective optical sensor.

Specifically, the reflector 53 includes a long reflective portion 53a and a short reflective portion 53b in a direction of rotation of the reflector 53. With the reflector 53, the controller 60 can control rotation of the cam 41 following the flows of controlling rotation of the cam 41 in the embodiments described above, simply by changing the "light interception" to the "reflection" in the control flows described above. In the present embodiment, the reflector 53 includes a single short reflective portion (i.e., short reflective portion 53b). Alternatively, the reflector 53 may include a plurality of short reflective portions, like the light shield 52S of FIG. 19.

In the embodiments described above, the timer 70 is used to control the rotation of the cam 41, rendering unnecessary to provide two optical sensors. Alternatively, two optical sensors may be used to control the rotation of the cam 41.

Figure 29:
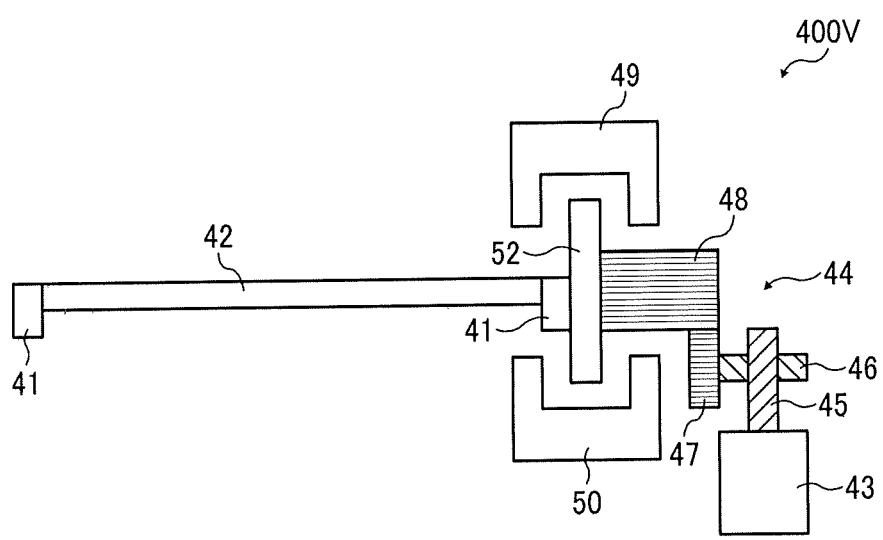
FIG. 29 is a schematic view of a contact-separation mechanism incorporating two optical sensors.

Referring now to FIG. 29, a description is given of an example of a contact-separation mechanism incorporating two optical sensors.

FIG. 29 is a schematic view of a contact-separation mechanism 400V, serving as a cam device, which incorporates a pressure-relief position sensor 49 and a pressure-application position sensor 50.

Specifically, the pressure-relief position sensor 49, serving as a first optical sensor, detects a rotational position of the cam 41 during the pressure relief operation. The pressure-application position sensor 50, serving as a second optical sensor, detects a rotational position of the cam 41 during the pressure applying operation. The light shield 52 of the present embodiment is not limited to the light shield described above that includes a long light shield portion (e.g., long light shield portion 52a) and at least one short light shield portion (e.g., short light shield portion 52b), provided that the light shield 52 has a general shape such as a fan shape or a rectangle. A driving system of the contact-separation mechanism 400V illustrated in FIG. 29 is similar to the driving system of the contact-separation mechanism 400 illustrated in FIG. 4.

Referring now to FIGS. 30A through 33, a description is given of how to control rotation of the cam 41 with the pressure-relief position sensor 49 and the pressure-application position sensor 50 to relieve pressure.

Figure 30A:
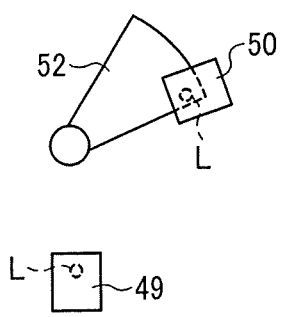
FIG. 30A is a schematic view of the light shield and the two optical sensors, illustrating a position of the light shield before starting rotation and when a pressure-application position sensor is in the light interception state.
Figure 30B:
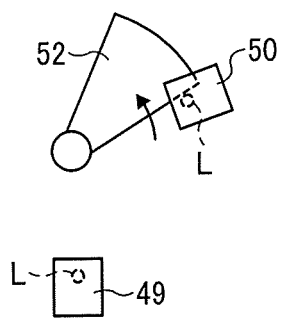
FIG. 30B is a schematic view of the light shield and the two optical sensors, illustrating a position of the light shield after starting rotation and when the pressure-application position sensor enters the light transmission state.
Figure 30C:
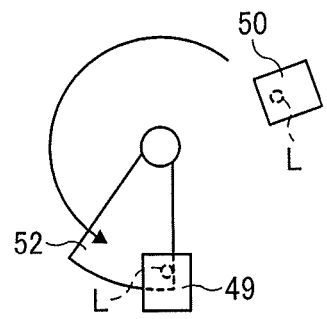
FIG. 30C is a schematic view of the light shield and the two optical sensors, illustrating a position of the light shield when the pressure-relief position sensor enters the light interception state.
Figure 31A:
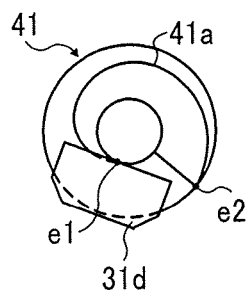
FIG. 31A is a schematic view of the cam and the cam receiver, illustrating relative positions thereof when the light shield is positioned as illustrated in FIG. 30A.
Figure 31B:
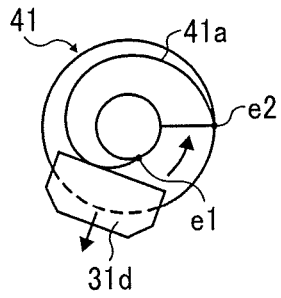
FIG. 31B is a schematic view of the cam and the cam receiver, illustrating relative positions thereof when the light shield is positioned as illustrated in FIG. 30B.
Figure 31C:
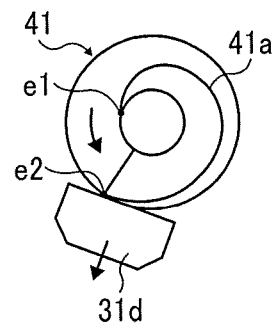
FIG. 31C is a schematic view of the cam and the cam receiver, illustrating relative positions thereof when the light shield is positioned as illustrated in FIG. 30C.
Figure 32:
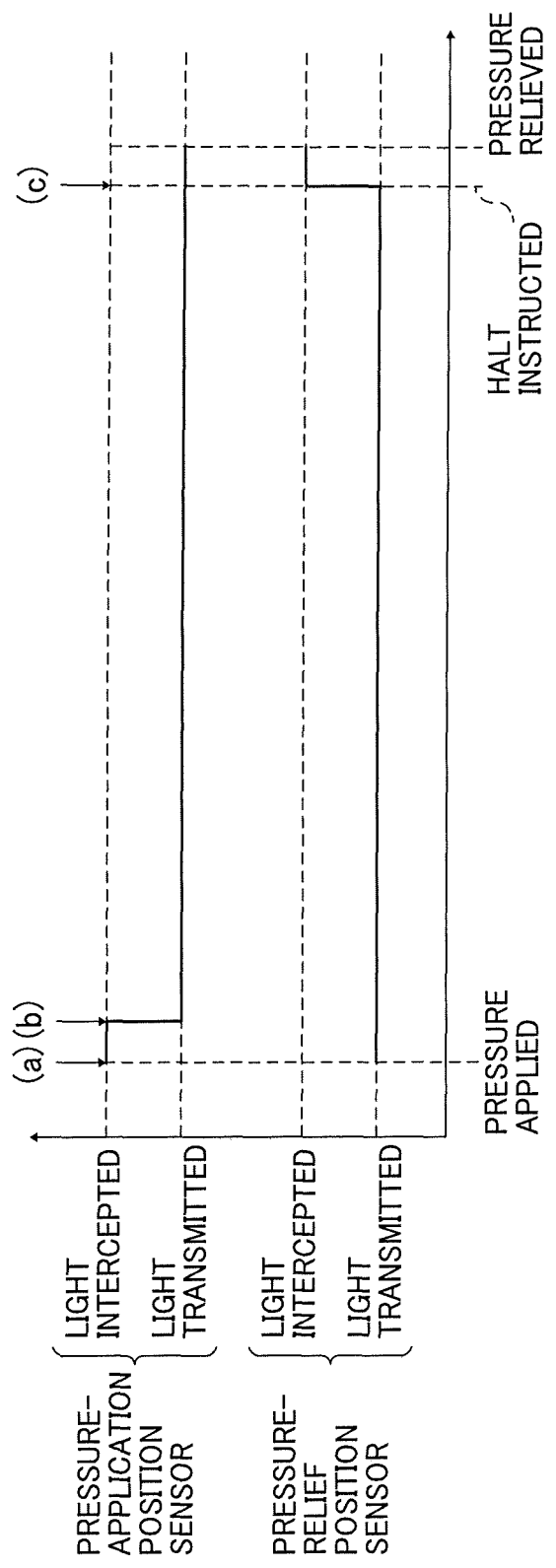
FIG. 32 is a timing chart of interception and transmission of light emitted by the two optical sensors.
Figure 33:
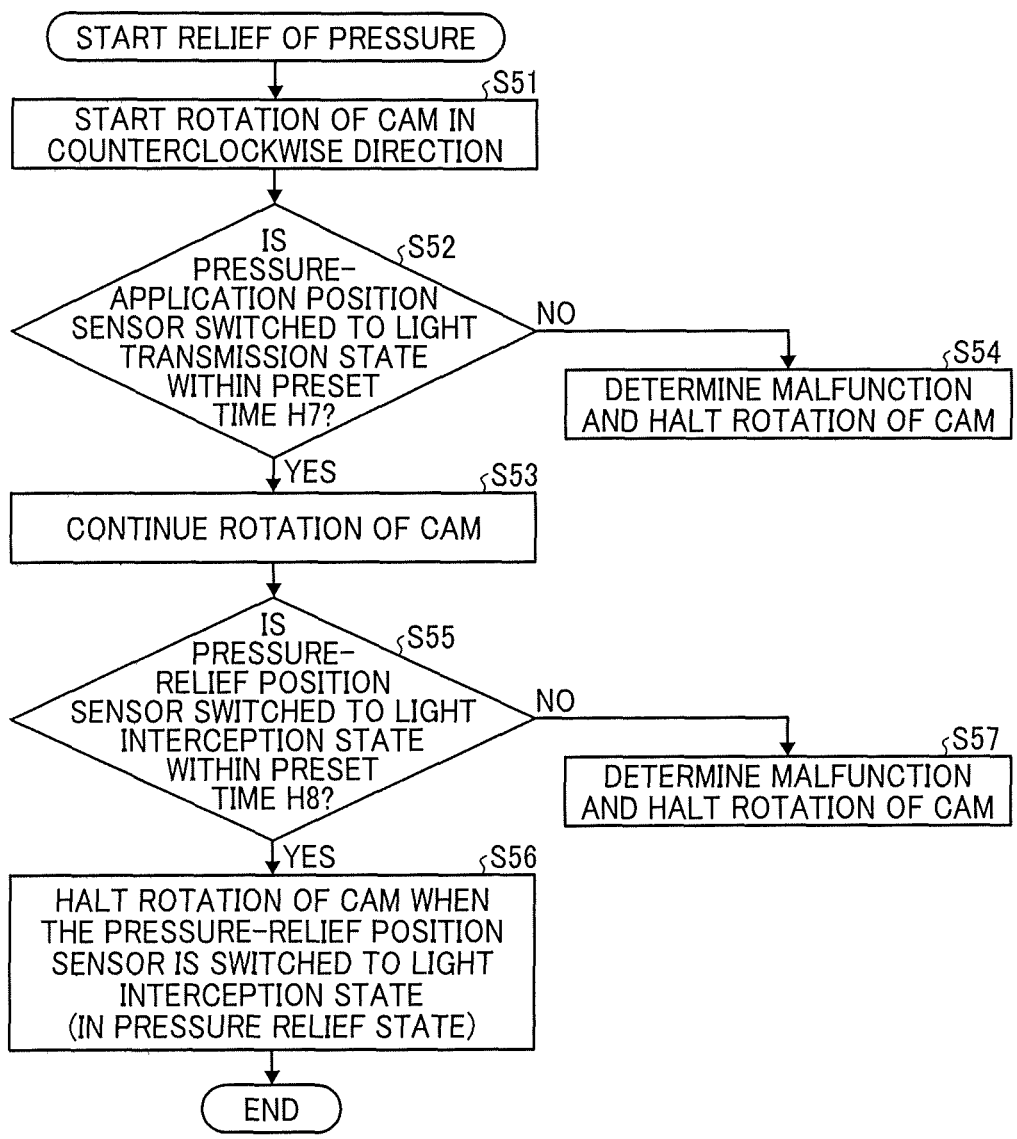
FIG. 33 is a flowchart of control of rotation with the two optical sensors to relieve pressure.

FIGS. 30A through 30C illustrate rotational positions of the light shield 52. FIGS. 31A through 31C illustrate rotational positions of the cam 41. More specifically, FIG. 30A is a schematic view of the light shield 52, the pressure-relief position sensor 49, and the pressure-application position sensor 50, illustrating a position of the light shield 52 before starting rotation and when the pressure-application position sensor 50 is in the light interception state; FIG. 30B is a schematic view of the light shield 52, the pressure-relief position sensor 49, and the pressure-application position sensor 50, illustrating a position of the light shield 52 after starting rotation and when the pressure-application position sensor 50 enters the light transmission state; FIG. 30C is a schematic view of the light shield 52, the pressure-relief position sensor 49, and the pressure-application position sensor 50, illustrating a position of the light shield 52 when the pressure-relief position sensor 49 enters the light interception state; FIG. 31A is a schematic view of the cam 41 and the cam receiver 31d, illustrating relative positions thereof when the light shield 52 is positioned as illustrated in FIG. 30A; FIG. 31B is a schematic view of the cam 41 and the cam receiver 31d, illustrating relative positions thereof when the light shield 52 is positioned as illustrated in FIG. 30B; FIG. 31C is a schematic view of the cam 41 and the cam receiver 31d, illustrating relative positions thereof when the light shield 52 is positioned as illustrated in FIG. 30C; FIG. 32 is a timing chart of interception and transmission of light emitted by the pressure-relief position sensor 49 and the pressure-application position sensor 50. FIG. 32 illustrates states (a) through (c). In the states (a) through (c), the light shield 52 is positioned as illustrated in FIGS. 30A through 30C, respectively, while the cam 41 is positioned as illustrated in FIGS. 31A through 31C, respectively. FIG. 33 is a flowchart of control of rotation with the pressure-relief position sensor 49 and the pressure-application position sensor 50 to relieve pressure.

In the normal pressure applying state illustrated in FIG. 30A, the pressure-application position sensor 50 is in the light interception state as the light shield 52 intercepts light from the pressure-application position sensor 50. As the cam 41 in the normal pressure applying state of FIG. 31A starts rotating in a counterclockwise direction (i.e., positive direction) as illustrated in FIG. 31B (in step S51 of FIG. 33), the light shield 52 rotates together with the cam 41 in the same direction. As the light shield 52 rotates, a trailing end of the light shield 52 in the direction of rotation thereof passes before the light emitting portion L of the pressure-application position sensor 50, thereby switching the pressure-application position sensor 50 from the light interception state to the light transmission state as illustrated in FIG. 30B. Then, the controller 60 determines whether the pressure-application position sensor 50 is switched to the light transmission state within a preset time h7 from when the cam 41 starts rotating (in step S52 of FIG. 33).

If the controller 60 determines that the pressure-application position sensor 50 is switched to the light transmission state within the preset time h7 (YES in step S52 of FIG. 33), then, the controller 60 determines that there is no malfunction, and continues rotation of the cam 41 (in step S53 of FIG. 33). By contrast, if the controller 60 determines that the pressure-application position sensor 50 is not switched to the light transmission state within the preset time h7 (NO in step S52 of FIG. 33), for example, if the pressure-application position sensor 50 is not switched to the light transmission state even after the preset time h7 elapses, then, the controller 60 determines that there is a malfunction, and halts rotation of the cam 41 so as not to continue the rotation of the cam 41 (in step S54 of FIG. 33).

When the rotation of the cam 41 continues and a leading end of the light shield 52 in the direction of rotation thereof overlaps the light emitting portion L of the pressure-relief position sensor 49 as illustrated in FIG. 30C, the pressure-relief position sensor 49 is switched from the light transmission state to the light interception state. At this time, the controller 60 determines whether the pressure-relief position sensor 49 is switched to the light interception state within a preset time h8 from when the pressure-application position sensor 50 is switched to the light transmission state of FIG. 30B (in step S55 of FIG. 33).

If the controller 60 determines that the pressure-relief position sensor 49 is switched to the light interception state within the preset time h8 (YES in step S55 of FIG. 33), then, the controller 60 determines that there is no malfunction, and outputs a direction to halt rotation of the cam 41 at the time when the pressure-relief position sensor 49 detects a shift to the light interception state (in step S56 of FIG. 33). According to the direction, the cam 41 stops rotating and the pressure relief operation is completed. By contrast, if the controller 60 determines that the pressure-relief position sensor 49 is not switched to the light interception state within the preset time h8 (NO in step S55 of FIG. 33), for example, if the pressure-relief position sensor 49 is not switched to the light interception state even after the preset time h8 elapses, then, the controller 60 determines that there is a malfunction, and halts rotation of the cam 41 so as not to continue the rotation of the cam 41 (in step S57 of FIG. 33).

Referring now to FIGS. 34A through 37, a description is given of how to control rotation of the cam 41 with the pressure-relief position sensor 49 and the pressure-application position sensor 50 to apply pressure.

Figure 34A:
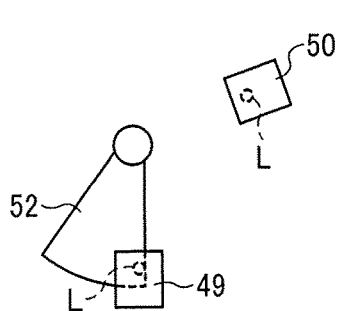
FIG. 34A is a schematic view of the light shield and the two optical sensors, illustrating a position of the light shield before starting rotation and when the pressure-relief position sensor is in the light interception state.
Figure 34B:
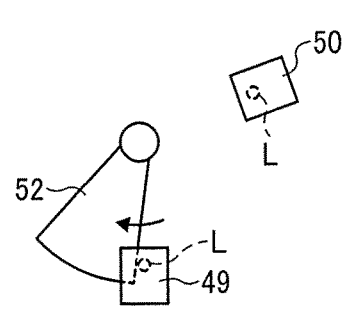
FIG. 34B is a schematic view of the light shield and the two optical sensors, illustrating a position of the light shield after starting rotation and when the pressure-relief position sensor enters the light transmission state.
Figure 34C:
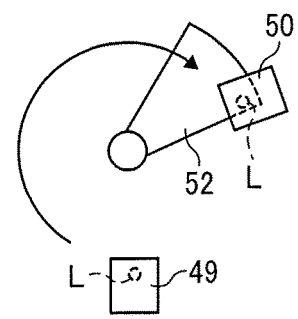
FIG. 34C is a schematic view of the light shield and the two optical sensors, illustrating a position of the light shield when the pressure-application position sensor enters the light interception state.
Figure 35A:
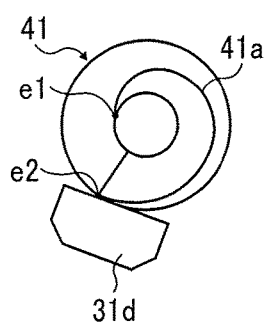
FIG. 35A is a schematic view of the cam and the cam receiver, illustrating relative positions thereof when the light shield is positioned as illustrated in FIG. 34A.
Figure 35B:
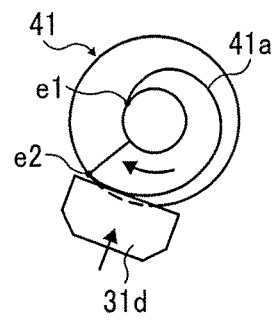
FIG. 35B is a schematic view of the cam and the cam receiver, illustrating relative positions thereof when the light shield is positioned as illustrated in FIG. 34B.
Figure 35C:
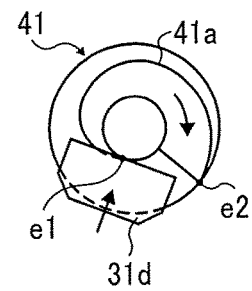
FIG. 35C is a schematic view of the cam and the cam receiver, illustrating relative positions thereof when the light shield is positioned as illustrated in FIG. 34C.
Figure 36:
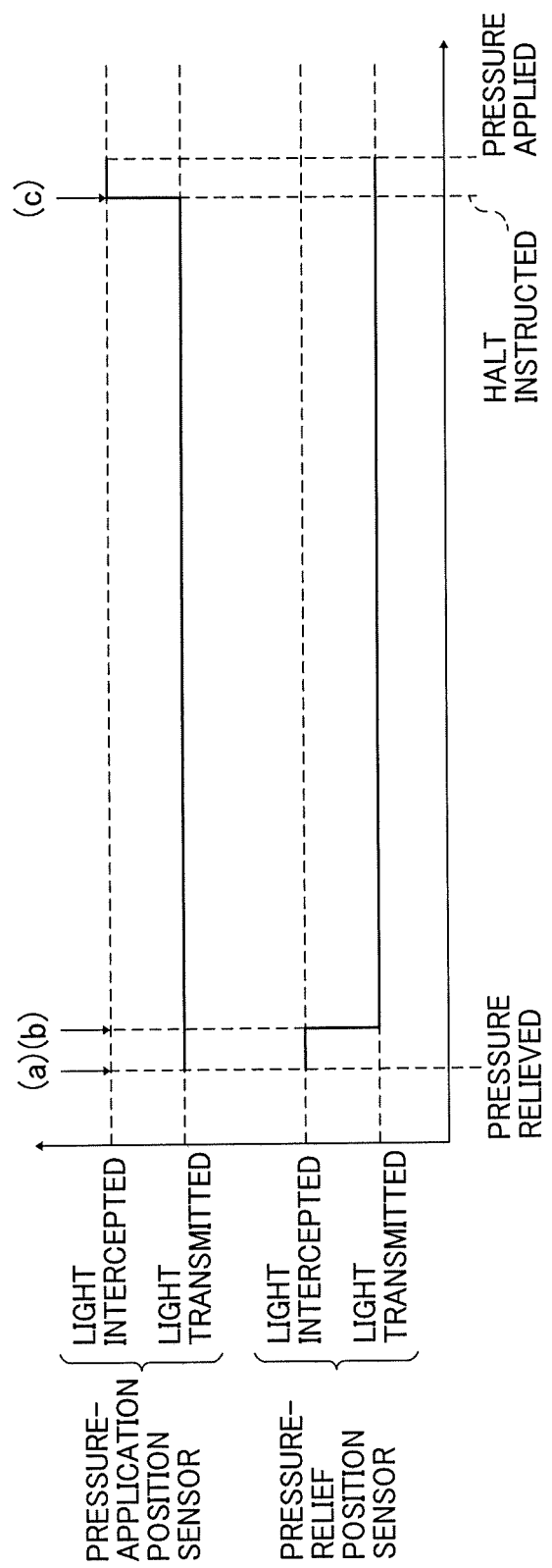
FIG. 36 is a timing chart of interception and transmission of light emitted by the two optical sensors.
Figure 37:
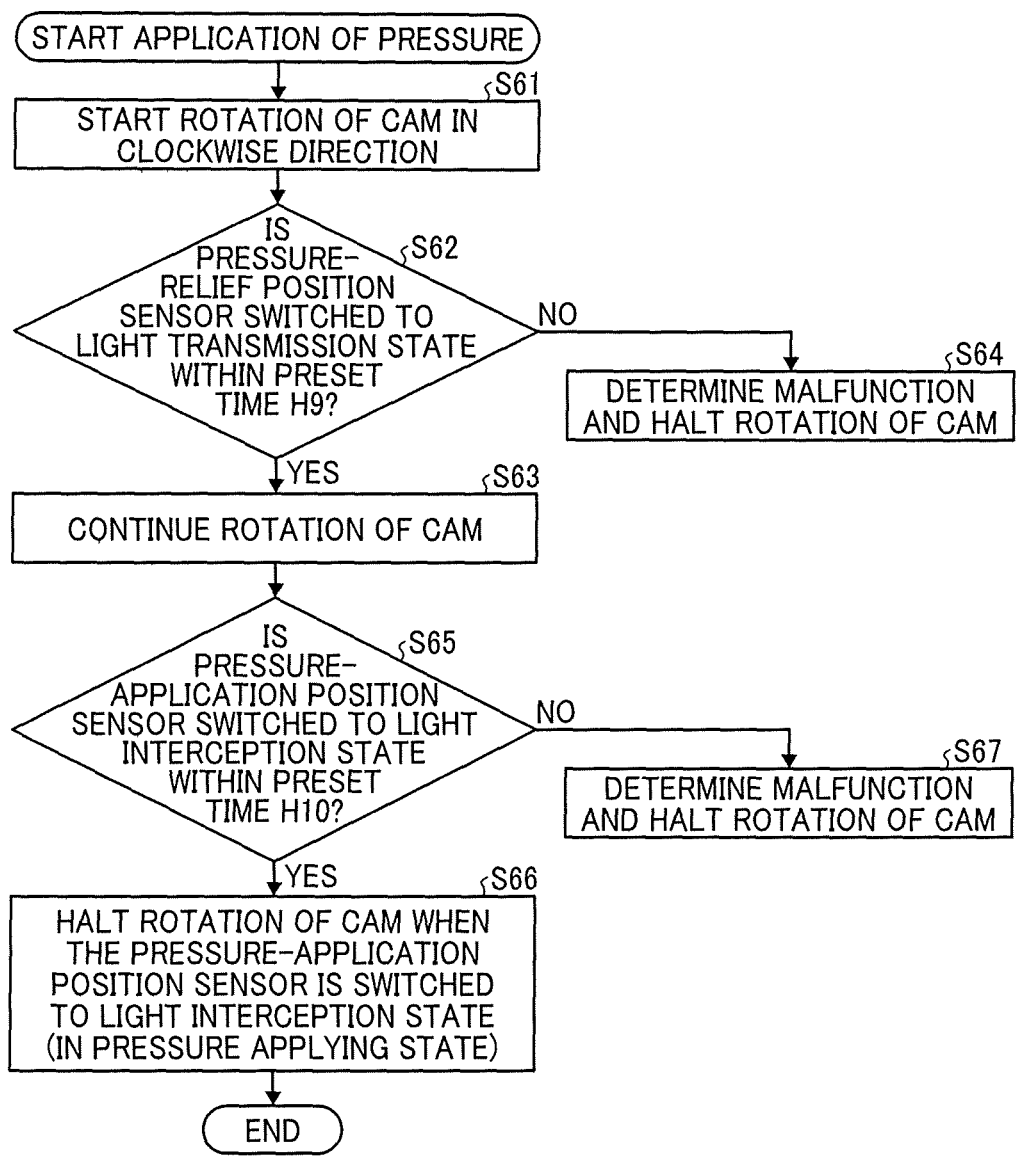
FIG. 37 is a flowchart of control of rotation with the two optical sensors to apply pressure.

FIGS. 34A through 34C illustrate rotational positions of the light shield 52. FIGS. 35A through 35C illustrate rotational positions of the cam 41. More specifically, FIG. 34A is a schematic view of the light shield 52, the pressure-relief position sensor 49, and the pressure-application position sensor 50, illustrating a position of the light shield 52 before starting rotation and when the pressure-relief position sensor 49 is in the light interception state; FIG. 34B is a schematic view of the light shield 52, the pressure-relief position sensor 49, and the pressure-application position sensor 50, illustrating a position of the light shield 52 after starting rotation and when the pressure-relief position sensor 49 enters the light transmission state; FIG. 34C is a schematic view of the light shield 52, the pressure-relief position sensor 49, and the pressure-application position sensor 50, illustrating a position of the light shield 52 when the pressure-application position sensor 50 enters the light interception state; FIG. 35A is a schematic view of the cam 41 and the cam receiver 31d, illustrating relative positions thereof when the light shield 52 is positioned as illustrated in FIG. 34A; FIG. 35B is a schematic view of the cam 41 and the cam receiver 31d, illustrating relative positions thereof when the light shield 52 is positioned as illustrated in FIG. 34B; FIG. 35C is a schematic view of the cam 41 and the cam receiver 31d, illustrating relative positions thereof when the light shield 52 is positioned as illustrated in FIG. 34C; FIG. 36 is a timing chart of interception and transmission of light emitted by the pressure-relief position sensor 49 and the pressure-application position sensor 50. FIG. 36 illustrates states (a) through (c). In the states (a) through (c), the light shield 52 is positioned as illustrated in FIGS. 34A through 34C, respectively, while the cam 41 is positioned as illustrated in FIGS. 35A through 35C, respectively. FIG. 37 is a flowchart of control of rotation with the pressure-relief position sensor 49 and the pressure-application position sensor 50 to apply pressure.

As the cam 41 in the pressure relief state of FIG. 35A starts rotating in a clockwise direction (i.e., negative direction) as illustrated in FIG. 35B (in step S61 of FIG. 37), the light shield 52 rotates together with the cam 41 in the same direction. As the light shield 52 rotates, the trailing end of the light shield 52 in the direction of rotation thereof passes before the light emitting portion L of the pressure-relief position sensor 49, thereby switching the pressure-relief position sensor 49 to the light transmission state as illustrated in FIG. 34B. Then, the controller 60 determines whether the pressure-relief position sensor 49 is switched to the light transmission state within a preset time h9 from when the cam 41 starts rotating (in step S62 of FIG. 37).

If the controller 60 determines that the pressure-relief position sensor 49 is switched to the light transmission state within the preset time h9 (YES in step S62 of FIG. 37), then, the controller 60 determines that there is no malfunction, and continues rotation of the cam 41 (in step S63 of FIG. 37). By contrast, if the controller 60 determines that the pressure-relief position sensor 49 is not switched to the light transmission state within the preset time h9 (NO in step S62 of FIG. 37), for example, if the pressure-relief position sensor 49 is not switched to the light interception state even after the preset time h9 elapses, then, the controller 60 determines that there is a malfunction, and halts rotation of the cam 41 so as not to continue the rotation of the cam 41 (in step S64 of FIG. 37).

When the rotation of the cam 41 continues and the leading end of the light shield 52 in the direction of rotation thereof overlaps the light emitting portion L of the pressure-application position sensor 50 as illustrated in FIG. 34C, the pressure-application position sensor 50 is switched from the light transmission state to the light interception state. At this time, the controller 60 determines whether the pressure-application position sensor 50 is switched to the light interception state within a preset time h10 from when the pressure-relief position sensor 49 is switched to the light transmission state of FIG. 34B (in step S65 of FIG. 37).

If the controller 60 determines that the pressure-application position sensor 50 is switched to the light interception state within the preset time h10 (YES in step S65 of FIG. 37), then, the controller 60 determines that there is no malfunction, and outputs a direction to halt rotation of the cam 41 at the time when the pressure-application position sensor 50 detects a shift to the light interception state (in step S66 of FIG. 37). According to the direction, the cam 41 stops rotating and the pressure applying operation is completed. By contrast, if the controller 60 determines that the pressure-application position sensor 50 is not switched to the light interception state within the preset time h10 (NO in step S65 of FIG. 37), for example, if the pressure-application position sensor 50 is not switched to the light interception state even after the preset time h10 elapses, then, the controller 60 determines that there is a malfunction, and halts rotation of the cam 41 so as not to continue the rotation of the cam 41 (in step S67 of FIG. 37).

Thus, with the two optical sensors (i.e., the pressure-relief position sensor 49 and the pressure-application position sensor 50) instead of the timer 70, the controller 60 can control rotation of the cam 41. Compared to the configuration including two optical sensors, the configuration including a timer and an optical sensor may be advantageous in cost reduction and downsizing of the contact-separation mechanism. However, the configuration including two optical sensors is free from variation in time measurement by the timer, and therefore enhances accuracy in halting rotation of the cam at a desired position while facilitating control of rotation of the cam.

According to the embodiments described above, a relatively small, inexpensive brushed DC motor (e.g., motor 43) is employed as a driver of the contact-separation mechanism. Alternatively, a brushless DC motor may be employed as the driver of the contact-separation mechanism.

Figure 38:
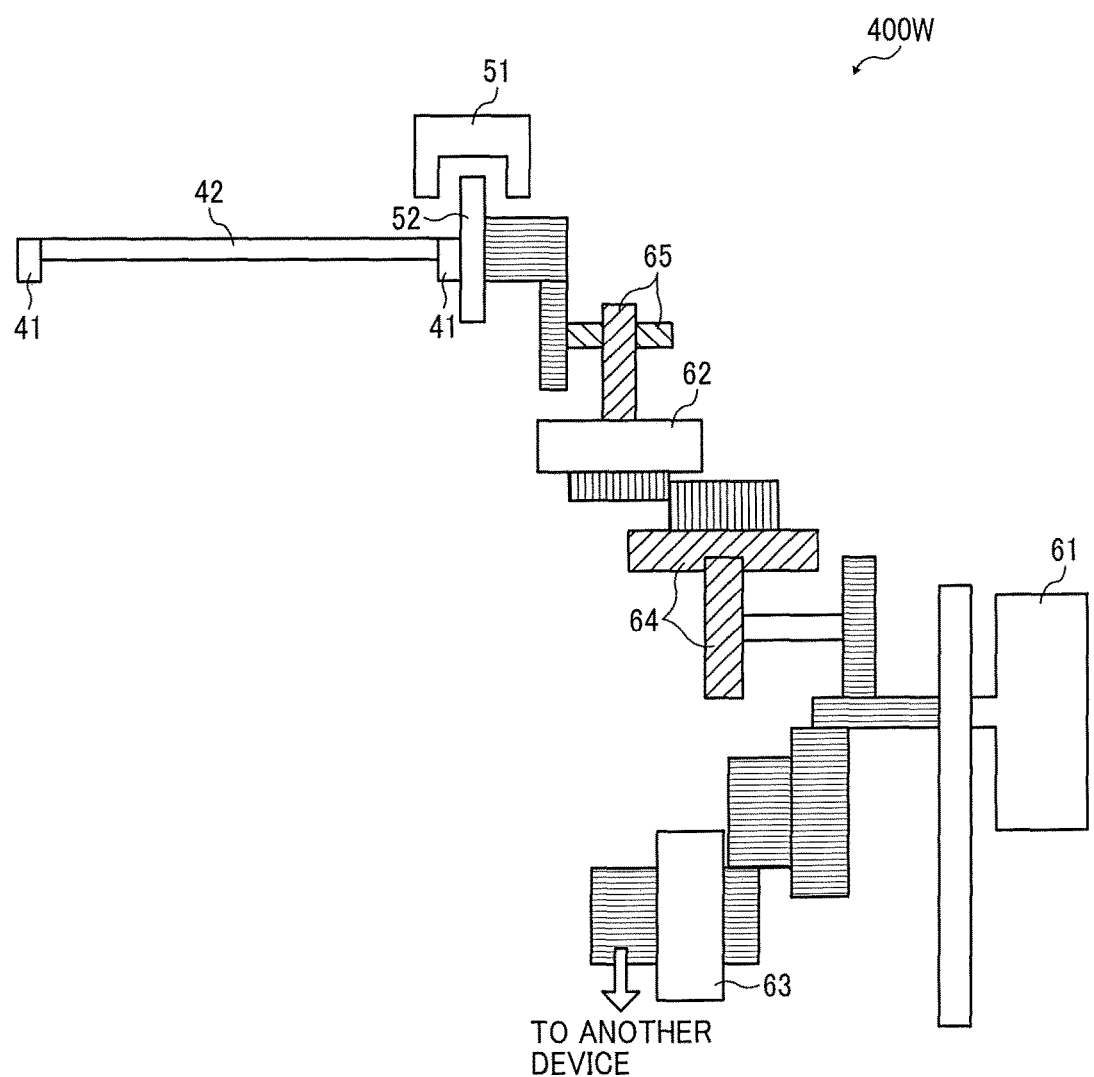
FIG. 38 is a schematic view of a contact-separation mechanism with a brushless direct current motor.

Referring now to FIG. 38, a description is given of an example of a contact-separation mechanism incorporating a brushless DC motor.

FIG. 38 is a schematic view of a contact-separation mechanism 400W, serving as a cam device, which incorporates a brushless DC motor 61.

The contact-separation mechanism 400W includes two electromagnetic clutches, namely, a first electromagnetic clutch 62 and a second electromagnetic clutch 63, as drive transmission switching devices to transmit a driving force generated by the brushless DC motor 61 to the contact-separation mechanism 400W or to another device. For example, in order to transmit the driving force to the contact-separation mechanism 400W, the first electromagnetic clutch 62 for the contact-separation mechanism 400W is switched to a transmittable state while the second electromagnetic clutch 63 for another device is switched to an interception state. That is, the first electromagnetic clutch 62 in the transmittable state is capable of transmitting the driving force. By contrast, the second electromagnetic clutch 63 in the interception state is not capable of transmitting the driving force. In this case, a motion converting mechanism 64 constructed of, e.g., a pair of helical gears or a pair of bevel gears meshing with each other changes a direction of transmitting the driving force from the brushless DC motor 61 at 90°, thereby transmitting the driving force to the first electromagnetic clutch 62. The driving force is then transmitted from the first electromagnetic clutch 62 to the light shield 52 and the cam 41 via a pair of worm gears 65. By contrast, in order to transmit the driving force to another device, the first electromagnetic clutch 62 for the contact-separation mechanism 400W is switched to the interception state, instead of the transmittable state, while the second electromagnetic clutch 63 for another device is switched to the transmittable state, instead of the interception state. That is, the first electromagnetic clutch 62 in the interception state is not capable of transmitting the driving force. By contrast, the second electromagnetic clutch 63 in the transmittable state is capable of transmitting the driving force.

Thus, the brushless DC motor 61 serving as a driver of the contact-separation mechanism 400W can be also used as a driver of another device, that is, a device other than the contact-separation mechanism 400W. In addition, since the number of rotations of a brushless DC motor is controllable, the present configuration including the brushless DC motor 61 enhances accuracy in halting rotation of the cam 41 at a desired position, compared to the configuration including a brushed DC motor.

Referring now to FIGS. 39A through 40B, a description is given of how to control rotation of the cam 41 with the brushless DC motor 61.

Figure 39B:
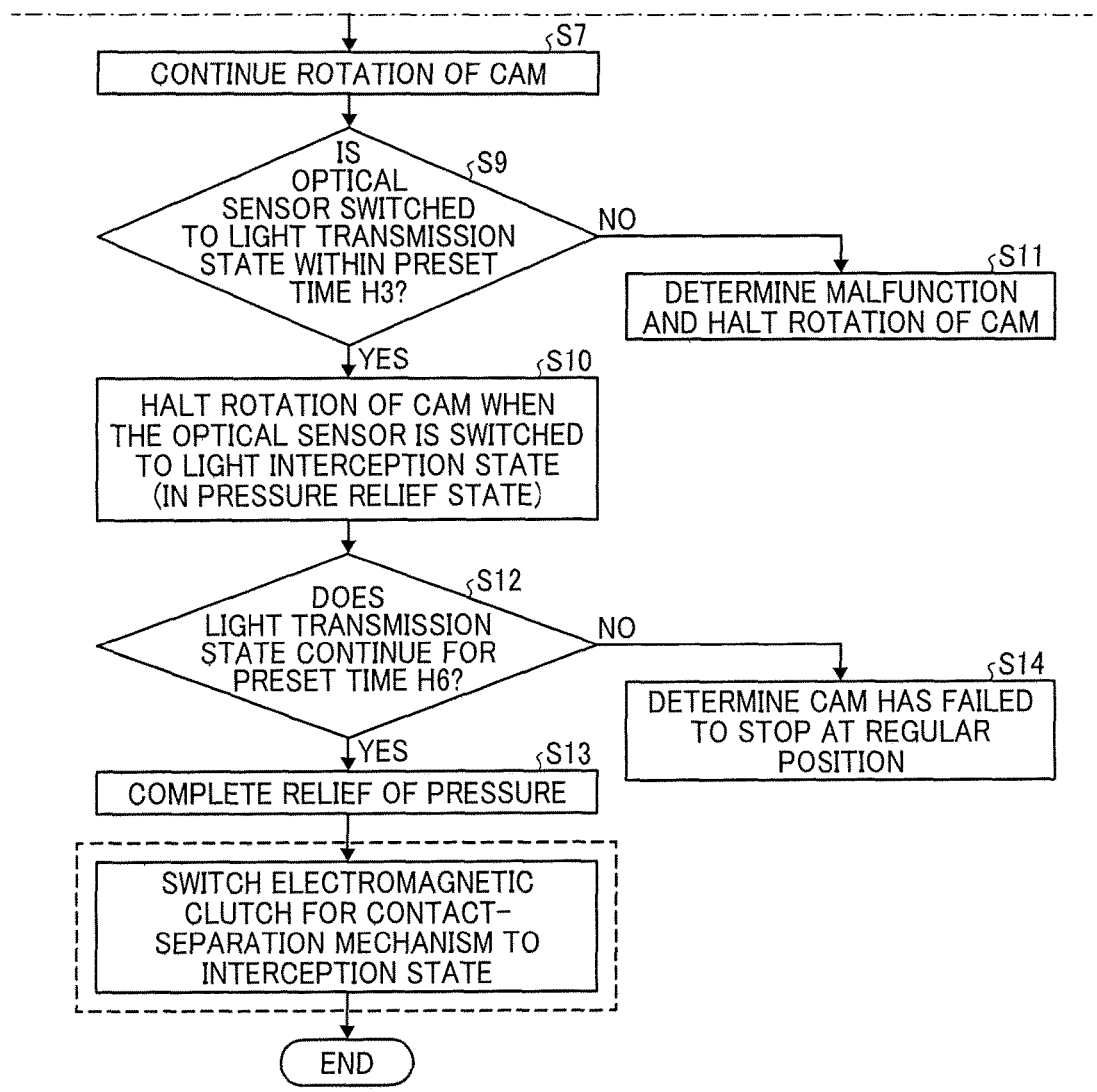
FIG. 39B is a continuation of the flowchart of control of rotation with the brushless direct current motor to relieve pressure in FIG. 39A.
Figure 40B:
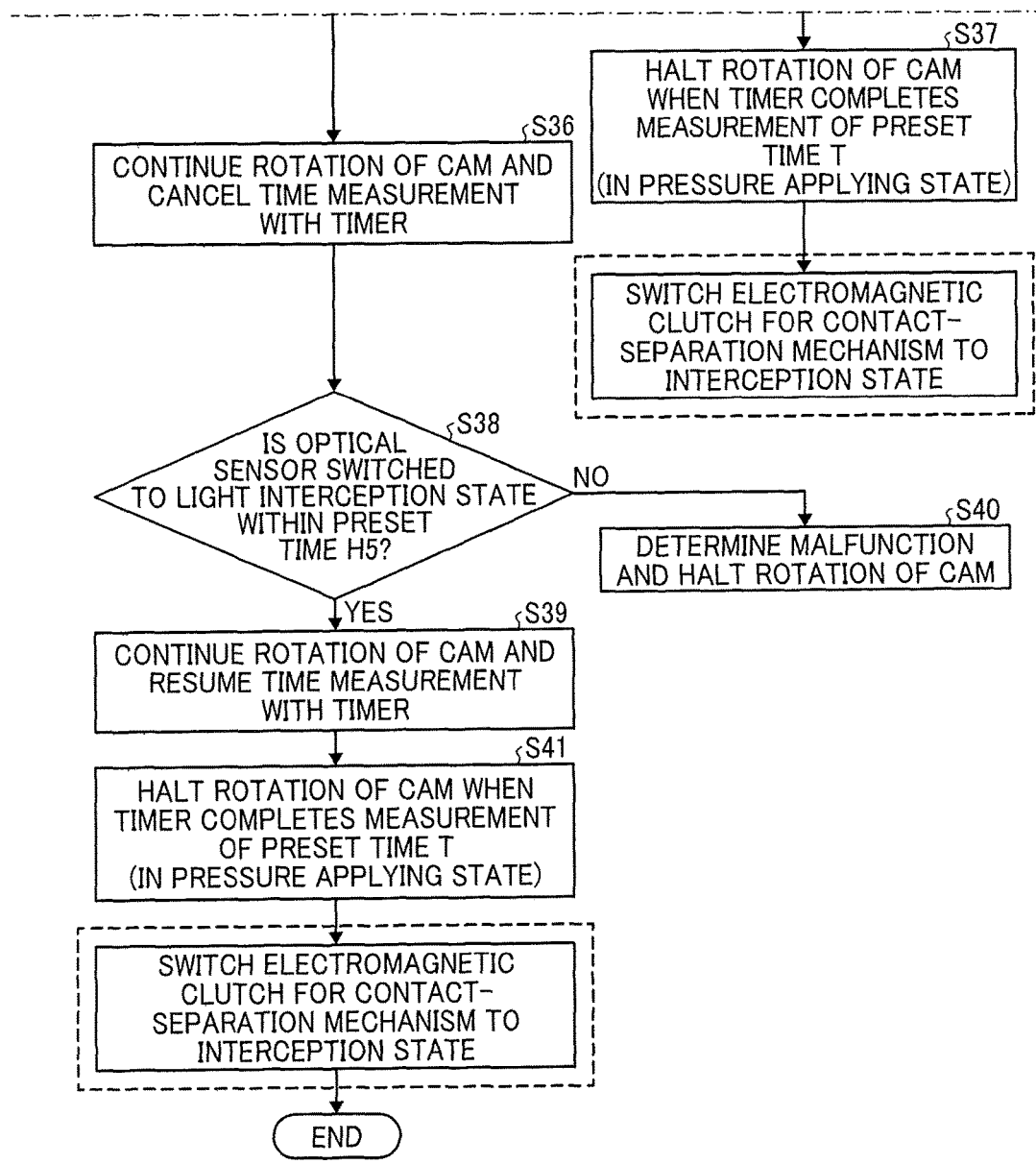
FIG. 40B is a continuation of the flowchart of control of rotation with the brushless direct current motor to apply pressure in FIG. 40A.

FIG. 39A is a flowchart of control of rotation with the brushless DC motor 61 to relieve pressure. FIG. 39B is a continuation of the flowchart of control of rotation with the brushless DC motor 61 to relieve pressure in FIG. 39A. FIG. 40A is a flowchart of control of rotation with the brushless DC motor 61 to apply pressure. FIG. 40B is a continuation of the flowchart of control of rotation with the brushless DC motor 61 to apply pressure in FIG. 40A.

The control flow of the pressure relief operation of FIGS. 39A and 39B and the control flow of the pressure applying operation of FIGS. 40A and 40B are basically identical to the control flow of FIG. 11 and the control flow of FIG. 17, respectively, with the motor 43 (i.e., brushed DC motor). However, since the configuration with the brushless DC motor 61 accompanies switching between the first electromagnetic clutch 62 and the second electromagnetic clutch 63, FIGS. 39A and 39B include steps enclosed by broken lines in addition to the flow of FIG. 11 while FIGS. 40A and 40B include steps enclosed by broken lines in addition to the flow of FIG. 17. Specifically, before starting the pressure relief operation or the pressure applying operation, the brushless DC motor 61 is deactivated to switch the second electromagnetic clutch 63 to the interception state and to switch the first electromagnetic clutch 62 to the transmittable state. Then, the pressure relief operation or the pressure applying operation is started. When the pressure relief operation or the pressure applying operation is completed, the first electromagnetic clutch 62 is switched to the interception state.

The rotation of the cam 41 may be controlled with two optical sensors in addition to the brushless DC motor.

Figure 41:
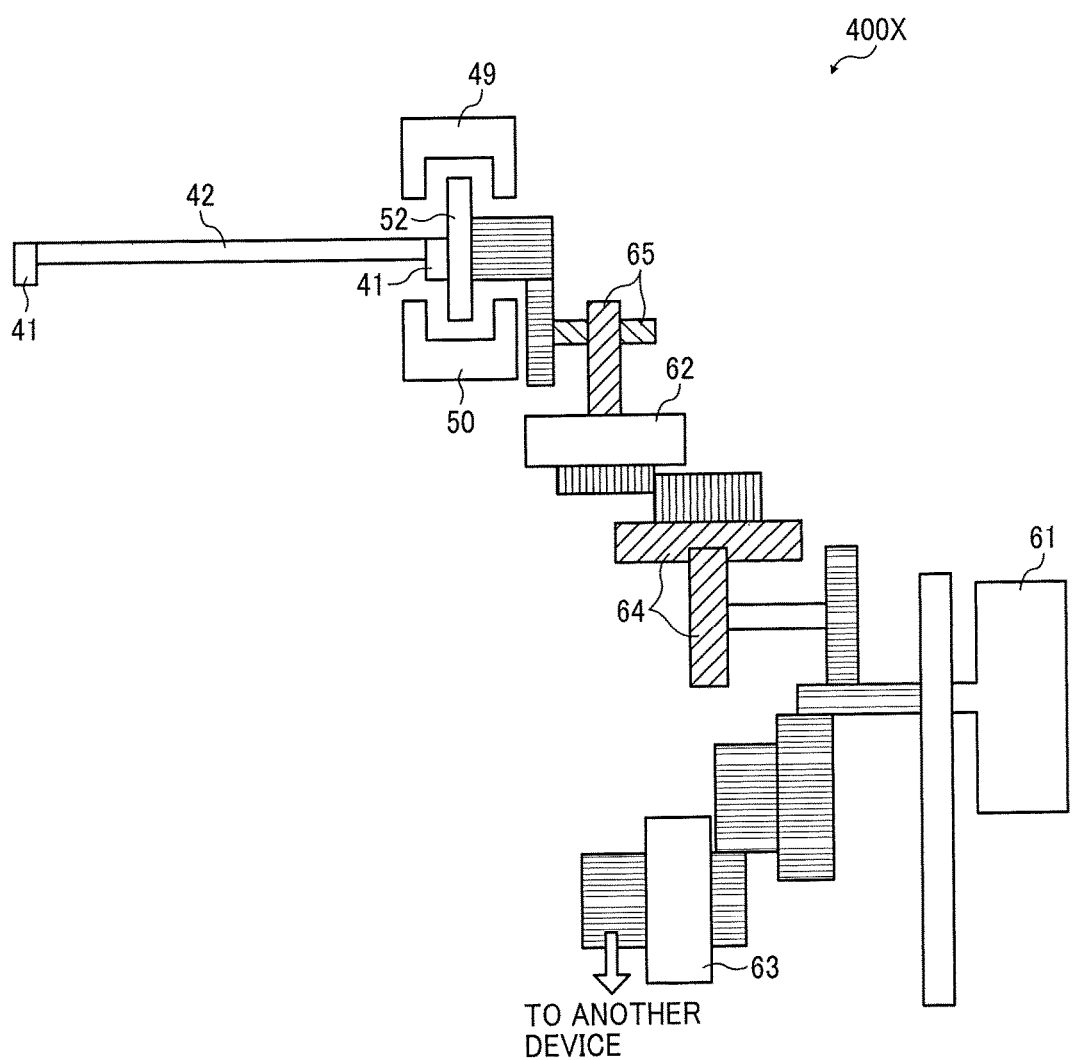
FIG. 41 is a schematic view of a contact-separation mechanism incorporating two optical sensors and a brushless direct current motor.
Figure 42:
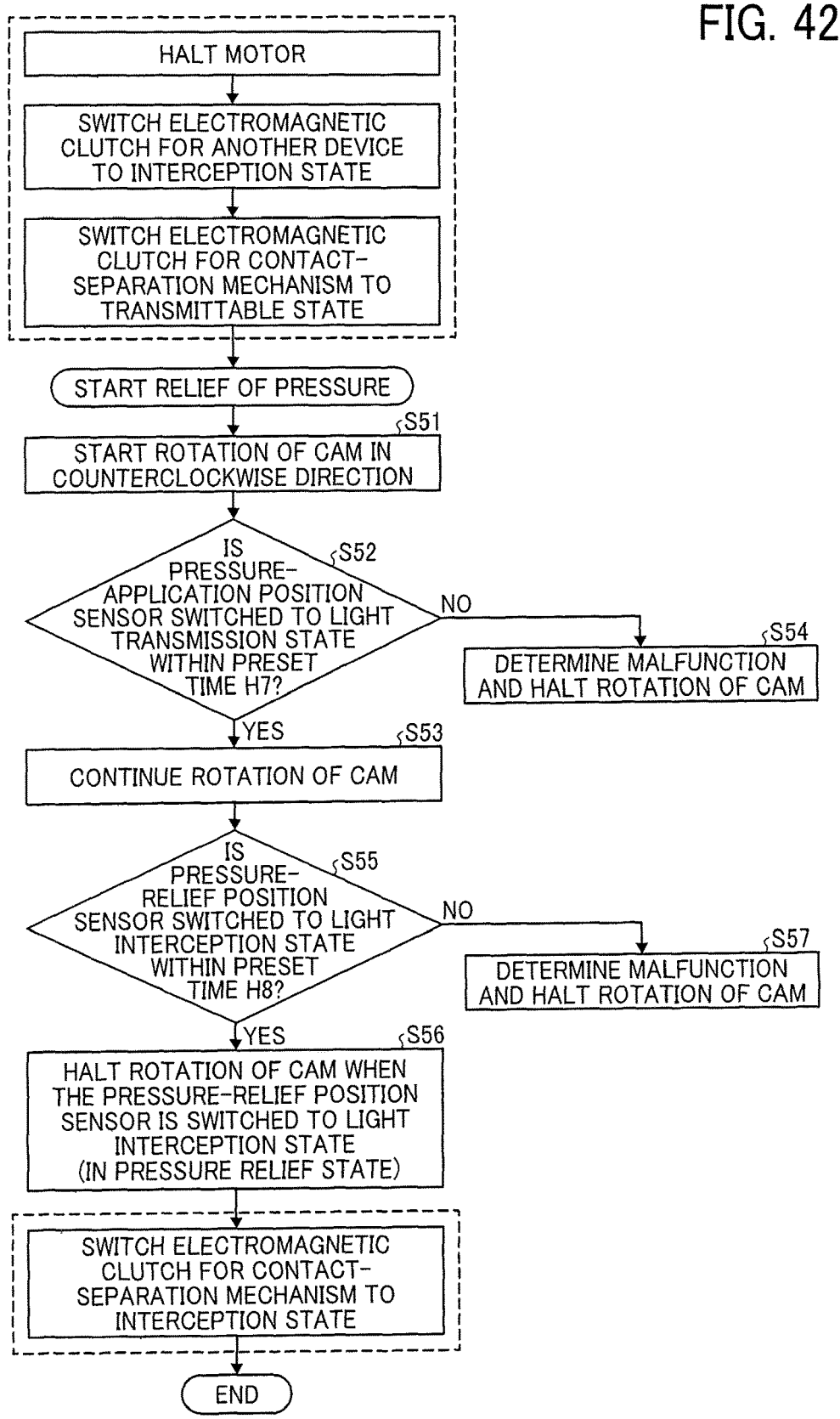
FIG. 42 is a flowchart of control of rotation with the brushless direct current motor and the two optical sensors to relieve pressure.
Figure 43:
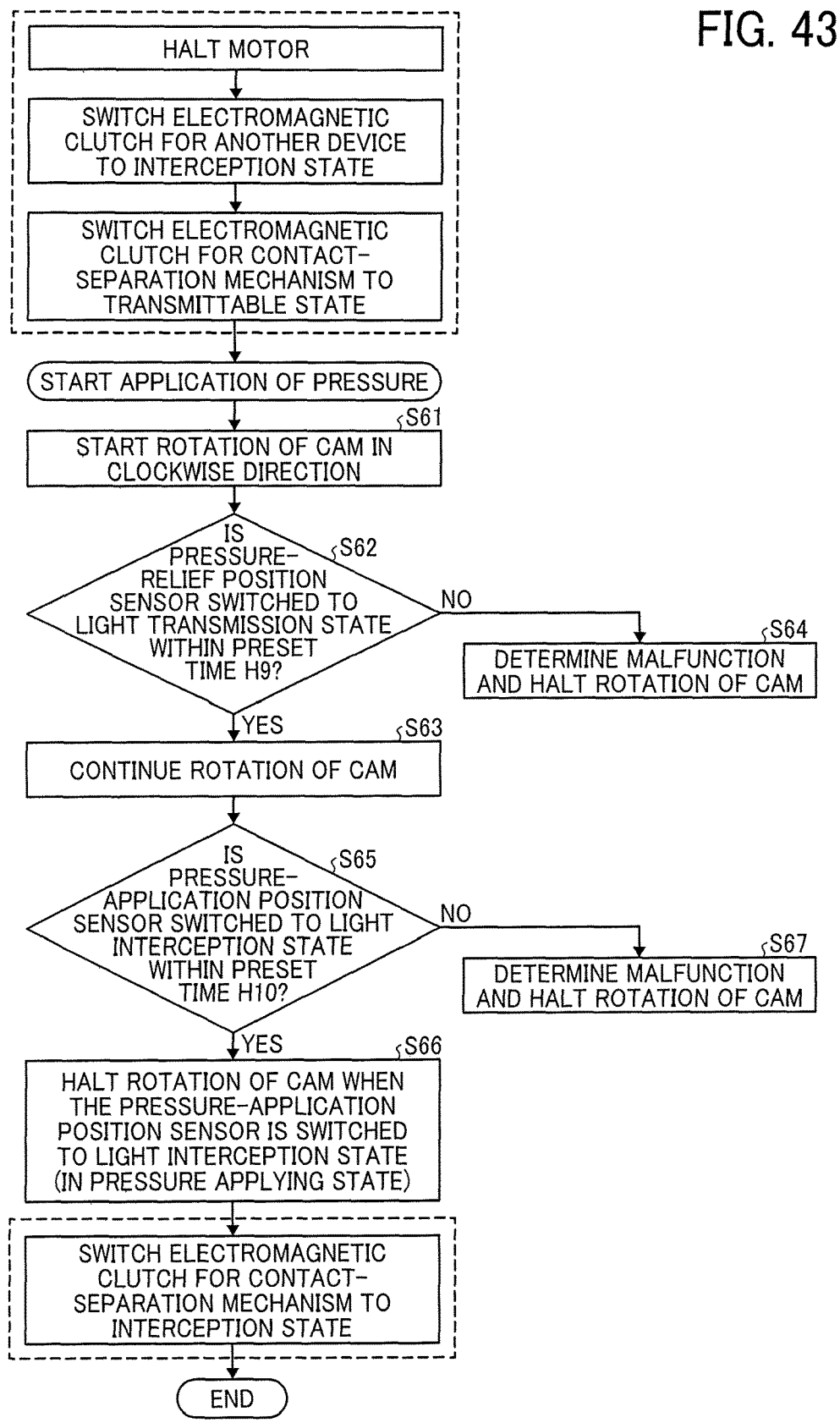
FIG. 43 is a flowchart of control of rotation with the brushless direct current motor and the two optical sensors to apply pressure.

Referring now to FIGS. 41 through 43, a description is given of how to control rotation of the cam 41 with a brushless DC motor and two optical sensors.

FIG. 41 is a schematic view of a contact-separation mechanism 400X, serving as a cam device, which incorporates the pressure-relief position sensor 49 and the pressure-application position sensor 50, and the brushless DC motor 61 as a driver.

As described above, the pressure-relief position sensor 49, serving as a first optical sensor, detects a rotational position of the cam 41 during the pressure relief operation. The pressure-application position sensor 50, serving as a second optical sensor, detects a rotational position of the cam 41 during the pressure applying operation. Note that the light shield 52 of the present embodiment has a general shape. A driving system of the contact-separation mechanism 400X illustrated in FIG. 41 is similar to the driving system of the contact-separation mechanism 400W illustrated in FIG. 38.

FIGS. 42 and 43 illustrate control flows with the pressure-relief position sensor 49, the pressure-application position sensor 50, and the brushless DC motor 61. Specifically, FIG. 42 is a flowchart of control of rotation with the pressure-relief position sensor 49, the pressure-application position sensor 50, and the brushless DC motor 61, to relieve pressure. FIG. 43 is a flowchart of control of rotation with the pressure-relief position sensor 49, the pressure-application position sensor 50, and the brushless DC motor 61, to apply pressure.

The control flow of the pressure relief operation of FIG. 42 and the control flow of the pressure applying operation of FIG. 43 are basically identical to the control flow of FIG. 33 and the control flow of FIG. 37, respectively, with the pressure-relief position sensor 49 and the pressure-application position sensor 50. However, since the configuration with the brushless DC motor 61 accompanies switching between the first electromagnetic clutch 62 and the second electromagnetic clutch 63, FIG. 42 includes steps enclosed by broken lines in addition to the flow of FIG. 33 while FIG. 43 includes steps enclosed by broken lines in addition to the flow of FIG. 37. Specifically, before starting the pressure relief operation or the pressure applying operation, the brushless DC motor 61 is deactivated to switch the second electromagnetic clutch 63 to the interception state and to switch the first electromagnetic clutch 62 to the transmittable state. Then, the pressure relief operation or the pressure applying operation is started. When the pressure relief operation or the pressure applying operation is completed, the first electromagnetic clutch 62 is switched to the interception state.

Thus, with the two optical sensors (i.e., the pressure-relief position sensor 49 and the pressure-application position sensor 50) instead of the timer 70, the rotation of the cam 41 can be controlled with the brushless DC motor 61. Compared to the configuration including two optical sensors, the configuration including a timer and an optical sensor may be advantageous in cost reduction and downsizing of the contact-separation mechanism. However, the configuration including two optical sensors is free from variation in time measurement by the timer, and therefore enhances accuracy in halting rotation of the cam at a desired position while facilitating control of rotation of the cam.

According to the embodiments described above, worm gears are employed to prevent changes in speed of the cam 41. Alternatively, the worm gears may be omitted. Specifically, use of a stepping motor instead of a brushed DC motor obviates employment of the worm gears.

Figure 44:
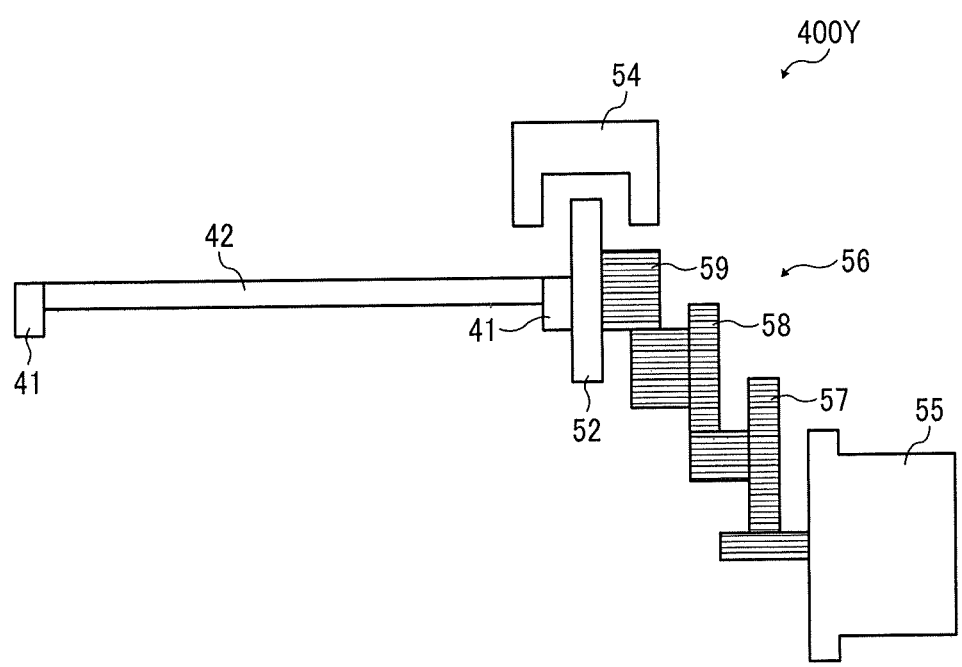
FIG. 44 is a schematic view of a contact-separation mechanism incorporating a stepping motor.

Referring now to FIG. 44, a description is given of an example of a contact-separation mechanism with a stepping motor.

FIG. 44 is a schematic view of a contact-separation mechanism 400Y, serving as a cam device, which incorporates a stepping motor 55.

Powered stepping motors are generally capable of holding a rotational position with an exciting force. Therefore, if the cam 41 is forced to increase the rotational speed thereof, employment of the stepping motor 55 as a driver prevents such acceleration of rotation of the cam 41 without worm gears. In the contact-separation mechanism 400Y with the stepping motor 55, a gear train 56 is simply constructed of a plurality of spur gears, namely, spur gears 57, 58, and 59, as illustrated in FIG. 44. The gear train 56 links or couples the stepping motor 55 to the cam 41 and the light shield 52. Since the contact-separation mechanism 400Y with the stepping motor 55 prevents changes in speed of the cam 41 without worm gears, the contact-separation mechanism 400Y has a relatively simple layout.

By contrast, unlike contact-separation mechanisms with a powered stepping motor, contact-separation mechanisms incorporating worm gears prevent acceleration of rotation of the cam by a self-locking function even if the driver of the contact-separation mechanisms is not powered, thereby saving electrical energy. In addition, employment of worm gears reduces the number of gears that secure reduction ratio, thereby being advantageous in cost reduction and downsizing of the contact-separation mechanism.

Since stepping motors are capable of holding the rotational position while rotating per unit of steps determined according to pulse signals provided periodically, the contact-separation mechanism 400Y with the stepping motor 55 enhances accurate control of the rotational angle and the rotational speed of the cam 41. In other words, such a contact-separation mechanism with a stepping motor can obviate employment of a sensor to control the position of the cam at which the cam stops rotating. In the present embodiment, the contact-separation mechanism 400Y of FIG. 44 includes an optical sensor 54 so as to locate the cam 41 at a home position in case the image forming apparatus incorporating the contact-separation mechanism 400Y is reactivated after the image forming apparatus is turned off unexpectedly during rotation of the cam 41 and stops rotation of the cam 41 at an unusual position.

Referring now to FIGS. 45A through 48, a description is given of how to control rotation of the cam 41 with the stepping motor 55 to relieve pressure.

Figure 45A:
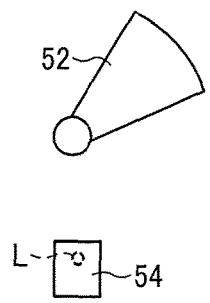
FIG. 45A is a schematic view of the light shield and an optical sensor, illustrating a position of the light shield before starting rotation and when the optical sensor is in the light transmission state.
Figure 45B:
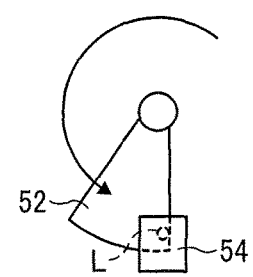
FIG. 45B is a schematic view of the light shield and the optical sensor, illustrating a position of the light shield after starting rotation and when the optical sensor enters the light interception state.
Figure 46A:
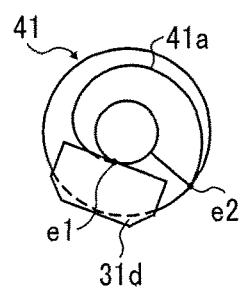
FIG. 46A is a schematic view of the cam and the cam receiver, illustrating relative positions thereof when the light shield is positioned as illustrated in FIG. 45A.
Figure 46B:
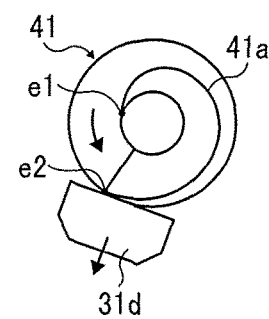
FIG. 46B is a schematic view of the cam and the cam receiver, illustrating relative positions thereof when the light shield is positioned as illustrated in FIG. 45B.
Figure 47:
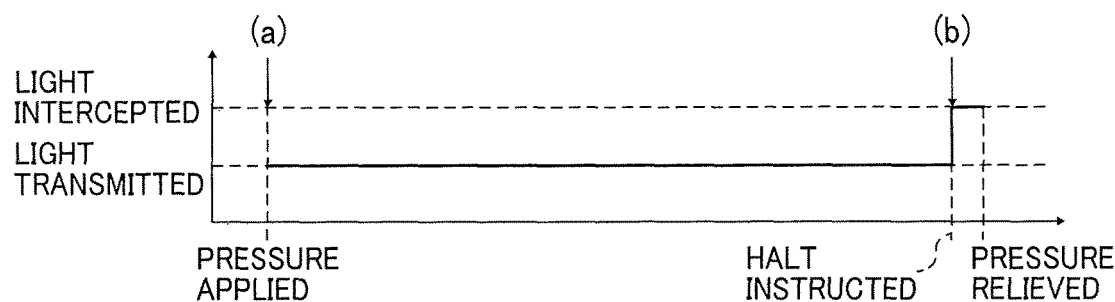
FIG. 47 is a timing chart of interception and transmission of light emitted by the optical sensor.
Figure 48:
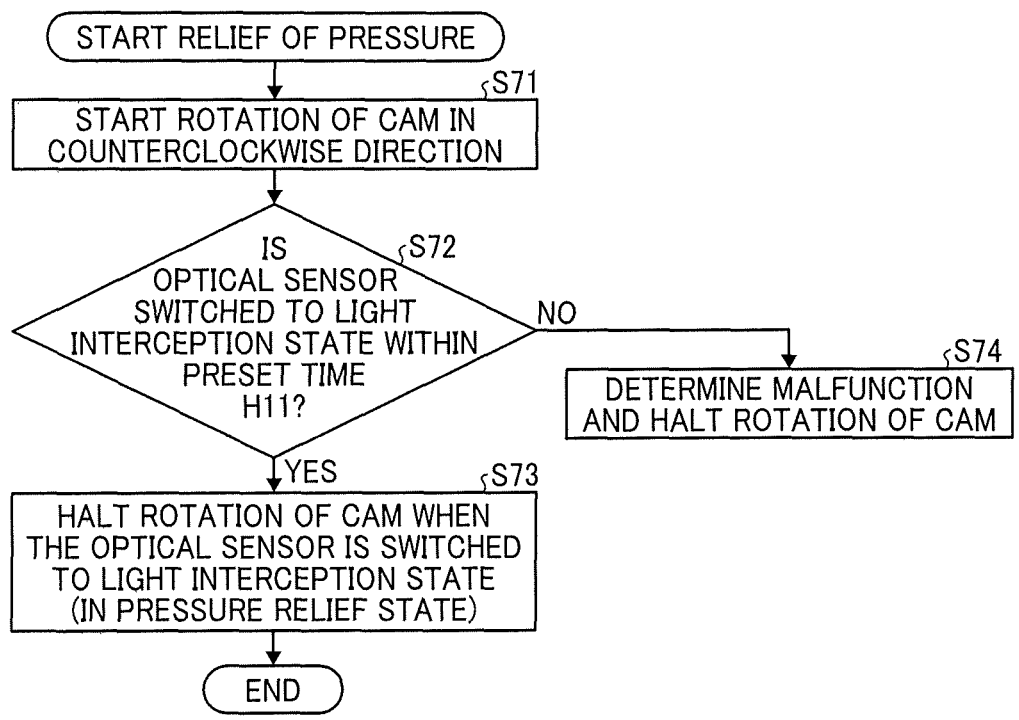
FIG. 48 is a flowchart of control of rotation with the stepping motor and the optical sensor to relieve pressure.

FIGS. 45A and 45B illustrate rotational positions of the light shield 52. FIGS. 46A and 46B illustrate rotational positions of the cam 41. More specifically, FIG. 45A is a schematic view of the light shield 52 and the optical sensor 54, illustrating a position of the light shield 52 before starting rotation and when the optical sensor 54 is in the light transmission state; FIG. 45B is a schematic view of the light shield 52 and the optical sensor 54, illustrating a position of the light shield 52 after starting rotation and when the optical sensor 54 enters the light interception state; FIG. 46A is a schematic view of the cam 41 and the cam receiver 31d, illustrating relative positions thereof when the light shield 52 is positioned as illustrated in FIG. 45A; FIG. 46B is a schematic view of the cam 41 and the cam receiver 31d, illustrating relative positions thereof when the light shield 52 is positioned as illustrated in FIG. 45B; FIG. 47 is a timing chart of interception and transmission of light emitted by the optical sensor 54. FIG. 47 illustrates states (a) and (b). In the states (a) and (b), the light shield 52 is positioned as illustrated in FIGS. 45A and 45B, respectively, while the cam 41 is positioned as illustrated in FIGS. 46A and 46B, respectively. FIG. 48 is a flowchart of control of rotation with the stepping motor 55 and the optical sensor 54 to relieve pressure.

In the normal pressure applying state illustrated in FIG. 45A, the optical sensor 54 is in the light transmission state as the light shield 52 does not intercept light from the optical sensor 54. As the cam 41 in the normal pressure applying state starts rotating in a counterclockwise direction (i.e., positive direction) as illustrated in FIG. 46B (in step S71 of FIG. 48), the light shield 52 rotates together with the cam 41 in the same direction. As the light shield 52 rotates, the leading end of the light shield 52 in the direction of rotation thereof overlaps the light emitting portion L of the optical sensor 54, thereby switching the optical sensor 54 to the light interception state as illustrated in FIG. 45B. Then, the controller 60 determines whether the optical sensor 54 is switched to the light interception state within a preset time h11 from when the cam 41 starts rotating (in step S72 of FIG. 48).

If the controller 60 determines that the optical sensor 54 is switched to the light interception state within the preset time h11 (YES in step S72 of FIG. 48), then, the controller 60 determines that there is no malfunction, and outputs a direction to halt rotation of the cam 41 at the time when the optical sensor 54 is switched to the light interception state (in step S73 of FIG. 48). According to the direction, the cam 41 stops rotating and the pressure relief operation is completed. By contrast, if the controller 60 determines that the optical sensor 54 is not switched to the light interception state within the preset time h11 (NO in step S72 of FIG. 48), for example if the optical sensor 54 is not switched to the light interception state even after the preset time h11 elapses, then, the controller 60 determines that there is a malfunction, and halts rotation of the cam 41 so as not to continue the rotation of the cam 41 (in step S74 of FIG. 48).

Referring now to FIGS. 49A through 52, a description is given of how to control rotation of the cam 41 with the stepping motor 55 to apply pressure.

Figure 49A:
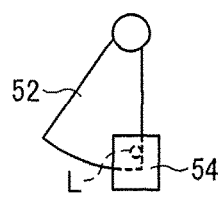
FIG. 49A is a schematic view of the light shield and the optical sensor, illustrating a position of the light shield before starting rotation and when the optical sensor is in the light interception state.
Figure 49B:
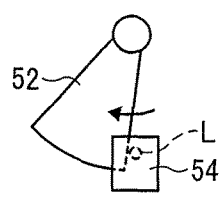
FIG. 49B is a schematic view of the light shield and the optical sensor, illustrating a position of the light shield after starting rotation and when the optical sensor enters the light transmission state.
Figure 49C:
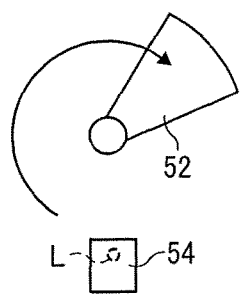
FIG. 49C is a schematic view of the light shield and the optical sensor, illustrating a position of the light shield when the optical sensor is in the light transmission state.
Figure 50A:
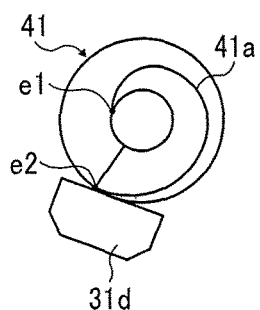
FIG. 50A is a schematic view of the cam and the cam receiver, illustrating relative positions thereof when the light shield is positioned as illustrated in FIG. 49A.
Figure 50B:
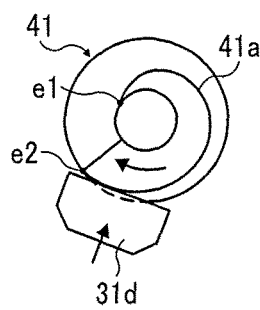
FIG. 50B is a schematic view of the cam and the cam receiver, illustrating relative positions thereof when the light shield is positioned as illustrated in FIG. 49B.
Figure 50C:
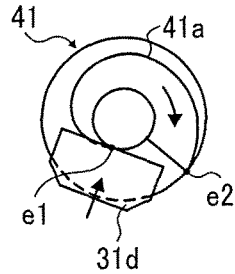
FIG. 50C is a schematic view of the cam and the cam receiver, illustrating relative positions thereof when the light shield is positioned as illustrated in FIG. 49C.
Figure 51:
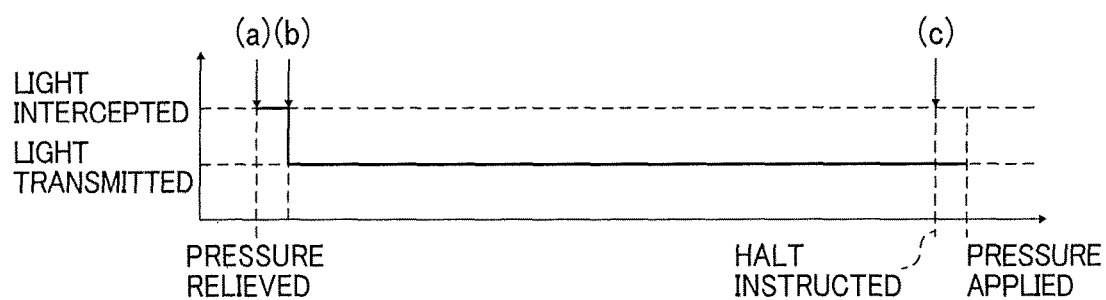
FIG. 51 is a timing chart of interception and transmission of light emitted by the optical sensor.
Figure 52:
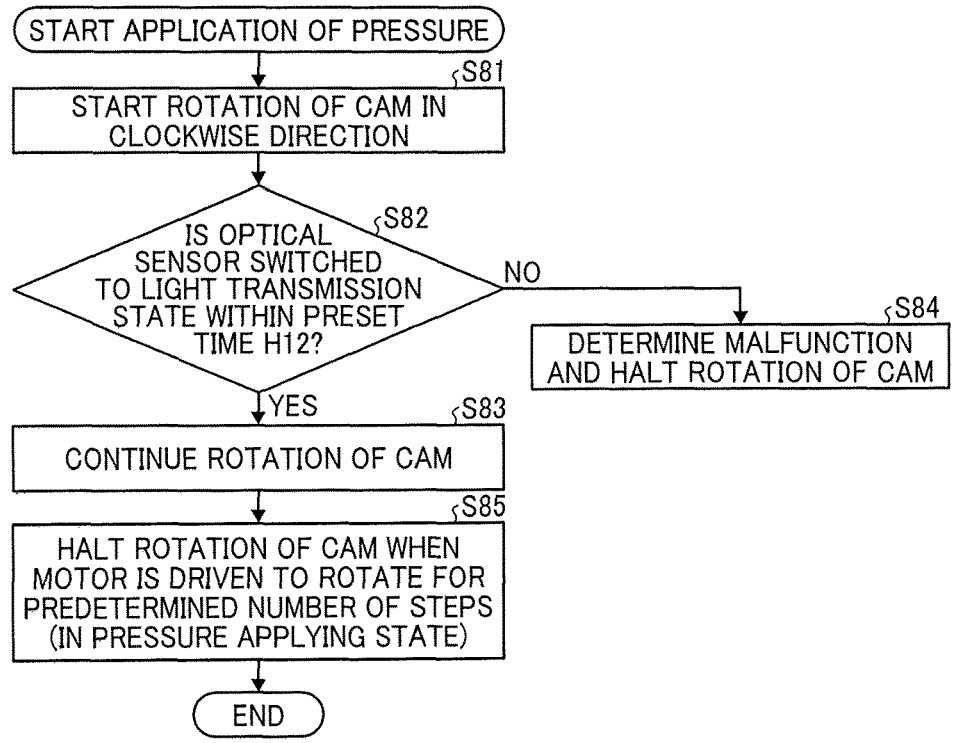
FIG. 52 is a flowchart of control of rotation with the stepping motor and the optical sensor to apply pressure.

FIGS. 49A through 49C illustrate rotational positions of the light shield 52. FIGS. 50A through 50C illustrate rotational positions of the cam 41. More specifically, FIG. 49A is a schematic view of the light shield 52, and the optical sensor 54, illustrating a position of the light shield 52 before starting rotation and when the optical sensor 54 in the light interception state; FIG. 49B is a schematic view of the light shield 52 and the optical sensor 54, illustrating a position of the light shield 52 after starting rotation and when the optical sensor 54 enters the light transmission state; FIG. 49C is a schematic view of the light shield 52 and the optical sensor 54, illustrating a position of the light shield 52 when the optical sensor 54 is in the light transmission state; FIG. 50A is a schematic view of the cam 41 and the cam receiver 31d, illustrating relative positions thereof when the light shield 52 is positioned as illustrated in FIG. 49A; FIG. 50B is a schematic view of the cam 41 and the cam receiver 31d, illustrating relative positions thereof when the light shield 52 is positioned as illustrated in FIG. 49B; FIG. 50C is a schematic view of the cam 41 and the cam receiver 31*d*, illustrating relative positions thereof when the light shield 52 is positioned as illustrated in FIG. 49C; FIG. 51 is a timing chart of interception and transmission of light emitted by the optical sensor 54. FIG. 51 illustrates states (a) through (c). In the states (a) through (c), the light shield 52 is positioned as illustrated in FIGS. 49A through 49C, respectively, while the cam 41 is positioned as illustrated in FIGS. 50 through 50C, respectively. FIG. 52 is a flowchart of control of rotation with the stepping motor 55 and the optical sensor 54 to apply pressure.

As the cam 41 in the pressure relief state of FIG. 50A starts rotating in a clockwise direction (i.e., negative direction) as illustrated in FIG. 50B (in step S81 of FIG. 52), the light shield 52 rotates together with the cam 41 in the same direction. As the light shield 52 rotates, the trailing end of the light shield 52 in the direction of rotation thereof passes before the light emitting portion L of the optical sensor 54, thereby switching the optical sensor 54 to the light transmission state as illustrated in FIG. 49B. Then, the controller 60 determines whether the optical sensor 54 is switched to the light transmission state within a preset time h12 from when the cam 41 starts rotating (in step S82 of FIG. 52).

If the controller 60 determines that the optical sensor 54 is switched to the light transmission state within the preset time h12 (YES in step S82 of FIG. 52), then, the controller 60 determines that there is no malfunction, and continues rotation of the cam 41 (in step S83 of FIG. 52). By contrast, if the controller 60 determines that the optical sensor 54 is not switched to the light transmission state within the preset time h12 (NO in step S82 of FIG. 52), for example, if the optical sensor 54 is not switched to the light transmission state even after the preset time h12 elapses, then, the controller 60 determines that there is a malfunction, and halts rotation of the cam 41 so as not to continue the rotation of the cam 41 (in step S84 of FIG. 52).

If the rotation of the cam 41 is continued, the stepping motor 55 is driven to rotate for a predetermined number of steps after the optical sensor 54 enters the light transmission state. At the time when the stepping motor 55 is driven to rotate for the predetermined number of steps, the controller 60 outputs a direction to halt rotation of the cam 41 (in step S85 of FIG. 52). According to the direction, the cam 41 stops rotating and the pressure applying operation is completed.

Thus, by driving the stepping motor 55 to rotate for the predetermined number of steps, the controller 60 halts rotation of the cam 41 at a desired position without the optical sensor 54. In addition, since the rotation of the cam 41 is controllable without the timer 70, the contact-separation mechanism 400Y enhances accuracy in halting rotation of the cam 41 at a desired position. Note that, in the flow described above, the optical sensor 54 is used to detect a pressure-relief position to relieve pressure. Alternatively, the optical sensor 54 may be omitted provided that the number of steps of the stepping motor 55 is controlled to halt rotation of the cam 41 at a predetermined pressure-relief position.

Descriptions have been given of the embodiments that are applied to the fixing device 12 to change pressure depending on the type of recording media. However, the embodiments can be applied for other purposes. Alternatively, for example, the embodiments of the present disclosure may be applied to reduce pressure to facilitate removal of a recording medium stuck at the fixing nip, or to reduce pressure after the recording medium passes through the fixing nip so as to prevent plastic deformation of a pressure roller and a fixing roller. The embodiments of the present disclosure may be applied to a fixing device in which the pressure roller becomes completely apart from the fixing roller, and therefore does not contact the fixing roller, in the pressure relief state.

The fixing device to which the embodiments of the present disclosure is not limited to the fixing devices described above that includes a pair of rollers (e.g., fixing roller and pressure roller). Alternatively, for example, the embodiments of the present disclosure may be applied to a fixing device incorporating an endless fixing belt instead of the fixing roller.

Figure 53:
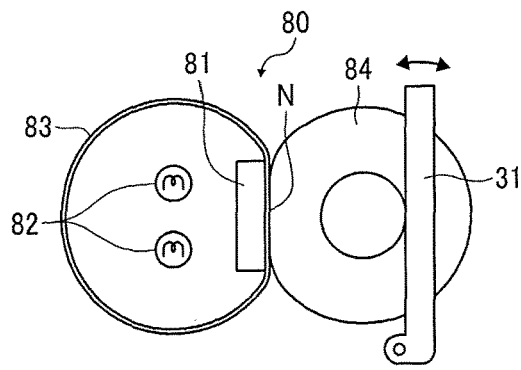
FIG. 53 is a schematic view of a fixing device incorporating a fixing belt.

Referring now to FIG. 53, a description is given of a fixing device 80 incorporating an endless fixing belt 83.

FIG. 53 is a schematic view of the fixing device 80.

In addition to the fixing belt 83, the fixing device 80 includes, e.g., a nip formation pad 81, a heater 82, a pressure roller 84, and the pressure lever 31. As illustrated in FIG. 53, the nip formation pad 81 and the heater 82 are disposed inside a loop formed by the fixing belt 83. The pressure roller 84 is pressed against the nip formation pad 81 via the fixing belt 83, thereby forming the fixing nip N between the fixing belt 83 and the pressure roller 84. In the fixing device 80, the pressure roller 84 serves as a first rotator or a contact-separation member to approach and separate from the fixing belt 83 serving as a second rotator or an opposed member that is disposed opposite the contact-separation member (i.e., pressure roller 84).

The fixing device to which the embodiments of the present disclosure is not limited to the fixing devices as described above in which the pressure roller approaches and separates from the fixing roller. Alternatively, for example, the embodiments of the present disclosure may be applied to a fixing device in which the fixing roller approaches and separates from an opposed roller as illustrated in FIG. 54.

Figure 54:
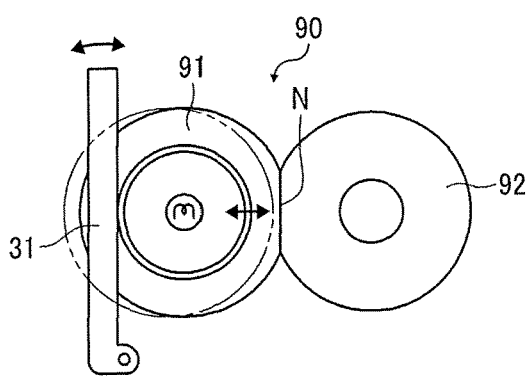
FIG. 54 is a schematic view of a fixing device incorporating a fixing roller that approaches and separates from an opposed roller.

FIG. 54 is a schematic view of a fixing device 90 incorporating a fixing roller 91 and an opposed roller 92 disposed opposite the fixing roller 91.

In the fixing device 90, the fixing roller 91 is configured to approach and separate from the opposed roller 92.

The contact-separation mechanism according to the embodiments described above can be applied not only to the fixing devices but also to transfer devices that transfer an image on a recording medium such as a paper sheet.

Figure 55:
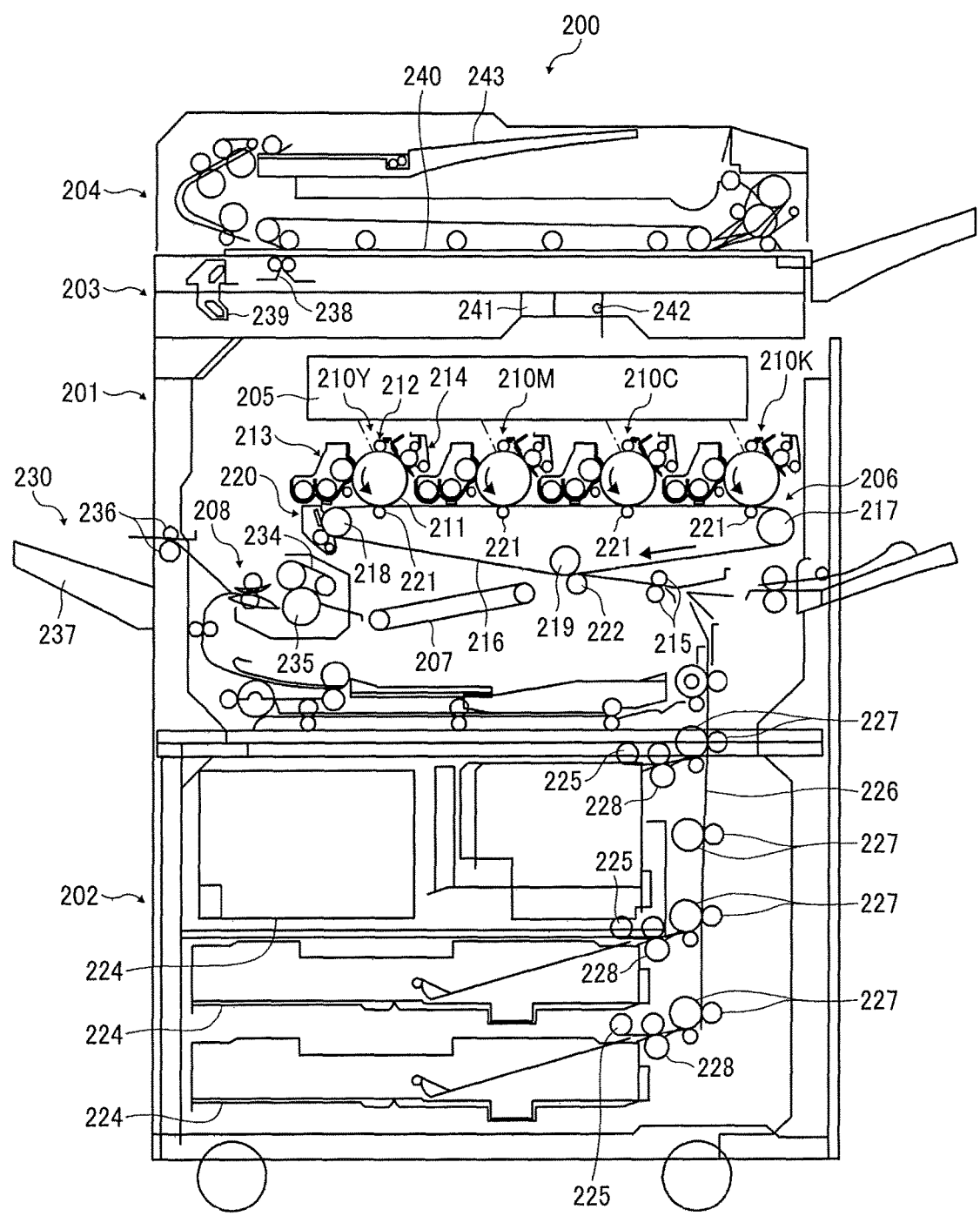
FIG. 55 is a schematic view of a color image forming apparatus according to an embodiment of the present disclosure, in which a recording medium is conveyed through a transfer device in a lateral direction.

Referring now to FIG. 55, a description is given of an overall construction and an image forming operation of a color image forming apparatus incorporating a transfer device that includes a contact-separation mechanism.

FIG. 55 is a schematic view of a color image forming apparatus 200.

Firstly, a description is now given of the overall construction of the color image forming apparatus 200.

The image forming apparatus 200 includes, e.g., an image forming device 201, a sheet feeder 202, a scanner 203, a transfer device 206, a conveyor belt 207, a fixing device 208, a sheet ejection device 230, and an automatic document feeder (ADF) 204.

The image forming device 201 includes four process units 210Y, 210M, 210C, and 210K to form an image of yellow (Y), magenta (M), cyan (C), and black (K) corresponding to color separation components of a color image, respectively. The process units 210Y, 210M, 210C, and 210K have identical configurations, except that the process units 210Y, 210M, 210C, and 210K contain developers in different colors, that is, yellow, cyan, magenta, and black, respectively.

Specifically, each of the process units 210Y, 210M, 210C, and 210K includes, e.g., a drum-shaped photoconductor 211, a charger 212, a developing device 213, and a cleaner 214.

The photoconductor 211 serves as an image bearer or a latent image bearer that bears an electrostatic latent image and a resultant toner image. The charger 212 charges an outer circumferential surface of the photoconductor 211. The developing device 213 supplies toner as a developer to the electrostatic latent image formed on the outer circumferential surface of the photoconductor 211, thus rendering the electrostatic latent image visible as a toner image. The cleaner 214 cleans the outer circumferential surface of the photoconductor 211. Note that FIG. 1 illustrates reference numerals assigned to the photoconductor 211, the charger 212, the developing device 213, and the cleaner 214 of the process unit 210Y that forms a yellow toner image, as representatives of the photoconductor 211, the charger 212, the developing device 213, and the cleaner 214 of the four process units 210Y, 210M, 210C, and 210K.

The image forming device 201 further includes an optical writing unit 205. The optical writing unit 205 includes, e.g., a light source, a polygon mirror, an f-θ lens, and a reflection mirror. The optical writing unit 205 irradiates the outer circumferential surface of the photoconductor 211 with a laser beam according to image data.

The transfer device 206 includes, e.g., an intermediate transfer belt 216 serving as an intermediate transferor, a belt cleaner 220, a tension roller 217, a driving roller 218, a secondary transfer backup roller 219 serving as an opposed secondary transferor, four primary transfer rollers 221 serving as primary transferors, and a secondary transfer roller 222 serving as a secondary transferor. The intermediate transfer belt 216 is entrained around and tensioned by a plurality of rollers including the tension roller 217.

The four primary transfer rollers 221 contact the respective photoconductors 211 via the intermediate transfer belt 216. In other words, each of the photoconductors 211 contacts the intermediate transfer belt 216. Accordingly, four areas of contact, herein referred to as primary transfer nips, are formed between the four photoconductors 211 and the intermediate transfer belt 216.

The secondary transfer roller 222 contacts the secondary transfer backup roller 219 via the intermediate transfer belt 216. In other words, the secondary transfer roller 222 and the intermediate transfer belt 216 contact each other, thereby forming an area of contact, herein referred to as a secondary transfer nip, between the intermediate transfer belt 216 and the secondary transfer roller 222.

The sheet feeder 202 includes a plurality of sheet trays 224, on which a plurality of sheets as recording media lies stacked. Each of the plurality of sheet trays 224 includes a sheet feeding roller 225 and a separation roller 228. The sheet feeding roller 225 feeds an uppermost sheet of the plurality of sheets from the sheet trays 224 to a conveyance passage 226. The separation roller 228 separates the sheet thus fed from other sheets.

A plurality of conveyance roller pairs 227 and a registration roller pair 215 are disposed along the conveyance passage 226. The plurality of conveyance roller pairs 227 receives and conveys the sheet along the conveyance passage 226 to the registration roller pair 215. The registration roller pair 215 sends out the sheet to the secondary transfer nip.

The fixing device 208 includes, e.g., a fixing belt 234 and a pressure roller 235. The fixing belt 234 is entrained around two rollers (herein referred to as first and second rollers). The pressure roller 235 is pressed against one (e.g., first roller) of the two rollers around which the fixing belt 234 is entrained. The fixing belt 234 and the pressure roller 235 contact each other, thereby forming an area of contact, herein referred to as a fixing nip, between the fixing belt 234 and the pressure roller 235. A heater is disposed inside the first roller against which the pressure roller 235 is pressed. The heater generates heat, thereby heating the fixing belt 234.

The sheet ejection device 230 includes a sheet ejection roller pair 236 and an output tray 237. The sheet ejection roller pair 236 ejects the sheet onto the output tray 237 disposed outside a housing of the image forming apparatus 200. Thus, a plurality of sheets lies stacked on the output tray 237.

The scanner 203 includes, e.g., a first carrier 238, a second carrier 239, an exposure glass 240, an image forming lens 241, and a reading sensor 242. Each of the first carrier 238 and the second carrier 239 includes a mirror inside. The ADF 204 disposed above the scanner 203 includes a document tray 243 on which an original or a document is placed.

To provide a fuller understanding of the embodiments of the present disclosure, a description is now given of the image forming operation of the color image forming apparatus 200 with continued reference to FIG. 55.

In order to photocopy a document, a user, for example, places the document on the document tray 243 of the ADF 204. Alternatively, the user may lift the ADF 204, place the document on the exposure glass 240 of the scanner 203, and lower the ADF 204 to cause the ADF 204 to press the document against the exposure glass 240.

Thereafter, the user presses a start button to cause the scanner 203 to start a document reading operation. The document reading operation starts with traveling of the first carrier 238 together with the second carrier 239. A light source of the first carrier 238 emits light. The light is reflected from the surface of the document, and is further reflected by the mirror disposed inside the second carrier 239 to the image forming lens 241. After passing through the image forming lens 241, the light enters the reading sensor 242 as incident light. The reading sensor 242 establishes image data according to the incident light.

Meanwhile, components disposed inside each of the process units 210Y, 210M, 210C, and 210K, the transfer device 206, the conveyor belt 207, the fixing device 208, and the like are driven to start respective operations.

Specifically, in each of the process units 210Y, 210M, 210C, and 210K, the photoconductor 211 is driven to rotate in a counterclockwise direction in FIG. 55. The charger 212 uniformly charges the outer circumferential surface of the photoconductor 211 to a predetermined polarity. According to the image data established by the reading sensor 242, the optical writing unit 205 irradiates the charged surface of the photoconductor 211 with a laser beam, resulting in reduction of an electric potential of an irradiated or exposed portion of the outer circumferential surface of the photoconductor 211. As a consequence, an electrostatic latent image is formed on the outer circumferential surface of the photoconductor 211. The image data used to expose the photoconductor 211 is monochrome image data produced by decomposing a desired full color image into yellow, magenta, cyan, and black image data. The developing device 213 supplies toner as a developer to the electrostatic latent image thus formed on the photoconductors 211, rendering the electrostatic latent image visible as a toner image.

In the transfer device 206, as the driving roller 218 stretching the intermediate transfer belt 216 tight is driven to rotate, the intermediate transfer belt 216 rotates in a clockwise direction as indicated by an arrow in FIG. 55. A power supply applies a constant voltage or a constant current control voltage having a polarity opposite a polarity of the charged toner to the primary transfer rollers 221, generating transfer electric fields at the respective primary transfer nips formed between the primary transfer rollers 221 and the photoconductors 211. The transfer electric fields thus generated at the primary transfer nips transfer yellow, magenta, cyan, and black toner images from the respective photoconductors 211 onto the intermediate transfer belt 216 such that the yellow, magenta, cyan, and black toner images are superimposed one atop another on the intermediate transfer belt 216. Thus, a composite, full-color toner image is formed on the surface of the intermediate transfer belt 216. After the yellow, cyan, magenta, and black toner images are transferred onto the intermediate transfer belt 216, the cleaner 214 removes residual toner from the photoconductor 211 in each of the process units 210Y, 210M, 210C, and 210K. In this case, the residual toner is toner that has failed to be transferred onto the intermediate transfer belt 216, and therefore remains on the outer circumferential surface of the photoconductor 211.

At substantially the same time with the document reading operation described above, the sheet feeder 202 starts a sheet feeding operation. In the sheet feeding operation, one of the sheet feeding rollers 225 is selectively rotated to feed sheets from the corresponding sheet tray 224. The separation roller 228 separates the sheets thus fed one by one. The sheet thus separated then enters the conveyance passage 226. At least one of the plurality of conveyance roller pairs 227 conveys the sheet along the conveyance passage 226 toward the secondary transfer nip via the registration roller pair 215.

The registration roller pair 215 sends out the sheet thus conveyed from the sheet tray 224 toward the secondary transfer nip such that the sheet meets the full-color toner image formed on the intermediate transfer belt 216 at the secondary transfer nip. The secondary transfer roller 222 is supplied with a transfer voltage having a polarity opposite the polarity of the charged toner contained in the full-color toner image, thereby generating a transfer electric field at the secondary transfer nip. The transfer electric field thus generated transfers the full-color toner image from the intermediate transfer belt 216 onto the sheet at the secondary transfer nip. Specifically, the yellow, magenta, cyan, and black toner images constructing the full-color toner image are collectively transferred onto the sheet. After the full-color toner image is transferred onto the sheet, the belt cleaner 220 removes residual toner from the intermediate transfer belt 216. In this case, the residual toner is toner that has failed to be transferred onto the sheet, and therefore remains on the intermediate transfer belt 216.

The conveyor belt 207 conveys the sheet bearing the full-color toner image to the fixing device 208. In the fixing device 208, the sheet is conveyed through the fixing nip between the fixing belt 234 and the pressure roller 235. At the fixing nip, the fixing belt 234 and the pressure roller 235 applies heat and pressure to the sheet, thereby fixing the full-color toner image onto the sheet. The sheet bearing the fixed toner image is ejected from the fixing nip by rotation of the fixing belt 234 and the pressure roller 235. Thereafter, the sheet ejection roller pair 236 ejects the sheet onto the output tray 237 disposed outside the housing of the image forming apparatus 200. Thus, a plurality of sheets lies stacked on the output tray 237.

The above describes the image forming operation of the color image forming apparatus 200 to form the full color toner image on the sheet. Alternatively, the image forming apparatus 200 may form a monochrome toner image by using any one of the four process units 210Y, 210M, 210C, and 210K, or may form a bicolor toner image or a tricolor toner image by using two or three of the process units 210Y, 210M, 210C, and 210K.

Typically, in transfer devices including an intermediate transfer belt as described above, a thick sheet (e.g., thick paper) entering the secondary transfer nip may cause an impact enough to suddenly burden the intermediate transfer belt or a roller at the secondary transfer nip. As a consequence, the rotational speed of the intermediate transfer belt may momentarily decrease, generating a difference of rotational speed between a photoconductor and the intermediate transfer belt. Such a difference of rotational speed may extend dots of a toner image, which is subjected to transfer onto the intermediate transfer belt, in a direction of rotation of the photoconductor, resulting in degradation of image quality. To address this circumstance, the transfer device according to the present embodiment includes a contact-separation mechanism that causes a secondary transfer roller to approach and separate from an intermediate transfer belt (or a secondary transfer backup roller).

Figure 56:
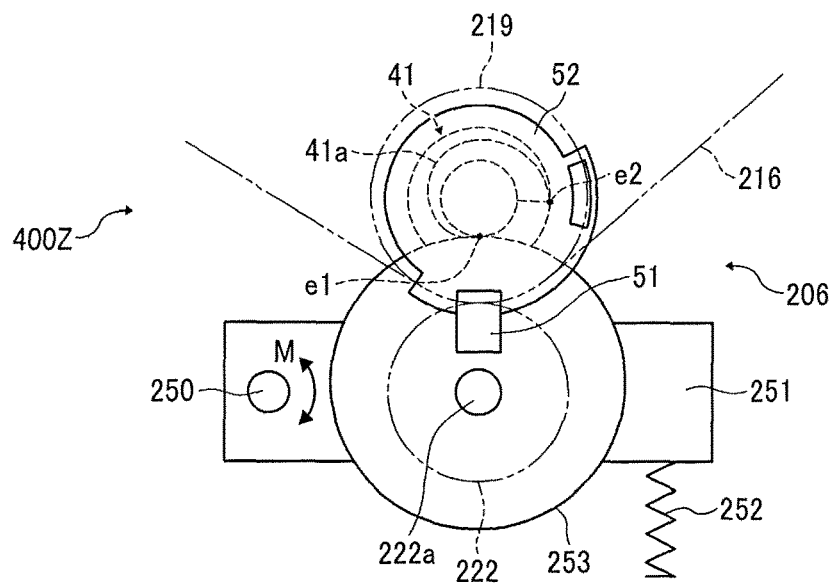
FIG. 56 is a schematic view of a contact-separation mechanism incorporated in a transfer device of the color image forming apparatus of FIG. 55.

Referring now to FIG. 56, a description is given of an example of the contact-separation mechanism that causes the secondary transfer roller as a first rotator or a contact-separation member to approach and separate from the intermediate transfer belt (or the secondary transfer backup roller) as a second rotator or an opposed member that is disposed opposite the contact-separation member.

FIG. 56 is a schematic view of a contact-separation mechanism 400Z, serving as a cam device, incorporated in the transfer device 206 described above.

According to the present example, the contact-separation mechanism 400Z causes the secondary transfer roller 222, serving as the first rotator or the contact-separation member, to approach and separate from the intermediate transfer belt 216 (or the secondary transfer backup roller 219), serving as the second rotator or the opposed member, which is disposed opposite the secondary transfer roller 222.

Specifically, as illustrated in FIG. 56, the secondary transfer roller 222 is held by a holder 251 that rotates about a pivot 250 in directions of rotation M. As the holder 251 rotates about the pivot 250, the secondary transfer roller 222 approaches and separates from the intermediate transfer belt 216. A pressure spring 252 serving as a biasing member presses against the holder 251 upwards in FIG. 56. That is, the secondary transfer roller 222 is held while being pressed against the intermediate transfer belt 216. A shaft 222a of the secondary transfer roller 222 is provided with a relatively rotatable idler roller 253.

The secondary transfer backup roller 219 is provided with the cam 41, which is similar to the cam 41 incorporated in the fixing devices according to the embodiments described above. According to the present embodiment, the transfer device 206 further includes the light shield 52 and the optical sensor 51 serving as a rotational position detector that detects the rotational position of the cam 41. The light shield 52 and the optical sensor 51 are similar to those described above.

In a state illustrated in FIG. 56, the idler roller 253 contacts the cam face 41a at the minimum point e1 by a biasing force of the pressure spring 252. In this state, the secondary transfer roller 222 is held at a position where the secondary transfer roller 222 is pressed against the intermediate transfer belt 216. The pressure at the secondary transfer nip is normal pressure under which a plain sheet (e.g., plain paper) is conveyed through the secondary transfer nip.

In order to relieve the normal pressure at the secondary transfer nip to convey a thick sheet (e.g., thick paper)

through the secondary transfer nip, the cam 41 is rotated in a counterclockwise direction in FIG. 56. As the cam 41 rotates in the counterclockwise direction in FIG. 56, the position where the idler roller 253 contacts the cam face 41a relatively moves from the minimum point e1 to the maximum point e2. That is, the cam 41 presses and moves the idler roller 253 downwards in FIG. 56. Meanwhile, the secondary transfer roller 222 is moved downwards in FIG. 56 together with the idler roller 253. As a consequence, the secondary transfer roller 222 is moved to a position where the secondary transfer roller 222 is apart from the intermediate transfer belt 216. Thus, the pressure is relieved at the secondary transfer nip. In other words, the secondary transfer nip is in the pressure relief state.

In order to apply pressure from the pressure relief state at the secondary transfer nip, the cam 41 is rotated in a clockwise direction in FIG. 56. As the cam 41 rotates in the clockwise direction in FIG. 56, the position where the idler roller 253 contacts the cam face 41a relatively moves from the maximum point e2 to the minimum point e1. That is, the idler roller 253 approaches the cam 41. Meanwhile, the secondary transfer roller 222 approaches the intermediate transfer belt 216 and presses against the intermediate transfer belt 216. Thus, the pressure increases at the secondary transfer nip, returning the secondary transfer nip to the normal pressure applying state. Note that, in the pressure applying operation and the pressure relief operation of the present embodiment, the rotation of the cam 41 can be controlled following the flows of controlling the rotation of the cam 41 in the fixing devices described above.

Thus, the contact-separation mechanism according to the embodiments of the present disclosure can be applied as a contact-separation mechanism (e.g., contact-separation mechanism 400Z) that causes the secondary transfer roller to approach and separate from the intermediate transfer belt. By employing the cam (e.g., cam 41) according to the embodiments of the present disclosure in the contact-separation mechanism of the transfer devices, advantages similar to advantages of the fixing devices described above can be obtained. Specifically, since the cam face 41a is provided over a range greater than half a round of the cam 41 in the direction of rotation of the cam 41, the maximum difference of the gradient of the cam face 41a is not reduced even if the cam face 41a has a reduced gradient. Accordingly, a sufficient distance is secured for the secondary transfer roller 222 to approach and separate from the intermediate transfer belt 216. In addition, an increase in torque is suppressed while the operating noises can be prevented.

Note that, the contact-separation mechanism 400Z of FIG. 56 incorporated in the transfer device 206 is similar to the contact-separation mechanism 400 of FIGS. 2 and 3 incorporated in the fixing device 12. Alternatively, the other contact-separation mechanisms described above may be applied as the contact-separation mechanism 400Z incorporated in the transfer device 206. In the transfer device 206 described above, the secondary transfer roller 222 is separated from the intermediate transfer belt 216 when a thick sheet (e.g., thick paper) is conveyed through the secondary transfer nip. Alternatively, the secondary transfer roller 222 may be separated from the intermediate transfer belt 216 at the time when a toner image is not transferred onto a sheet, so as to prevent adhesion of toner and plastic deformation of the secondary transfer roller 222, which may be caused if the secondary transfer roller 222 keeps pressing against the intermediate transfer belt 216.

The contact-separation mechanism 400Z is employed in the transfer device 206 in which the sheet is conveyed through the secondary transfer nip in a lateral or horizontal direction with respect to the secondary transfer nip in FIGS. 55 and 56. Alternatively, the contact-separation mechanism according to the embodiments of the present disclosure may be employed in a transfer device in which the sheet is conveyed through the secondary transfer nip in a vertical or perpendicular direction with respect to the secondary transfer nip.

Figure 57:
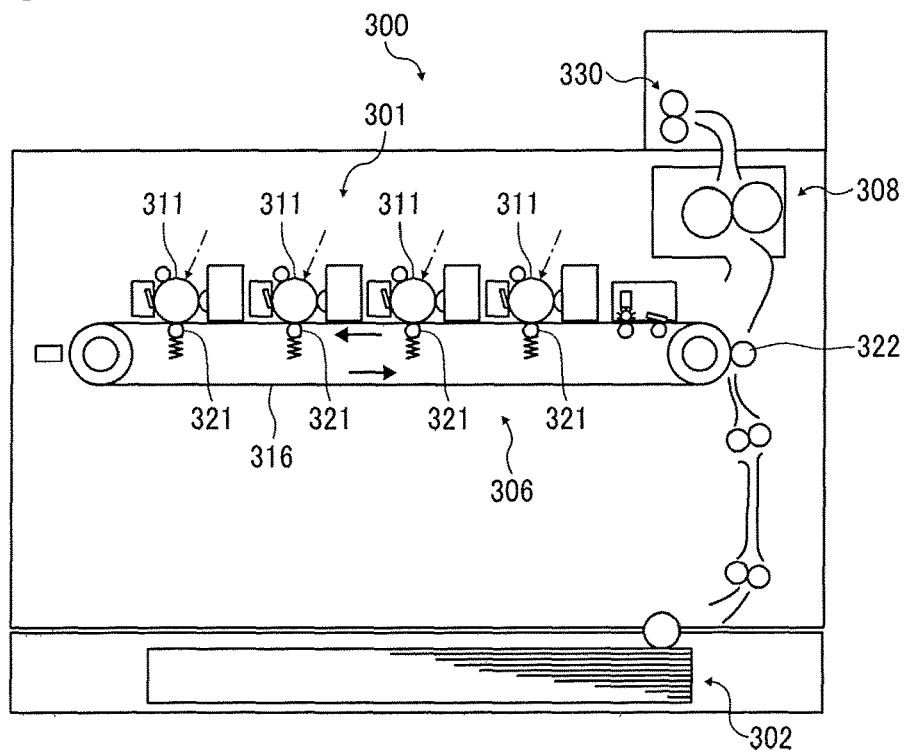
FIG. 57 is a schematic view of an image forming apparatus according to an embodiment of the present disclosure, in which a recording medium is conveyed through a transfer device in a vertical direction.

Referring now to FIG. 57, a description is given of the contact-separation mechanism employed in a transfer device 306 in which the sheet is conveyed through the secondary transfer nip in the vertical or perpendicular direction with respect to the secondary transfer nip in FIG. 57.

FIG. 57 is a schematic view of an image forming apparatus 300 incorporating the transfer device 306.

The transfer device 306 includes the contact-separation mechanism 400Z rotated at 90° from the position illustrated in FIG. 56, for example. With such a configuration, the contact-separation mechanism 400Z causes a secondary transfer roller 322 to approach and separate from an intermediate transfer belt 316. Note that, in addition to the secondary transfer roller 322 and the intermediate transfer belt 316, FIG. 57 illustrates an image forming device 301, a plurality of primary transfer rollers 321, a sheet feeder 302, a fixing device 308, and a sheet ejection device 330. The image forming device 301 includes a plurality of photoconductors 311. The basic configuration and operation of these components are similar to those of the components of the image forming apparatus 200 illustrated in FIG. 55. Therefore, redundant descriptions thereof are omitted unless otherwise required.

The contact-separation mechanism according to the embodiments of the present disclosure can be employed in a transfer device in which a primary transfer roller approaches and separates from a photoconductor.

Figure 58:
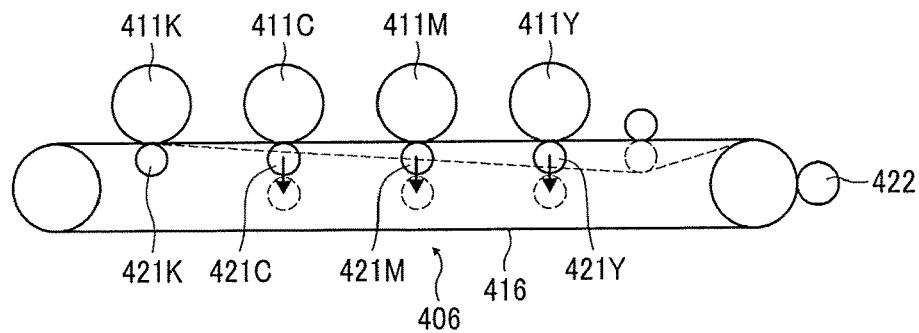
FIG. 58 is a schematic view of a transfer device, in which a primary transfer roller approaches and separate from a photoconductor.
Figure 59A:
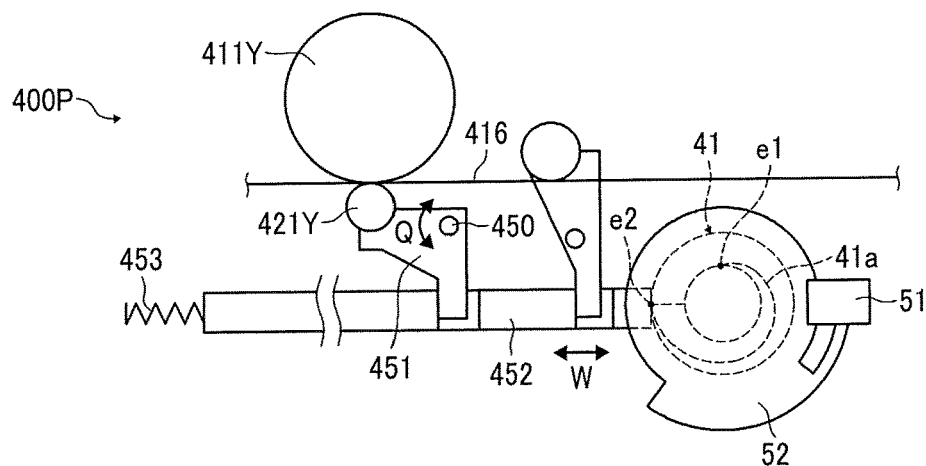
FIG. 59A is a schematic view of a contact-separation mechanism incorporated in the transfer device of FIG. 58, illustrating a contact state in which a primary transfer roller contacts a photoconductor via an intermediate transfer belt.
Figure 59B:
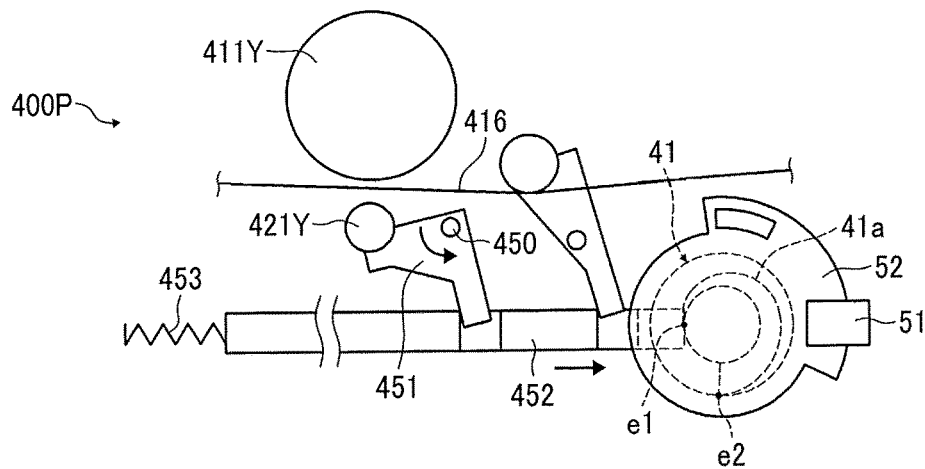
FIG. 59B is a schematic view of the contact-separation mechanism incorporated in the transfer device of FIG. 58, illustrating a separation state in which the primary transfer roller is apart from the photoconductor.

Referring now to FIGS. 58 through 59B, a description is given of a contact-separation mechanism 400P, serving as a cam device, employed in a transfer device 406. In the transfer device 406, primary transfer rollers 421C, 421M, and 421Y, serving as primary transferors, approach and separate from photoconductors 411C, 411M, and 411Y, respectively. In other words, the contact-separation mechanism 400P causes the primary transfer rollers 421C, 421M, and 421Y, serving as first rotators or contact-separation members, to approach and separate from the photoconductors 411C, 411M, and 411Y serving as second rotators or opposed members that are disposed opposite the contact-separation members (i.e., primary transfer rollers 421C, 421M, and 421Y).

FIG. 58 is a schematic view of the transfer device 406, in which an intermediate transfer belt 416 serving as an intermediate transferor is sandwiched between the photoconductors 411 (i.e., photoconductors 411K, 411C, 411M, and 411Y) and the primary transfer rollers 421 (i.e., primary transfer rollers 421K, 421C, 421M, and 421Y). FIG. 59A is a schematic view of the contact-separation mechanism 400P incorporated in the transfer device 406, illustrating a contact state in which the primary transfer roller 421Y contacts the photoconductor 411Y via the intermediate transfer belt 416. FIG. 59B is a schematic view of the contact-separation mechanism 400P incorporated in the transfer device 406, illustrating a separation state in which the primary transfer roller 421 is apart from the photoconductor 411Y.

When a black image is formed, a black toner image is formed on the photoconductor 411K. The primary transfer roller 421K contacts the photoconductor 411K via the intermediate transfer belt 416, thereby forming an area of contact, herein referred to as a primary transfer nip, between the photoconductor 411K and the intermediate transfer belt 416. At the primary transfer nip, the black toner image is transferred from the photoconductor 411K onto the intermediate transfer belt 416. On the other hand, the photoconductors 411Y, 411M, and 411C are not used because they contribute to forming toner images of yellow, magenta, and cyan, respectively. Accordingly, the contact-separation mechanism 400P separates the primary transfer rollers 421Y, 421M, and 421C from the photoconductors 411Y, 411M, and 411C, respectively, as illustrated in broken lines in FIG. 58, to reduce power consumption and prevent attrition of the photoconductors 411Y, 411M, and 411C and the intermediate transfer belt 416. Note that, in addition to the photoconductors 411K, 411C, 411M, and 411Y, the primary transfer rollers 421K, 421C, 421M, and 421Y, and the intermediate transfer belt 416, FIG. 42 illustrates a secondary transfer roller 422.

The primary transfer rollers 421Y, 421M, and 421C are provided with contact-separation mechanisms configured identically. To simplify the drawings, FIGS. 59A and 59B illustrate the contact-separation mechanism 400P for the primary transfer roller 421Y as a representative of the contact-separation mechanisms for the primary transfer rollers 421Y, 421M, and 421C that approach and separate from the photoconductors 411Y, 411M, and 411C, respectively.

As illustrated in FIG. 59A, the primary transfer roller 421Y is held by a holder 451 that rotates about a pivot 450 in directions of rotation Q. Since the holder 451 is engaged with a link 452 that linearly moves in directions W in FIG. 59A, the holder 451 is movable together with the link 452. The link 452 has an end portion, specifically, a left end portion in FIG. 59A, provided with a pressure spring 453 as a biasing member. The pressure spring 453 presses the link 452 toward the other end portion of the link 452, specifically, a right end portion of the link 452 in FIG. 59A. In short, the pressure spring 453 presses the link 452 rightwards in FIG. 59A. Accordingly, the right end portion of the link 452 is held in contact with the cam face 41a of the cam 41. The cam 41 is configured similarly to the cam 41 of the fixing devices described above. The transfer device 406 further includes the light shield 52 and the optical sensor 51 serving as a rotational position detector that detects the rotational position of the cam 41. The light shield 52 and the optical sensor 51 are similar to those of the fixing devices described above.

As the cam 41 in the contact state of FIG. 59A rotates in a clockwise direction in FIG. 59A, the position where the link 452 contacts the cam face 41a relatively moves from the maximum point e2 to the minimum point e1. In association with the rotation of the cam 41, the pressure spring 453 presses against the link 452, thereby moving the link 452 rightwards in FIG. 59B. In association with the movement of the link 452, the holder 451 rotates in a counterclockwise direction in FIG. 59B, thereby separating the primary transfer roller 421Y from the photoconductor 411Y. As a consequence, the intermediate transfer belt 416 is held apart from the photoconductor 411Y that is used to form a yellow toner image.

By contrast, in order to cause the primary transfer roller 421Y to approach the photoconductor 411Y, the cam 41 in the separation state of FIG. 59B is rotated in the counterclockwise direction in FIG. 59B. Accordingly, the position where the link 452 contacts the cam face 41a relatively moves from the minimum point e1 to the maximum point e2 while the cam 41 presses and moves the link 452 leftwards in FIG. 59B. In association with the movement of the link 452, the holder 451 rotates in a clockwise direction in FIG. 59B. As a consequence, as illustrated in FIG. 59A, the secondary transfer roller 222 adjoins the intermediate transfer belt 416.

Thus, the contact-separation mechanism according to the embodiments of the present disclosure can be applied as a contact-separation mechanism (e.g., contact-separation mechanism 400P) that causes a primary transfer roller to approach and separate from a photoconductor. By employing the cam (e.g., cam 41) according to the embodiments of the present disclosure in the contact-separation mechanism that moves the primary transfer roller, the maximum difference of the gradient of the cam face is not reduced even if the cam face has a reduced gradient, like the contact-separation mechanisms incorporated in the fixing devices and transfer devices described above. Accordingly, a sufficient distance is secured for the primary transfer roller (e.g., primary transfer roller 421Y) to approach and separate from the corresponding photoconductor (e.g., photoconductor 411Y). In addition, an increase in torque is suppressed while the operating noises can be prevented. Note that, the contact-separation mechanism 400P of FIGS. 59A and 59B incorporated in the transfer device 406 is similar to the contact-separation mechanism 400 of FIGS. 2 and 3 incorporated in the fixing device 12. Alternatively, the other contact-separation mechanisms described above may be applied as the contact-separation mechanism 400P incorporated in the transfer device 406.

Now, a description is given of configurations and advantages of the contact-separation mechanism (i.e., cam device) according to the embodiments described above.

According to an embodiment of the present disclosure, a cam device (e.g., contact-separation mechanism 400) includes a cam (e.g., cam 41) and a driver (e.g., motor 43). The driver rotates the cam in a first direction and in a second direction opposite the first direction. The cam includes a cam face (e.g., cam face 41a) that is gradually distanced from a rotation center of the cam over a range greater than half a round of the cam, in at least one of the first direction and the second direction of rotation of the cam. Thus, the cam device causes a first rotator as a contact-separation member to approach and separate from a second rotator as an opposed member that is disposed opposite the contact-separation member.

Since the cam is rotatable in opposite directions (i.e., first and second directions), the cam has a common cam face usable when the contact-separation member approaches the opposed member and when the contact-separation member separates from the opposed member. That is, a range to secure the cam face is not limited to at most half a round of the cam in a direction of rotation of the cam, unlike a typical configuration in which the cam rotates in a single direction. Accordingly, the cam face is provided over the range greater than half a round of the cam in at least one of the first direction and the second direction of rotation of the cam. With such a configuration, if the gradient of the cam face is reduced, a maximum difference of the gradient is not reduced. That is, a sufficient distance is secured for the contact-separation member to approach and separate from the opposed member. In addition, a reduced gradient of the cam face suppresses an increase in torque and prevents operating noises.

Note that the cam face gradually distanced from the rotation center of the cam is, e.g., the cam face 41a that is gradually and continuously distanced from the rotation center of the cam 41, from the minimum point e1 to the maximum point e2 as illustrated in FIG. 3, without the flat face 41b. Alternatively, the cam face may include the flat faces 41*b* as illustrated in FIG. 26. In this case, the cam face is gradually distanced from the rotation center of the cam, from the minimum point e1 to the maximum point e2, via the flat faces 41*b*.

According to an embodiment of the present disclosure, the cam device further includes a rotational position detector (e.g., optical sensor 51), a timer (e.g., timer 70), and a controller (e.g., controller 60). The rotational position detector detects a rotational position of the cam. The timer measures duration of rotation of the cam. The controller controls rotation of the cam. When the cam rotates in the first direction, the controller halts rotation of the cam at a time when the rotational position detector detects a predetermined rotational position of the cam. By contrast, when the cam rotates in the second direction, the controller halts rotation of the cam at a time when the timer measures a predetermined time.

Thus, the controller controls rotation of the cam to stop the cam at a given position based on different timing determiners (i.e., the rotational position detector and the timer) depending on the directions of rotation of the cam. Specifically, the controller halts rotation of the cam according to detection by the rotational position detector when the cam rotates in the first direction. By contrast, the controller halts rotation of the cam according to time measurement by the timer. The present configuration obviates the need to provide two rotational position detectors, thereby reducing cost and downsizing the cam device.

According to an embodiment of the present disclosure, when the cam rotates in a direction to press and move a rotator (i.e., contact-separation member) or an associated member that moves together with the rotator, the controller halts rotation of the cam at the time when the rotational position detector detects the predetermined rotational position of the cam. By contrast, when the cam rotates in a direction opposite the direction in which the cam rotates to press and move the rotator or the associated member, the controller halts rotation of the cam at the time when the timer measures the predetermined time. In the present embodiment, the cam device further includes a driving force transmitter that transmits a rotational driving force to the cam. The driving force transmitter includes a worm gear (e.g., first worm gear 45, second worm gear 46).

When the cam rotates in the direction to press and move the contact-separation member or the associated member, an increase in torque may vary the number of rotations of the cam. To address this circumstance, in the present embodiment, the rotational position detector detects the rotational position of the cam to ensure the controller to stop the cam at the predetermined rotational position regardless of variation in the number of rotations of the cam. Accordingly, the present embodiment enhances accuracy in halting rotation of the cam at a desired position.

By contrast, when the cam rotates in the direction opposite the direction in which the cam rotates to press and move the contact-separation member or the associated member, there is a less impact of the variation in the number of rotations of the cam due to an increase in torque. Therefore, in this case, the controller controls the rotational position of the cam with the timer. However, in this case, a force is applied to the cam in a direction to accelerate the rotation of the cam when a pressing force of the cam is released, varying the position at which the cam stops rotating. To address this circumstance, in the present embodiment, the worm gear is used as a driving force transmitter, thereby preventing acceleration of rotation of the cam with a self-locking function of the worm gear. This configuration reduces changes in the rotational speed of the cam, thereby suppressing variation in the position of the cam at which the cam stops rotating. Accordingly, the present embodiment enhances accuracy in halting rotation of the cam at a desired position. Although acceleration of rotation generally increases the operating noises, such operating noises are reduced in the present embodiment because rotation of the cam is prevented from being accelerated.

According to an embodiment of the present disclosure, the rotational position detector includes an optical sensor (e.g., optical sensor 51) and a detected member (e.g., light shield 52). The optical sensor includes a light emitting portion. The optical sensor emits light and receives the light thus emitted. The detected member rotates together with the cam to transmit and intercept or reflect the light emitted by the optical sensor. The optical sensor detects a rotational position of the detected member based on a reading of the optical sensor, that is, whether the optical sensor receives the light or not. The detected member includes a long detected portion (e.g., long light shield portion 52*a*) and a short detected portion (e.g., short light shield portion 52*b*) as a first short detected portion. As the detected member rotates, the long detected portion passes before the light emitting portion of the optical sensor for a longer period of time than the predetermined time measured by the timer. By contrast, the short detected portion passes before the light emitting portion of the optical sensor for a shorter period of time than the predetermined time measured by the timer. The timer starts measurement of the predetermined time at a time when the reading of the optical sensor changes. The controller halts rotation of the cam when the timer completes measurement of the predetermined time while the reading of the optical sensor remains unchanged. By contrast, when the reading of the optical sensor changes before the timer completes measurement of the predetermined time, the controller cancels measurement of the predetermined time with the timer before the timer completes measurement of the predetermined time.

In this case, after the timer starts time measurement at the time when the short detected portion of the detected member changes the reading of the optical sensor, the controller cancels the time measurement with the timer before the timer completes the time measurement because the reading of the optical sensor thus changed does not continue until the timer completes the time measurement. By contrast, after the timer starts time measurement at the time when the long detected portion of the detected member changes the reading of the optical sensor, the controller halts rotation of the cam when the timer completes the time measurement because the reading of the optical sensor thus changed continues until the timer completes the time measurement. Thus, while canceling the time measurement that is started at the time when the short detected portion of the detected member changes the reading of the optical sensor, the controller controls the position of the cam at which the cam stops rotating based on the time measurement that is started at the time when the long detected portion of the detected member changes the reading of the optical sensor. Such control shortens time measurement with the timer. Accordingly, variation in time measurement with the timer is reduced, thereby enhancing accuracy in controlling the rotational position of the cam.

According to an embodiment of the present disclosure, when the cam rotates in the first direction, the controller halts rotation of the cam at the time when the short detected portion of the detected member passes before the light emitting portion of the optical sensor and changes the reading of the optical sensor. By contrast, when the cam rotates in the second direction, the timer starts measurement of the predetermined time at the time when the long detected portion of the detected member reaches the light emitting portion of the optical sensor and changes the reading of the optical sensor. The controller halts rotation of the cam at the time when the timer measures the predetermined time while the reading of the optical sensor remains unchanged.

Such control stops the cam at the predetermined position with the optical sensor and the timer in the configuration having the detected member including the short detected portion and the long detected portion.

According to an embodiment of the present disclosure, the detected member further includes a second short detected portion along a direction of rotation of the detected member. That is, the cam device includes a plurality of short detected portions (e.g., light shield portion 52b through 52i) along the direction of rotation of the detected member. When the cam rotates in the first direction, the controller selects one of the first short detected portion and the second short detected portion (i.e., the plurality of short detected portions) of the detected member, and halts rotation of the cam at a time when the one of the first short detected portion and the second short detected portion thus selected passes before the light emitting portion of the optical sensor and changes the reading of the optical sensor.

Thus, the controller selects one of the plurality of short detected portions of the detected member to halt rotation of the cam at the time when the one of the plurality of short detected portions thus selected changes the reading of the optical sensor, thereby accurately adjusting the position at which the cam stops rotating.

According to an embodiment of the present disclosure, the cam device is incorporated in a fixing device (e.g., fixing device 12) that includes a pair of rotators (e.g., fixing roller 18, pressure roller 19) facing each other to fix a toner image onto a recording medium. Specifically, while the recording medium bearing the toner image is conveyed through the pair of rotators, the toner image is fixed onto the recording medium. The pair of rotators includes a first rotator (e.g., pressure roller 19) as the contact-separation member and a second rotator (e.g., fixing roller 18) as the opposed member. The second rotator is disposed opposite the first rotator. The cam device causes the first rotator (i.e., contact-separation member) to approach and separate from the second rotator (i.e., opposed member).

The first rotator may be a pressure roller (e.g., pressure roller 19) while the second rotator may be one of a fixing roller (e.g., fixing roller 18) and a fixing belt (e.g., fixing belt 83). The pressure roller presses against the one of the fixing roller and the fixing belt to form a fixing nip (e.g., fixing nip N) between the pressure roller and the one of the fixing roller and the fixing belt. Through the fixing nip, a recording medium bearing a toner image is conveyed.

According to an embodiment of the present disclosure, the cam device is incorporated in a transfer device that includes a first rotator and a second rotator disposed opposite the first rotator. In the transfer device, the cam device causes the first rotator to approach and separate from the second rotator.

The transfer device may further include an intermediate transferor, sandwiched between the first rotator and the second rotator, to bear a toner image. The intermediate transferor may be an intermediate transfer belt. For example, the transfer device (e.g., transfer device 406) with the intermediate transferor includes at least one primary transferor (e.g., primary transfer roller 421) as the first rotator and at least one photoconductor (e.g., photoconductor 411) as the second rotator. Specifically, the at least one primary transferor transfers the toner image from the at least one photoconductor onto the intermediate transferor. According to the present example, as illustrated in FIGS. 58 through 59B, the at least one primary transferor serves as the contact-separation member while the at least one photoconductor serves as the opposed member. The cam device causes the at least one primary transferor to approach and separate from the at least one photoconductor. The primary transferor may be a primary transfer roller.

Alternatively, the transfer device (e.g., transfer device 206) includes a secondary transferor (e.g., secondary transfer roller 222) as the first rotator and an intermediate transferor (e.g., intermediate transfer belt 216) as the second rotator. Specifically, the intermediate transferor bears a toner image. The secondary transferor transfers the toner image from the intermediate transferor onto a recording medium. According to the present example, as illustrated in FIG. 56, the secondary transferor serves as the contact-separation member while the intermediate transferor serves as the opposed member. The cam device causes the secondary transferor to approach and separate from the intermediate transferor. The secondary transferor may be a secondary transfer roller. The intermediate transferor may be an intermediate transfer belt.

As another example, the transfer device (e.g., transfer device 206) includes a secondary transferor (e.g., secondary transfer roller 222) as the first rotator and an opposed secondary transferor (e.g., secondary transfer backup roller 219) as the second rotator. Specifically, the secondary transferor transfers the toner image from the intermediate transferor onto a recording medium. According to the present example, as illustrated in FIG. 56, the secondary transferor serves as the contact-separation member while the opposed secondary transferor serves as the opposed member. The cam device causes the secondary transferor to approach and separate from the opposed secondary transferor. The secondary transferor may be a secondary transfer roller. The opposed secondary transferor may be a secondary transfer backup roller.

According to an embodiment of the present disclosure, the cam device is incorporated in an image forming apparatus.

Although the present disclosure makes reference to specific embodiments, it is to be noted that the present disclosure is not limited to the details of the embodiments described above and various modifications and enhancements are possible without departing from the scope of the present disclosure. It is therefore to be understood that the present disclosure may be practiced otherwise than as specifically described herein. For example, elements and/or features of different embodiments may be combined with each other and/or substituted for each other within the scope of the present disclosure. The number of constituent elements and their locations, shapes, and so forth are not limited to any of the structure for performing the methodology illustrated in the drawings.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

Any one of the above-described operations may be performed in various other ways, for example, in an order different from the one described above.

Further, any of the above-described devices or units can be implemented as a hardware apparatus, such as a special-purpose circuit or device, or as a hardware/software combination, such as a processor executing a software program.

Further, as described above, any one of the above-described and other methods of the present disclosure may be embodied in the form of a computer program stored in any kind of storage medium. Examples of storage mediums include, but are not limited to, flexible disk, hard disk, optical discs, magneto-optical discs, magnetic tapes, non-volatile memory cards, read only memory (ROM), etc.

Alternatively, any one of the above-described and other methods of the present disclosure may be implemented by an application specific integrated circuit (ASIC), prepared by interconnecting an appropriate network of conventional component circuits or by a combination thereof with one or more conventional general purpose microprocessors and/or signal processors programmed accordingly.

What is claimed is:

1. A cam device, comprising:
    a cam including a cam face, the cam face being gradually distanced from a rotation center of the cam over a range greater than half a round of the cam;
    a driver to rotate the cam in a first direction and in a second direction opposite the first direction;
    a rotational position detector to detect a rotational position of the cam;
    a timer to measure a duration of rotation of the cam; and
    a controller to control rotation of the cam,
    wherein, when the cam rotates in the first direction, the controller halts rotation of the cam at a time when the rotational position detector detects a predetermined rotational position of the cam, and
    wherein, when the cam rotates in the second direction, the controller halts rotation of the cam at a time when the timer measures a predetermined time.

2. The cam device according to claim 1,
    wherein, when the cam rotates in the first direction to press and move a rotator or an associated member that moves together with the rotator, the controller halts rotation of the cam at the time when the rotational position detector detects the predetermined rotational position of the cam, and
    wherein, when the cam rotates in the second direction, the controller halts rotation of the cam at the time when the timer measures the predetermined time.

3. The cam device according to claim 1, further comprising a driving force transmitter to transmit a rotational driving force to the cam.

4. The cam device according to claim 3, wherein the driving force transmitter includes a worm gear.

5. The cam device according to claim 1, wherein the rotational position detector includes:
    an optical sensor to emit light and receive the light thus emitted; and
    a detected member to rotate together with the cam to transmit and intercept or reflect the light emitted by the optical sensor,
    wherein the optical sensor detects a rotational position of the detected member based on a reading of the optical sensor.

6. The cam device according to claim 5,
    wherein the timer starts measurement of the predetermined time at a time when the reading of the optical sensor changes,
    wherein the controller halts rotation of the cam when the tinier completes measurement of the predetermined time while the reading of the optical sensor remains unchanged, and
    wherein, when the reading of the optical sensor changes before the timer completes measurement of the predetermined time, the controller cancels measurement of the predetermined time with the timer before the timer completes measurement of the predetermined time.

7. The cam device according to claim 5,
    wherein the optical sensor includes a light emitting portion, and
    wherein the detected member includes:
        a long detected portion to pass before the light emitting portion of the optical sensor for a longer period of time than the predetermined time measured by the timer as the detected member rotates; and
        a short detected portion as a first short detected portion to pass before the light emitting portion of the optical sensor for a shorter period of time than the predetermined time measured by the timer as the detected member rotates.

8. The cam device according to claim 7,
    wherein, when the cam rotates in the first direction, the controller halts rotation of the cam at a time when the short detected portion of the detected member passes before the light emitting portion of the optical sensor and changes the reading of the optical sensor, and
    wherein, when the cam rotates in the second direction, the timer starts measurement of the predetermined time at a time when the long detected portion of the detected member reaches the light emitting portion of the optical sensor and changes the reading of the optical sensor, and the controller halts rotation of the cam at the time when the timer measures the predetermined time while the reading of the optical sensor remains unchanged.

9. The cam device according to claim 8,
    wherein the detected member further includes a second short detected portion along a direction of rotation of the detected member, and
    wherein, when the cam rotates in the first direction, the controller selects one of the first short detected portion and the second short detected portion of the detected member, and the controller halts rotation of the cam at a time when the one of the first short detected portion and the second short detected portion thus selected passes before the light emitting portion of the optical sensor and changes the reading of the optical sensor.

10. A fixing device, comprising:
    a first rotator;
    a second rotator disposed opposite the first rotator; and
    a cam device to cause the first rotator to approach and separate from the second rotator,
    the cam device including:
        a cam including a cam face, the cam face being gradually distanced from a rotation center of the cam over a range greater than half a round of the cam;
        a driver to rotate the cam in a first direction and in a second direction opposite the first direction;
        a rotational position detector to detect a rotational position of the cam;
        a timer to measure a duration of rotation of the cam; and
        a controller to control rotation of the cam, wherein, when the cam rotates in the first direction, the controller halts rotation of the cam at a time when the rotational position detector detects a predetermined rotational position of the cam, and wherein, when the cam rotates in the second direction, the controller halts rotation of the cam at a time when the timer measures a predetermined time.

11. The fixing device according to claim 10, wherein the second rotator includes one of a fixing roller and a fixing belt, wherein the first rotator includes a pressure roller to press against the one of the fixing roller and the fixing belt to form a fixing nip between the pressure roller and the one of the fixing roller and the fixing belt, and wherein a recording medium bearing a toner image is conveyed through the fixing nip.

12. A transfer device, comprising:

a first rotator;

a second rotator disposed opposite the first rotator; and a cam device to cause the first rotator to approach and separate from the second rotator, the cam device including:

a cam including a cam face, the cam face being gradually distanced from a rotation center of the cam over a range greater than half a round of the cam;

a driver to rotate the cam in a first direction and in a second direction opposite the first direction;

a rotational position detector to detect a rotational position of the cam;

a timer to measure a duration of rotation of the cam; and a controller to control rotation of the cam, wherein, when the cam rotates in the first direction, the controller halts rotation of the cam at a time when the rotational position detector detects a predetermined rotational position of the cam, and wherein, when the cam rotates in the second direction, the controller halts rotation of the cam at a time when the timer measures a predetermined time.

13. The transfer device according to claim 12, further comprising an intermediate transferor, sandwiched between the first rotator and the second rotator, to bear a toner image.

14. The transfer device according to claim 13, wherein the intermediate transferor includes an intermediate transfer belt.

15. The transfer device according to claim 13, wherein the second rotator includes a photoconductor to bear the toner image, and wherein the first rotator includes a primary transferor to transfer the toner image from the photoconductor onto the intermediate transferor.

16. The transfer device according to claim 15, wherein the primary transferor includes a primary transfer roller.

17. The transfer device according to claim 12, wherein the second rotator includes at least one of an intermediate transferor to bear a toner image and an opposed secondary transferor, and wherein the first rotator includes a secondary transferor to transfer the toner image from the intermediate transferor onto a recording medium.

18. The transfer device according to claim 17, wherein the secondary transferor includes a secondary transfer roller, wherein the intermediate transferor includes an intermediate transfer belt, and wherein the opposed secondary transferor includes a secondary transfer backup roller.

19. An image forming apparatus comprising the cam device according to claim 1.

* * * * *